US010057713B1

(12) United States Patent
Rackley, III et al.

(10) Patent No.: US 10,057,713 B1
(45) Date of Patent: *Aug. 21, 2018

(54) SYSTEM FOR AND METHOD OF PROVIDING ENHANCED SERVICES BY USING MACHINE-BASED WIRELESS COMMUNICATIONS OF PORTABLE COMPUTING DEVICES

(71) Applicant: KnowMe Labs, LLC, Atlanta, GA (US)

(72) Inventors: Brady L. Rackley, III, Atlanta, GA (US); Eric Kraar, Atlanta, GA (US); David W. Hallum, Atlanta, GA (US); Garrett Langley, Atlanta, GA (US); John R. Phelps, Jr., Atlanta, GA (US); Frank L. Wilson, IV, Atlanta, GA (US); Steven Neel, Atlanta, GA (US)

(73) Assignee: KNOWME LABS, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/588,665

(22) Filed: May 7, 2017

Related U.S. Application Data

(63) Continuation of application No. 14/848,297, filed on Sep. 8, 2015, now Pat. No. 9,781,557.

(Continued)

(51) Int. Cl.
*H04W 4/02* (2018.01)
*H04W 4/021* (2018.01)
(Continued)

(52) U.S. Cl.
CPC ........ *H04W 4/021* (2013.01); *G06Q 30/0281* (2013.01); *H04W 4/005* (2013.01); *H04W 4/043* (2013.01); *H04W 4/70* (2018.02)

(58) Field of Classification Search
CPC ..... H04W 4/021; H04W 4/005; H04W 4/043; G06Q 30/0281
See application file for complete search history.

(56) References Cited

U.S. PATENT DOCUMENTS 6,823,188 B1 * 11/2004 Stern .................... G08G 1/0962
455/41.2
7,857,225 B2 12/2010 Challa et al.
(Continued)

OTHER PUBLICATIONS

Alex Colon, MLB Using Apples Ibeacons to Create Interactive Stadium Experiences, Sep. 2013, one page.

*Primary Examiner* — Nathan Mitchell
(74) *Attorney, Agent, or Firm* — Smith Tempel; Steven P. Wigmore

(57) ABSTRACT

A system for and a method of providing enhanced services by using machine-based wireless communications of portable computing devices (PCDs) are described. More specifically, a system for and a method of efficiently and effectively projecting, in a controlled fashion, a user's profile to a service provider's PCD in anticipation of an expected interaction between the user and the service provider. The user's profile may comprise content related to identification, current physical location, personal preferences, etc. The system and method may emphasize proactively controlled projection of private/personal information, proactively controlled use of PCD resources, and proactively controlled use of communication network resources.

20 Claims, 34 Drawing Sheets

Related U.S. Application Data

(60) Provisional application No. 62/046,714, filed on Sep. 5, 2014.

(51) Int. Cl.
*H04W 4/04* (2009.01)
*G06Q 30/02* (2012.01)
*H04W 4/00* (2018.01)
*H04W 4/70* (2018.01)

(56) References Cited

U.S. PATENT DOCUMENTS

| | | | | |
|---|---|---|---|---|
| 8,099,085 | B2* | 1/2012 | Lowry | G06Q 30/06 340/539.13 |
| 8,812,029 | B1* | 8/2014 | Cao | H04M 1/72522 455/456.1 |
| 2005/0143097 | A1* | 6/2005 | Wilson | H04W 64/00 455/456.3 |
| 2008/0169937 | A1* | 7/2008 | Lowry | G06Q 30/06 340/686.6 |
| 2010/0144375 | A1* | 6/2010 | Pfister | G07B 15/02 455/456.5 |
| 2010/0161432 | A1* | 6/2010 | Kumanov | G06Q 20/102 705/15 |
| 2012/0209657 | A1* | 8/2012 | Connolly | G06Q 20/3224 705/7.29 |
| 2013/0054758 | A1* | 2/2013 | Imes | H04L 12/2827 709/219 |
| 2013/0166332 | A1 | 6/2013 | Hammad | |
| 2014/0025540 | A1 | 1/2014 | Hendrickson | |
| 2014/0087769 | A1* | 3/2014 | Nath | G01S 5/0252 455/456.6 |
| 2014/0171013 | A1* | 6/2014 | Varoglu | H04W 4/021 455/404.2 |
| 2014/0184829 | A1 | 7/2014 | Li | |
| 2014/0337123 | A1* | 11/2014 | Nuernberg | G06Q 30/0246 705/14.45 |
| 2014/0349683 | A1* | 11/2014 | D'Argenio | H04L 67/18 455/456.3 |
| 2014/0364148 | A1* | 12/2014 | Block | H04W 4/02 455/456.3 |
| 2014/0365334 | A1* | 12/2014 | Hurewitz | G06Q 30/0613 705/26.41 |
| 2015/0019339 | A1* | 1/2015 | Van Phan | G06Q 30/02 705/14.58 |
| 2015/0120341 | A1* | 4/2015 | Scarborough | G06Q 10/02 705/5 |
| 2015/0371303 | A1* | 12/2015 | Suri | G06Q 30/0613 705/26.41 |
| 2016/0005003 | A1* | 1/2016 | Norris | G06Q 10/10 705/7.19 |
| 2016/0098676 | A1* | 4/2016 | Kusens | G06Q 10/0833 705/26.9 |
| 2016/0150372 | A1* | 5/2016 | Harkey | H04L 67/18 455/456.1 |

* cited by examiner

SYSTEM FOR AND METHOD OF PROVIDING ENHANCED SERVICES BY USING MACHINE-BASED WIRELESS COMMUNICATIONS OF PORTABLE COMPUTING DEVICES

PRIORITY AND RELATED APPLICATIONS STATEMENT

This patent application claims priority under 35 U.S.C. § 119(e) to U.S. Provisional Patent Application Ser. No. 62/046,714 filed on Sep. 5, 2014, entitled, "SYSTEM FOR AND METHOD OF PROVIDING ENHANCED SERVICES BY USING MACHINE-BASED WIRELESS COMMUNICATIONS OF PORTABLE COMPUTING DEVICES," the entire contents of which are hereby incorporated by reference.

DESCRIPTION OF THE RELATED ART

Despite the cliché, "the World has become smaller"—the technology revolution having effectively eliminated the barriers of distance and time—it is arguable that the World has actually become bigger. Take the following example: 70 years ago, a hometown resident could walk into one of a handful of local clothing stores and expect personalized services. The clothing store operator would come to expect the recurring customer, who most likely shopped periodically. More importantly, the clothing store operator would recognize the local customer and come to know his/her personal details and preferences. Often times, the clothing store operator would cater to some of the customer's personal preferences—a waiting cup of his/her favorite coffee and an available sales-person capable of immediately selecting some clothing options in the appropriate size and preferred styles. By leveraging this information, the clothing store operator made sure that his/her services were optimized for his most consistent customers.

For good and bad, the modern world provides most consumers many more options than 70 years ago. That same hometown customer is no longer limited to a handful of local clothing stores. Instead, the customer has a broad assortment of available local and non-local/brick-and-mortar and digital retail options. From this perspective, the world has become smaller.

On the other hand, the world has become bigger because with increased options comes an increased dependence on arm's-length transactions between customers and service providers. As compared to the past, each party to a commercial transaction simply knows too little about the other to provide consistently personalized services.

Recently, there have been some failed attempts at resolving the issues described above. For example, a more modern clothing store may allow potential local customers to create a personalized account. In the personalized account, the customer specifies certain personal details (sizes, home zip code, etc.) and certain personal preferences (preferred styles, etc.). This seemingly solves the problem by allowing one specific clothing store location to use the information of all its potential local customers—maybe those within a certain geographic area. Consequently, the specific clothing store location may provide a more personalized experience—maybe stocking the right amount of certain sizes and styles to satisfy the average local consumer.

Unfortunately, this fix relies on probability and statistical analysis to supposedly personalize a specific clothing store location to a potential local customer. Of course, sometimes this fix will be wrong for the same potential local customer, and sometimes this fix will be wrong among various potential local customers that are different from the norm. This fix also does nothing to make every single interaction between a customer and service provider personalized, especially, if the interaction is unscheduled or unexpected.

There is, therefore, a need in the art for a system for and a method of efficiently and effectively projecting, in a controlled fashion, a user's profile to a service provider in anticipation of an expected interaction between the user and the service provider.

SUMMARY OF THE DISCLOSURE

Briefly, the present disclosure is related to a system for and a method of efficiently and effectively projecting, in a controlled fashion, a user's profile to a service provider in anticipation of an expected interaction between the user and the service provider.

More specifically, the system of the present disclosure is a multipurpose and special purpose machine/system that, in certain embodiments, is spread out over a communications network linking various component parts which may include portable computing device often carried with/on a user, such as a tablet PC, a mobile phone, and/or a wearable device like a smartwatch. The system is configured to use a user's geospatial and/or proximity data—usually obtained from a sensor(s) on the user's person, and specifically, from a portable computing device. The system is also configured to selectively process, transmit, and store that geospatial and/or proximity data, and to coordinate and control the selective processing, transmission, and storage of the user's personal/private information to potential/relevant service providers. A user's personal private information may comprise identification, current physical location, personal preferences, etc.

The methods of the present disclosure results in the proactively controlled projection of a user's private/personal information, the proactively controlled use of portable computing device resources, and/or the proactively controlled use of communication network resources. The method also results in a privacy conscious control mechanism for successfully projecting a user's private/personal information when it is wanted by the user, and/or when it is defined that some controlled projection benefits the user.

In certain embodiments, the system and method can be represented in three distinct concepts—Data, Core, and Applications.

Data represents the storage, retrieval, and management of the data used by the system. Data also represents any information retrieved from or delivered to customer, partner, or affiliate systems. Data also represents various operational data stores providing information for analytics, troubleshooting, customer service and various other business processes.

Core represents one exemplary aspect of the inventive method and system—the definition of the data being handled and how it is structured, and the definition of how the data is transmitted and what conditions trigger the data to be transmitted. Core may encompass Core Communication features. Core Communications may be a messaging system residing within and along the system that enables proactive and controlled communication protocols. The Core Communication may be generally characterized as software running on a computer server, but the system and method is not limited to only that exemplary embodiment/framework. Core Communication is designed to function with zero user interaction—the user can keep their mobile device in their pocket and the system will still function. Core Communications may use Action Data Objects that can be processed by components of the system that may not be in immediate proximity. Core Communications uses certain elements of context to determine when to activate and what data to send.

Applications are software application program modules that may be built on top of Core Data Objects and Core Communications. Applications can define extensions to Core Data Objects to meet needs of specific use cases. Applications can function as the point of interaction between the user and/or service provider, and the system.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Explanation of Terms and Context

Figure 1:
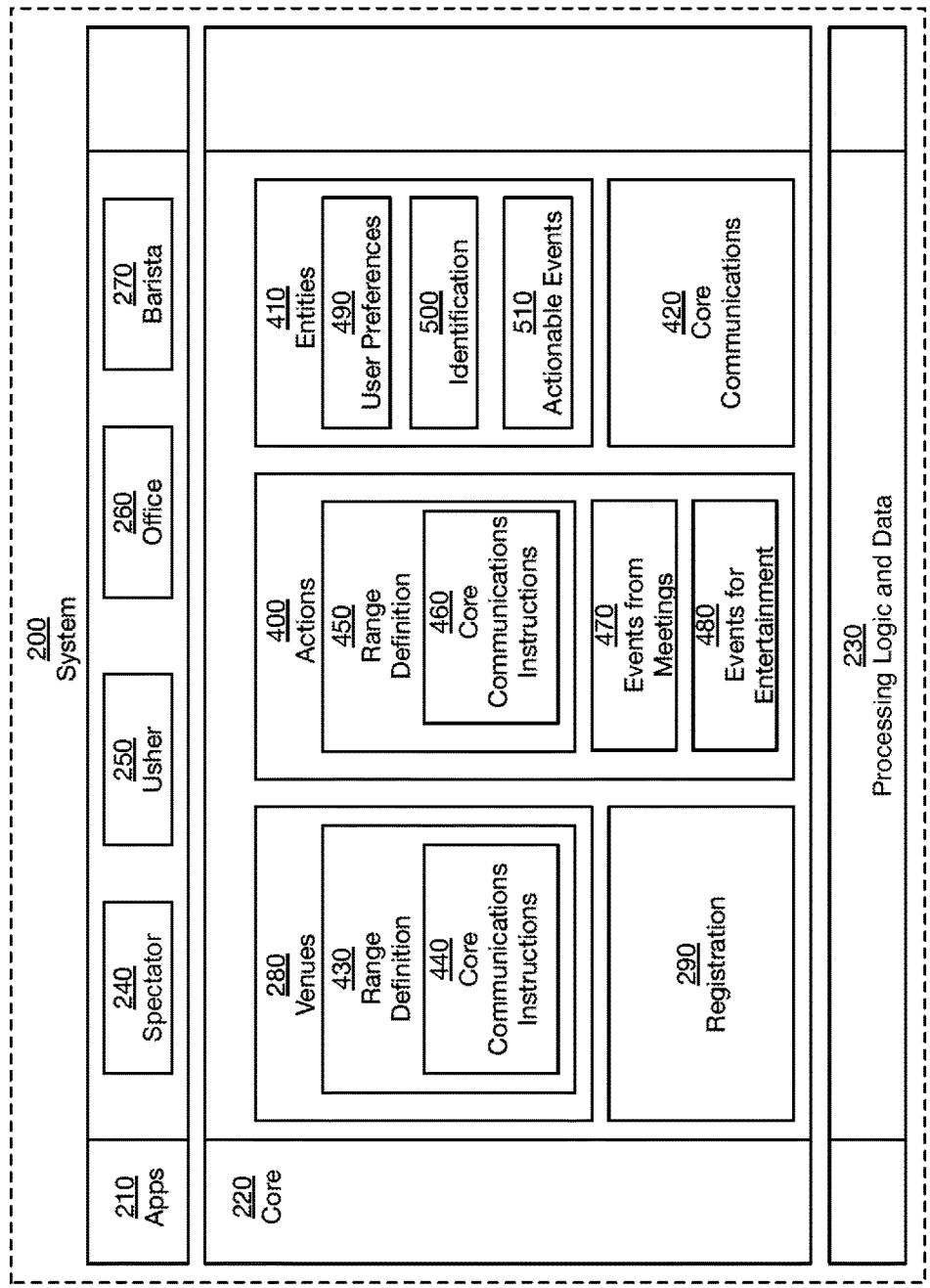
FIG. 1 is a high level block diagram of the system architecture according to one exemplary embodiment.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device (a "PCD") may include a cellular telephone, a pager, a PDA, a smartphone, a navigation device, or a hand-held computer with a wireless connection or link.

Exemplary Embodiments

For one exemplary embodiment, the present disclosure generally relates to a system for and a method of providing enhanced services by using machine-based wireless communications of a portable computing devices. More specifically, the exemplary embodiment relates to a system for and a method of efficiently and effectively projecting, in a controlled fashion, a user's profile to a service provider in anticipation of an expected interaction between the user and the service provider. The user's profile may comprise content related to identification, current physical location, personal preferences, etc. The system and method may emphasize proactively controlled projection of private/personal information, proactively controlled use of portable computing device resources, and proactively controlled use of communication network resources.

Even more specifically, one exemplary embodiment of the system and method is configured to allow a user to personalize the world around him/her. This system empowers its users/consumers to project their respective identities, profiles, and preferences into the interactive world around them.

In another exemplary embodiment, the system of the present disclosure comprises a user/operator—Jo, for example— with a first PCD. The first PCD configured to interact with the rest of the system. Jo's PCD runs an exemplary first application, which extends functionally from the system and at least partially facilitates the associated methods of the present disclosure. Very generally, the first application operates as a branch of the system with access to the many sensors (GPS, barometer, accelerometer) of the PCD. The first application also operates as a conduit through which Jo interacts with the system.

Furthermore, the system of the exemplary embodiment comprises a product supplier/service provider/interactee—a business entity expecting Jo for a meeting, for example—with a second PCD. The second PCD is also configured to interact with the rest of the system. The business entity's PCD runs an exemplary second application that also extends functionally from the system and at least partially facilitates the associated methods of the present disclosure. The first application is associated with the second application. Like the first application, the second application operates as a branch of the system with access to the business entity's facilities—for example, the automated door/entrance system. The second application also operates as a conduit through which different business entity personnel interact with the system.

Suppose one non-limiting illustrative situation: Imagine Jo is driving to the business entity facility on the morning of the meeting. On her way into the parking deck, the office manager/receptionist for the business entity receives a notification that Jo has pulled into the parking deck. The notification also provides information about Jo's preferences for certain pre-defined fields.

Another exemplary embodiment of the system of the present disclosure notifies the office manager/receptionist with sufficient anticipation and certainty for the business entity to freshly prepare Jo's preferred drink and have it ready for Jo's arrival. Consequently, upon receipt of the system notification, the receptionist may begin preparing Jo's drink as she makes her way up the elevator. As Jo arrives within a more precise proximity to the business entity facility, the automated doors unlock and the receptionist greets Jo with his/her preferred drink, fresh and ready.

In another exemplary embodiment of the system of the present disclosure, the system is configured to help users handle their consumer identity and preferences, to produce better-than-normal experiences at restaurants, retail, and other businesses. Consequently, the system and method may yield improved consumer control and privacy without reliance on the usual marketing campaign bombardment.

Referring now to the drawings, wherein the showings are for purposes of illustrating certain exemplary embodiments of the present disclosure only, and not for purposes of limiting the same, FIG. 1 is a high level block diagram of the system architecture according to one exemplary embodiment. The System 200 may be subdivided into three tiers: Applications (Apps) 210, Core 220, and Processing Logic and Data 230.

Apps 210 may comprise software application program modules (described in greater detail herein) and any related content. Core 220 may comprise various extendable objects/modules. Processing Logic and Data 230 may comprise a multipurpose and special purpose component/module configured to handle the access, storage, handling, maintenance, management, etc. of proprietary data in, and third-party data functionally related and accessible by, System 200. In one exemplary embodiment, Apps 210, Core 220, and Processing Logic and Data 230 may processed among various system components (SEE FIG. 5).

A non-limiting description/organization scheme for the extendable objects/modules of Core 220 may translate into the following flexible structure: Venues 280, Registration 290, Actions 400, Entities 410, and Core Communications 420 (described in greater detail herein). Each of these elements may comprise software modules/coded objects as understood by one of ordinary skill in the art. Very generally, Core Communications 420 may be a multipurpose and special purpose software module that handles the proactive, regulated transmission of data within the System 200 and among the extendable objects/modules of Core 220.

More specifically, Apps 210 may comprise software application program modules built on top of Core 220 and Core Communications 420. The application program modules may comprise software programmed in the ObjectiveC computer language and other equivalent formats. Apps 210 may define program module extensions to Core 220 to meet the needs of specific use cases (examples described in greater detail herein). Apps 210 may use Core Communications 420 in both a communications network facilitated context—a cloud service, for example—and/or a PCD-to-PCD context (SEE FIGS. 4, 6, 8, 12).

Apps 210 may use location services from the mobile operating system of a PCD for activation of Core Communications 420. For example, Apps 210 may use wireless, radio-frequency (RF) Bluetooth Low Energy Beacons (iBeacons)™, or any other functionally equivalent wireless RF broadcasting system. One of ordinary skill in the art understands that Bluetooth™ has built in provisions for managing the sending of content/data that is over 512 bytes. Usually, about 35k bytes may be transmitted with a very acceptable response time. Other exemplary embodiments may only transmit approximately 128 bits. However, other data rates are possible and are included within the scope of this disclosure.

Office 260 and Barista 270 are exemplary Applications 210 that may be configured to allow a user of a system-associated personal computing device to have his/her favorite beverage prepared and waiting for at meeting event. Office 260 and Barista 270 may use Core Communications 420 in both a cloud and device-to-device context to share, secure, manage a user's personal preference information. Spectator 240 and Usher 250, are associated exemplary Applications 210 configured to replace traditional barcode-based paper or mobile tickets. Spectator 240 and Usher 250 may integrate with a system component that wirelessly transmits ticket data to a user's personal computing device upon arrival to an entertainment event. Spectator 240 and Usher 250 may use Core Communications 420 in a device-to-device context.

Core 220 may comprise content/data defining how to selectably and securely process and distribute the Processing Logic and Data 230 (proprietary data gathered and managed, and third-party data functionally related and accessible by, System 200, for example) among the various extendable objects/modules of Core 220 in anticipation of a system-facilitated event. Core 220 may comprise the definitions for how system data should be handled and structured, the definitions for how system data should be transmitted, and the definitions for what system conditions trigger the transmission/erasure/redaction of system data. The method of transmitting data may be embodied by Core Communications 420 (described in greater detail herein).

In one exemplary embodiment, Core 220 content/date may handle projecting a user's private/personal preference information to a service provider in anticipation of an expected interaction event between the user and the service provider. The user's private/personal preference (or profile, for example) may comprise content/data related to identification, current physical location, personal preferences, etc. stored in various extendable objects/modules of Core 220. In another exemplary embodiment, Core 220 content/date may define how to proactively regulate the activity/use of system component resources, and how to proactively regulate the use of communications-network resources.

The extendable objects/modules of Core 220 may comprise software and/or hardware. In one exemplary embodiment, Core 220 may comprise software modules/objects programmed in Javascript running on a processing server, such as an Apple Mac OS X™ Server with software version Node.js 0.10.30, MongoDB 2.6. However, other programming languages may be employed and are within the scope of this disclosure as understood by one of ordinary skill in the art.

As noted previously, a non-limiting description/organization scheme for the extendable objects/modules of Core 220 may translate into the following exemplary flexible structure: Venues 280, Registration 290, Actions 400, Entities 410, and Core Communications 420. One of ordinary skill in the art understands that the number, types, and/or configuration of software modules and/or hardware objects may be varied other than what is specifically described. That is, some extendable objects/modules of Core 220 may be joined together in other exemplary embodiments not described in this disclosure.

Venues 280 of Core 220 may comprise a sub-object/sub-module defining content/data related to the predefined location where a system affiliated service provider, for example, is situated and/or where a user intends/desires that his/her projected user profile be directed. Calendared meetings, scheduled entertainment, allotted periods of user time, and the temporal details of each (date, time, physical location) may be included in Venues 280 content/data. In one exemplary embodiment where Core 220 comprises the definitions for how system data should be managed and structured, the definitions for how system data should be transmitted, and the definitions for what system conditions trigger the transmission/erasure/redaction of system data, the Venues 280 sub-object/sub-module may comprise content/data related geo-spatial based triggers for activating Core Communication 420. Based on the geo-spatial triggers facilitated by Venues 280 content/date, a user's private/personal preference information may be projected to a service provider based on the relative proximity, for example, of the user to the service provider's facility.

Range Definitions 430 of Venues 280 may be a sub-sub-object/sub-sub-module specifically containing the content/data associated with geo-spatial/location information for delineating specific real-world areas within a predefined location. Range Definitions 430 may have further nested objects/modules like Core Communications Instructions 440, for example, that define how Core Communications 420 should operate when a system component, like a user's personal computing device, for example, is sensed to be within a predefined location (SEE—FIGS. 4, 6, 8, 12). In one exemplary embodiment, geo-location coordinates, such as latitude, longitude and altitude coordinates, as well as fine precision measurements from an accelerometer, barometer and other sensor(s), may be included in Range Definitions 430 content/data to define a specific real-world area.

In another exemplary embodiment, when a system component is at least partially within the defined area of Range Definitions 430 (via a user PCD being in that latitude, longitude, etc., for example) the Core Communications Instructions 440 may trigger how Core Communications 420 should operate. Core Communications 420 may managed various processes/methods (SEE FIGS. 7, 9-11, and 13-16) so as to selectably, securely distribute the user's private/personal preference information to a service provider when the user's PCD is sensed as within the defined area of Range Definitions 430.

Registration 290 of Core 220 may comprise content/data related to what is known about a user prior to initial registration. This data may be accessed and/or retrieved from a third-party customer relationship management (CRM) system—like that of Salesforce™, for example—in real-time or it may be pre-loaded. Exemplary non-limiting content/data included in Registration 290 includes, but is not limited to, e-mail addresses, name and aliases, real and personal property, rights-of-use, rights-of-access, permits, credentials, access privileges, easements, scheduled events, tickets, seat location, ticket vendor, ticket prices, etc.

Entities 410 of Core 220 may comprise content/data related to a user. Entities 410 may have overlap with Registration 290 but may include processing and updates. Consequently, Entities 410 may comprise content/data that is a mash-up of what is accessible and/or retrievable for Registration 290, and may comprise content/data that is proprietary/derived from the system and method of the present disclosure. Entity 410 may be accessed/used by Core Communications 420 and proactively, controllably shared throughout the System 200.

Specifically, the User Preferences 490 sub-module/sub-object of Entities 410 object/module may comprise content/data associated with a user's defined personal preference. Exemplary non-limiting content/data included in User Preferences 490 may comprise preferred/favorite food items, food preparation themes (gluten-free, paleo, vegetarian, etc.), allergy triggers, clothing items, clothing styles (formal, professional, casual, etc.), measurements (height, chest, waist, hips, etc.), colors, music, art work, scents, illnesses/injuries, accessibility requirements, physical limitations, etc. User Preferences 490 may incorporate one or more complex rules/schemes for determining a measure of how applicable a preference may be for the various expected or unexpected/defined or undefined situations and circumstances handled by the System 200.

The Identification 500 sub-object/sub-module of the Entities 410 object/module may comprise content/data associated with different elements of System 200 configured to help a third party provider correctly identify a user. In one exemplary embodiment, System 200 may be configured to directly/indirectly perform, at least partially, the identification. In another exemplary embodiment, System 200 may simply facilitate the service provider performing the inspection themselves. Exemplary non-limiting content/data included in the Identification 500 sub-object/sub-module may include, but is not limited to, secret questions, passwords, personal identification numbers ("pins"), identifying physical marks, biometrics, etc. associated with an operator/person that is of interest to the product supplier/service provider/interactee.

The Actionable Events 510 sub-object/sub-module of the Entities 410 software object/module may comprise content/data associated with an event or occurrence that merits an action and/or trigger within System 200. Actionable Events 510 may be derived by searching and processing through Venues 280 and Entities 410 content/data. In one exemplary embodiment, a link may exist between Venues 280, which may define the Range Definition 430 for a particular event occurring at a specific venue, and Entities 410, which may define how a specific user is related now or in the future with the particular event defined by Venues 280. It is envisioned that Entities 410 content/data—the Actionable Events 510 for example—may be derived and/or updated as Venues 280 content/data is updated, and vice versa.

Actions 400 of Core 220 may comprise content/data related to: (1) how the System Architecture of FIG. 1 should be distributed and processed; (2) the definitions for how content/data should be transmitted; and (3) the definitions for what conditions trigger the distribution/transmission of content/data. Actions 400 may be processed as part of a network-enabled processing server (described in greater detail herein) and, therefore, the Core 220 may be at least partially distributed among various system components.

In one exemplary embodiment, Actions 400 content/data, processed and stored among various extendable sub-objects/sub-modules, may define when to activate/trigger certain computer network implemented communications processes/methods (SEE FIGS. 7, 9-11, and 13-16) and what content/data to distribute among System 200. Location measures, date/time calculations, input from sensors available on certain system components (a personal computing device or a third-party data source, for example), etc. may be used to define whether or not to activate certain computer-network implemented communications (via Core Communications 420, for example) processes/methods between system components (short-range device-to-device wireless communications, for example).

In one exemplary embodiment involving a computer network-enabled processing server, Actions 400 may comprise content/data configured to facilitate the managing and processing of certain messaging queue services between components of system 200. In this way, System 200 may be configured to efficiently and effectively manage/conserve the resources of certain system components—the system PCDs (like mobile phones, tablet PCs, wearable-devices), for example. Moreover, because both users and SP/Vendor PCD 520s are concerned about network resource consumption, System 200 may be configured to mitigate the deficiencies of disparate communications pathways—by selectably activating/deactivating proximity-based communications methods and outsourcing certain message queue services, for example.

Range Definitions 450 of Actions 400 may be a sub-sub-object/sub-sub-module comprising content/data associated with geo-spatial/location information for delineating specific real-world areas within a predefined location. Range Definitions 450 may have further nested objects/modules like Core Communications Instructions 460, for example, that define how Core Communications 420 should operate when a system component, like a user's personal computing device, for example, is sensed to be within a predefined location (SEE—FIGS. 4, 6, 8, 12). In one exemplary embodiment, geo-location coordinates, such as latitude, longitude and altitude coordinates, as well as fine precision measurements from an accelerometer, barometer and other sensor(s), may be included in Range Definitions 450 content/data to define a specific real-world area.

In another exemplary embodiment, when a system component is at least partially within the defined area of Range Definitions 450 (via a user PCD being in that latitude, longitude, etc., for example) the Core Communications Instructions 460 may trigger how Core Communications 420 should operate. Core Communications 420 may manage various processes/methods (SEE FIGS. 7, 9-11, and 13-16) so as to selectably, securely distribute the user's private/personal preference information to a service provider when the user's PCD is sensed as within the defined area of Range Definitions 430.

In one exemplary embodiment, where Apps 210, Core 220, and Processing Logic and Data 230 are processed among various system components (SEE FIG. 5), Range Definitions 430 of Venues 280 and Range Definitions 450 of Actions 400, despite their similarity, facilitate the selective and secure features and aspects for handing private/personal preference information of the present disclosure. More specifically, because Range Definitions 430 of Venues 280 may be managed and stored at a service provider's personal computing device, it may be necessary to have an independent store—at a secure network server, for example—of geo-spatial/location information for delineating specific real-world areas within a predefined location, and definitions for how Core Communications 420 should operate, that the System 200 does not always make accessible to the user. The two independents sub-objects/sub-modules may allow for System 200 to have redundancy between but also purposeful differences for content/data at various system/components.

Events from Meetings 470 sub-objects/sub-modules and Events for Entertainment 480 sub-objects/sub-modules of the Actions 400 object/module may comprise content/data associated with an event or occurrence that merits an action and/or trigger within System 200. Events from Meetings 470 and Events for Entertainment 480, as well as various other possible iterations of these sub-objects/sub-modules, may be derived from searching and processing the content/data from Entities 410 and Actions 400.

More specifically, In one exemplary embodiment, Actionable Events 510 of Entities 410 content/data may comprise calendared meetings, scheduled entertainment, allotted periods of user time, and the temporal details of each (date, time, location) associated with a particular user profile. Because Actions 400 may operate on the intermediary network-enable processing server, Actionable Events 510 content/data may be associated with the predefined location where a service provider is actually or effectively situated. The Actionable Event 510 content/data may then also be associated with the predefined location where a user intends/desires to project his/her user profile. In this way, System 200 may be configured to proactively and controllably distribute private/personal information.

Core Communications 420 of Core 220 may comprise content/data defining the computer-implemented processes/methods of selectably and securely distributing the Processing Logic and Data 230 (proprietary data gathered and managed, and third-party data functionally related and accessible by, System 200, for example) to various system components. In one exemplary embodiment where Apps 210, Core 220, and Processing Logic and Data 230 are processed among various system components, Core Communications 420 may additionally manage which communications pathways (whether communications-network based or short-range device-to-device based, for example) feed content/data to the appropriate objects/modules on the appropriate system component (SEE FIG. 5). Generally, the method of transmitting system data may be embodied by Core Communications 420.

More specifically, in one exemplary embodiment, Core Communications 420 content/date may manage how a user's private/personal preference information, gathered at user's personal computing device and managed/stored at a network server, is distributed to the personal computing device of a service provider as a system-facilitated interaction between the user and the service provider is unfolding. This exemplary embodiment relates to the scenario previously described and involving the user/operator Jo and the business entity expecting Jo for a meeting, Core Communications 420 may be used as defined by the various other objects/modules of Core 220 (Venues 280, Actions 400, and Entities 410, for example) such that, if Jo is pulling into the parking deck of the business entity facility on the morning of a system-facilitated meeting, the office manager/receptionist for the business entity may receive a system-enabled notification that Jo has pulled into the parking deck. As Jo gets closer to the business entity facility, the office manager/receptionist may receive another system-enabled notification with sufficient anticipation and relevant preference information to have Jo' preferred drink freshly prepared and ready for his/her arrival. Moreover, as Jo arrives within a more precise proximity to the business entity facility, the automated doors may be unlocked via the System 200.

Core Communications 420 may comprise data related to the short-range communication of content/data between system components in proximity. Core Communications 420 may also involve the computer network communication of data via Actions 400 content processes. These Actions 400 objects/modules may be processed among various system components that may not be in proximity of a source device.

Furthermore, Core Communications 220 may be built in the Objective C programming language, leveraging the Core Location and Core Bluetooth frameworks provided by an operating system (OS). One of ordinary skill in the art understands that Core Communications 420 may be implemented in other languages/platforms as needed. Moreover, Core Communications 420 is designed to function with zero user interaction—the user may ignore their PCD and the Core Communications 420 may still function. One of ordinary skill in the art understands how a method using Core Communications 420 may be activated and operated in the background of a PCD, for example. Moreover, Core Communications 420 may used any available peer-to-peer radio/wireless communications media on a device, such as Bluetooth™ Low Energy or Wi-Fi Direct. Other wireless media include, but are not limited to, infrared signals, acoustic signals, near-field communications (NFC), inductive coupling, and the like.

Processing Logic and Data 230 content/data of System 200 may be a multipurpose and special purpose module configured to manage the access, storage, handling, maintenance, management, etc. of proprietary data in, and third-party data functionally related and accessible by, System 200. Processing Logic and Data 230 may comprise various operational data stores providing information for analytics, troubleshooting, customer service and various other business processes.

Processing logic and data 230 may comprise the server components of system 200. Most or almost all data used by the system 200 is stored in this tier and retrieved by the core 220 for use by apps 210. This data is accessed using typical client to server techniques in computer programming, such as an application programming interface (API) or a direct database call using sequential query language (SQL) or similar methods/techniques. Any business application logic that cannot be implemented in the system 200 or apps 210 may also be implemented in the processing logic and data modules 230. For example, an operation requiring complex data processing may be better implemented in this tier due to the availability of faster processing capability of a server versus the slower processing capability of a mobile device.

Figure 2:
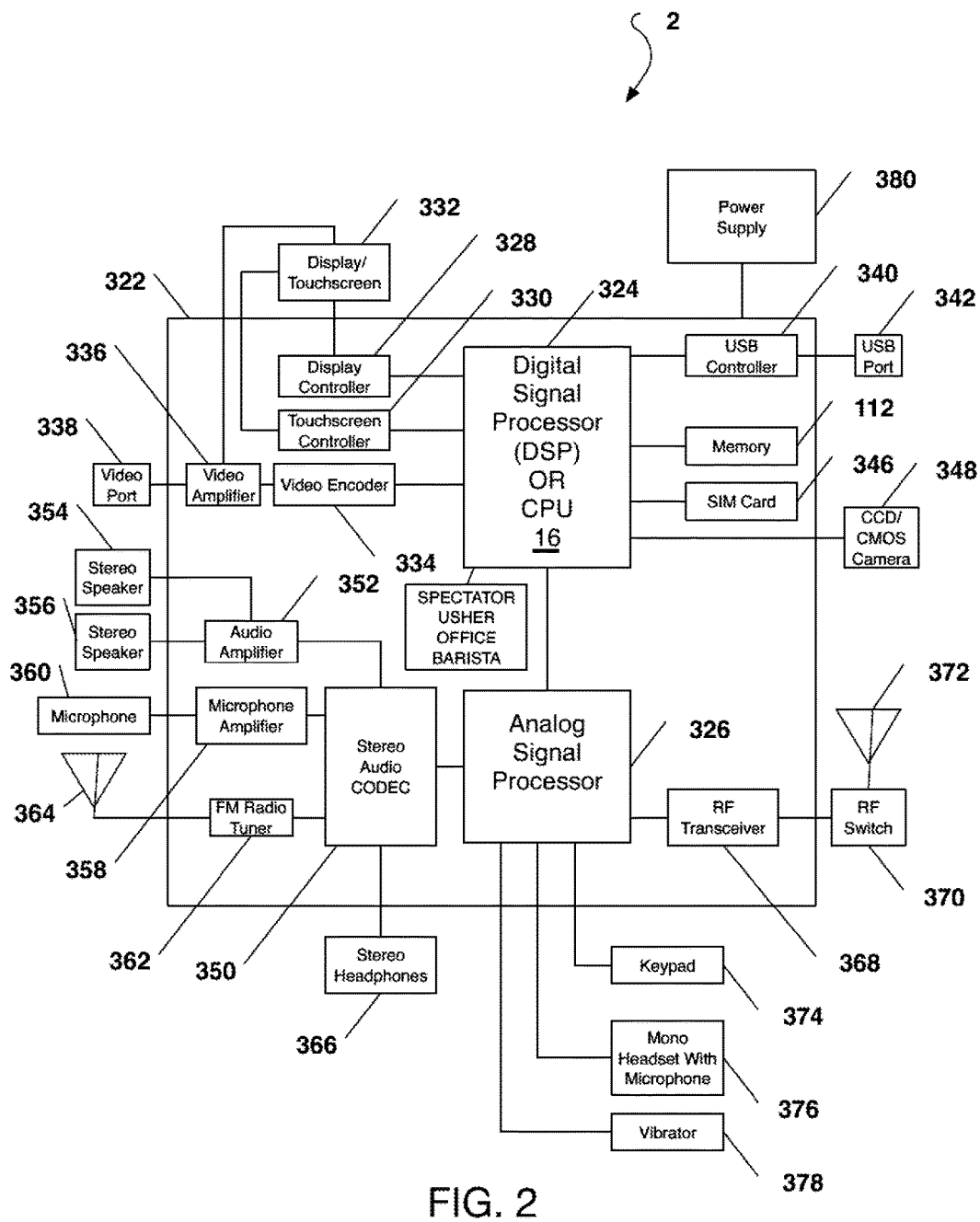
FIG. 2 is a functional block diagram of one embodiment of a portable computing device associated with any component of the system.

FIG. 2 is a functional block diagram of one exemplary embodiment of a PCD associated with any component of the system of the present disclosure. PCD 2 comprises an on-chip system 322 that includes a digital signal processor or a central processing unit 324 and an analog signal processor 326 that are coupled together. A display controller 328 and a touchscreen controller 330 are coupled to the digital signal processor 324. A touchscreen display 332 external to the on-chip system 322 is coupled to the display controller 328 and the touchscreen controller 330.

A video encoder 334, e.g., a phase-alternating line ("PAL") encoder, a sequential couleur avec memoire ("SECAM") encoder, a national television systenn(s) committee ("NTSC") encoder or any other video encoder, is coupled to the digital signal processor 324. Further, a video amplifier 336 is coupled to the video encoder 334 and the touchscreen display 332. A video port 338 is coupled to the video amplifier 336. As depicted in FIG. 2, a universal serial bus ("USB") controller 340 is coupled to the digital signal processor 324. Also, a USB port 342 is coupled to the USB controller 340. A memory 112 and a subscriber identity module ("SIM") card 346 may also be coupled to the digital signal processor 324.

A digital camera 348 may be coupled to the digital signal processor 324. In an exemplary aspect, the digital camera 348 is a charge-coupled device ("CCD") camera or a complementary metal-oxide semiconductor ("CMOS") camera.

A stereo audio CODEC 350 may be coupled to the analog signal processor 326. Moreover, an audio amplifier 352 may be coupled to the stereo audio CODEC 350. In an exemplary aspect, a first stereo speaker 354 and a second stereo speaker 356 are coupled to the audio amplifier 352.

A microphone amplifier 358 may be also coupled to the stereo audio CODEC 350. Additionally, a microphone 360 may be coupled to the microphone amplifier 358. In a particular aspect, a frequency modulation ("FM") radio tuner 362 may be coupled to the stereo audio CODEC 350. Also, an FM antenna 364 is coupled to the FM radio tuner 362. Further, stereo headphones 366 may be coupled to the stereo audio CODEC 350.

A radio frequency ("RF") transceiver 368 may be coupled to the analog signal processor 326. An RF switch 370 may be coupled to the RF transceiver 368 and an RF antenna 372. The RF transceiver 368 may communicate with conventional communications networks as well as with global positioning system ("GPS") satellites in order to obtain GPS signals for geographical coordinates.

A keypad 374 may be coupled to the analog signal processor 326. Also, a mono headset with a microphone 376 may be coupled to the analog signal processor 326. Further, a vibrator device 378 may be coupled to the analog signal processor 326. A power supply 380 may be coupled to the on-chip system 322. In a particular aspect, the power supply 380 is a direct current ("DC") power supply that provides power to the various components of the PCD 2 that require power. Further, in a particular aspect, the power supply is a rechargeable DC battery or a DC power supply that is derived from an alternating current ("AC") to DC transformer that is connected to an AC power source.

The touchscreen display 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In an exemplary embodiment, one or more objects, applications, programs, system processes, method steps, etc. of the system of the present disclosure may be stored in the memory 112 as computer program instructions. These instructions may be executed by the digital signal processor or central processing unit 324, the analog signal processor 326, or another processor, to perform as described herein. Further, the processors, 324, 326, the memory 112, the instructions stored therein, or a combination thereof may serve as a means for performing one or more of the method steps described herein. In one exemplary embodiment related to the system architecture of FIG. 1, the PCD 2 may execute, at least partially, one or more of Apps 210, Core 220 and/or Processing Logic and Data 230, such as, but not limited to, Spectator 240, Usher 250, Office 260, Barista 270, Venues 280, Registrations 290, Entities 410, and Core Communications 420. These modules are represented by labeled rectangular box 16 and they may comprise hardware and/or software. Apps 210, Core 220 and/or Processing Logic and Data 230, such as, but not limited to, Spectator 240, Usher 250, Office 260, Barista 270, Venues 280, Registrations 290, Entities 410, and Core Communications 420 may reside in memory 112 and may be executed by the DSP or CPU 324.

Figure 3:
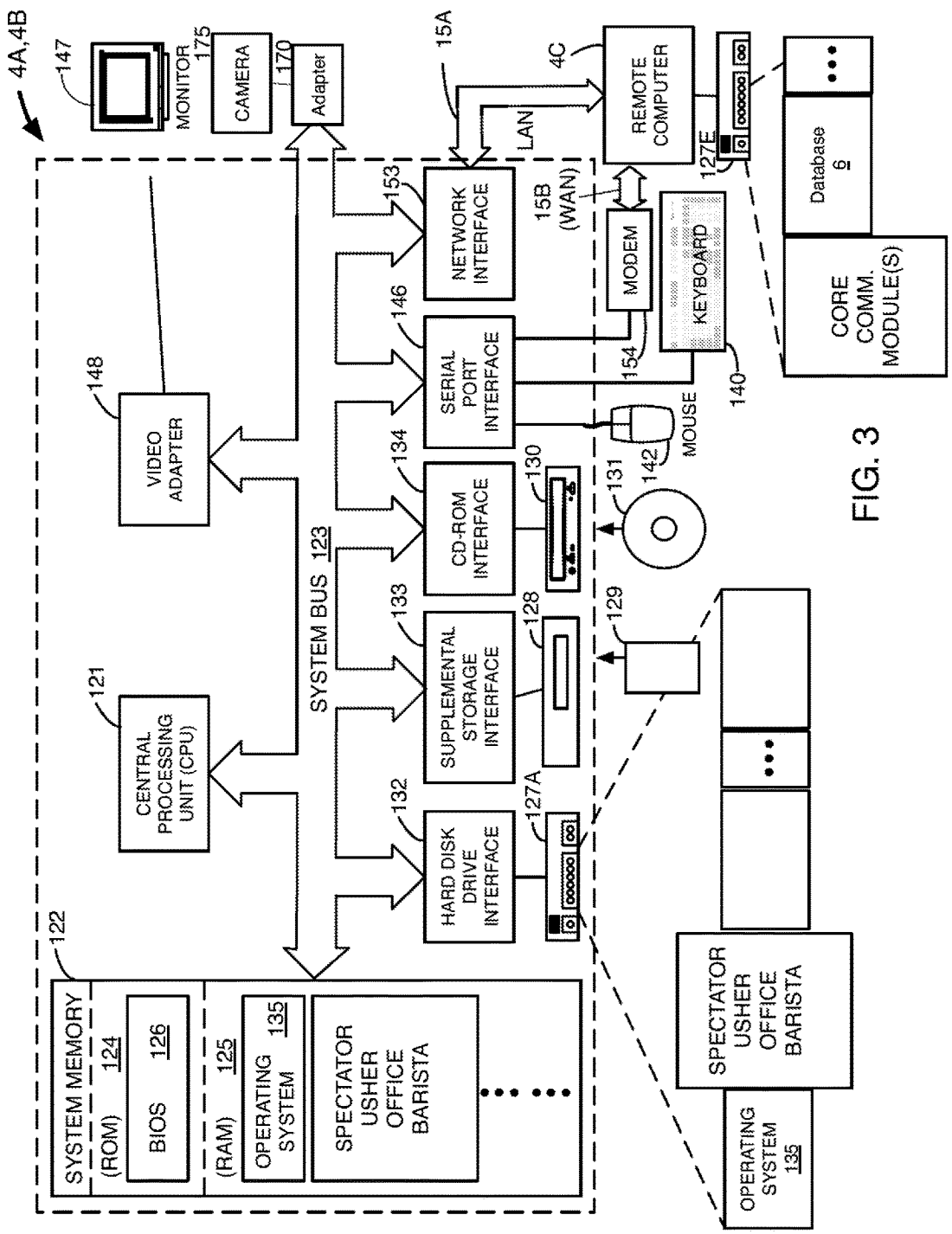
FIG. 3 is a functional block diagram of one embodiment of a communications-network enabled server associated with any component of the system.

FIG. 3 is a functional block diagram of one embodiment of a communications-network enabled server (the "Server") associated with any component of the system of the present disclosure. One of ordinary skill in the art understands that the written description associated with FIG. 3 may be applicable to any system component described as running system content, applications, tiers, programs, process flows, methods, etc.

Server 540 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within computer 120, such as during start-up, is stored in ROM 124.

Server 540 may include a hard disk drive 127 A for reading from and writing to a hard disk, not shown, a supplemental storage drive for reading from or writing to a removable supplemental storage 129 (like flash memory and/or a USB drive) and an optical disk drive 130 for reading from or writing to a removable optical disk 131 such as a CD-ROM or other optical media. Hard disk drive 127 A, magnetic disk drive 128, and optical disk drive 130 are connected to system bus 123 by a hard disk drive interface 132, a supplemental storage drive interface 133, and an optical disk drive interface 134, respectively.

Although the exemplary environment described herein employs hard disk 127A, removable magnetic disk 129, and removable optical disk 131, it should be appreciated by those skilled in the art that other types of computer readable media which may store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet connected devices such as in PCD 2 and/or personal digital assistants (PDAs).

The drives and their associated computer readable media provide nonvolatile storage of computer-executable instructions, data structures, program modules, and other data for computer or client device 100A. A number of program modules may be stored on hard disk 127, magnetic disk 129, optical disk 131, ROM 124, or RAM 125, including, but not limited to, an operating system 135 and a wait time module 16. Program modules include routines, sub-routines, programs, objects, components, data structures, etc., which perform particular tasks or implement particular abstract data types. Aspects of the present invention may be implemented in the form of a downloadable, client-side, application modules 16 which are executed by Server 540 in order to provide enhanced services described above.

A user may enter commands and information into Server 540 through input devices, such as a keyboard 140 and a pointing device 142. Pointing devices may include a mouse, a trackball, and an electronic pen that may be used in conjunction with an electronic tablet. Other input devices (not shown) may include a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. As noted above, the display 147 may comprise any type of display devices such as a liquid crystal display (LCD), a plasma display, an organic light-emitting diode (OLEO) display, and a cathode ray tube (CRT) display.

The camera 175 may also be connected to system bus 123 via an interface, such as an adapter 170. As noted previously, the camera 175 may comprise a video camera such as a webcam. The camera 175 may be a CCD (charge-coupled device) camera or a CMOS (complementary metal-oxide-semiconductor) camera. In addition to the monitor 147 and camera 175, the client device 1 OOA, comprising a computer, may include other peripheral output devices (not shown), such as speakers and printers.

Server 540 may operate in a networked environment using logical connections to one or more remote computers, such as the web server 4C of FIG. 3 remote computer may be another personal computer, a server 540, a PCD 2, a router, a network PC, a peer device, or other common network node. While the web server 4C or a remote computer typically includes many or all of the elements described above relative to the client device 540, only a memory storage device 127E has been illustrated in FIG. 3. The logical connections depicted in FIG. 3 include a local area network (LAN) 15A and a wide area network (WAN) 15B. Such networking environments are commonplace in offices, enterprise wide computer networks, intranets, and the Internet.

When used in a LAN networking environment, Server 540 is often connected to the local area network 15A through a network interface or adapter 153. When used in a WAN networking environment, Server 540 typically includes a modem 154 or other means for establishing communications over WAN 158, such as the Internet. Modem 154, which may be internal or external, is connected to system bus 123 via serial port interface 146. In a networked environment, program modules depicted relative to the server 4C, or portions thereof, may be stored in the remote memory storage device 127E. It will be appreciated that the network connections shown are exemplary and other means of establishing a communications link between Server 540 and PCD 2 may be used.

Moreover, those skilled in the art will appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network. In a distributed computing environment, program modules may be located in both local and remote memory storage devices.

In one exemplary embodiment, one or more objects, applications, programs, system processes, method steps, etc. of the system of the present disclosure may be stored in the memory 112 as computer program instructions. In one exemplary embodiment related to the system architecture of FIG. 1, the Server 540 may execute, at least partially, one or more of Apps 210, Core 220 and/or Processing Logic and Data 230, such as, but not limited to, Actions 400.

Figure 4:
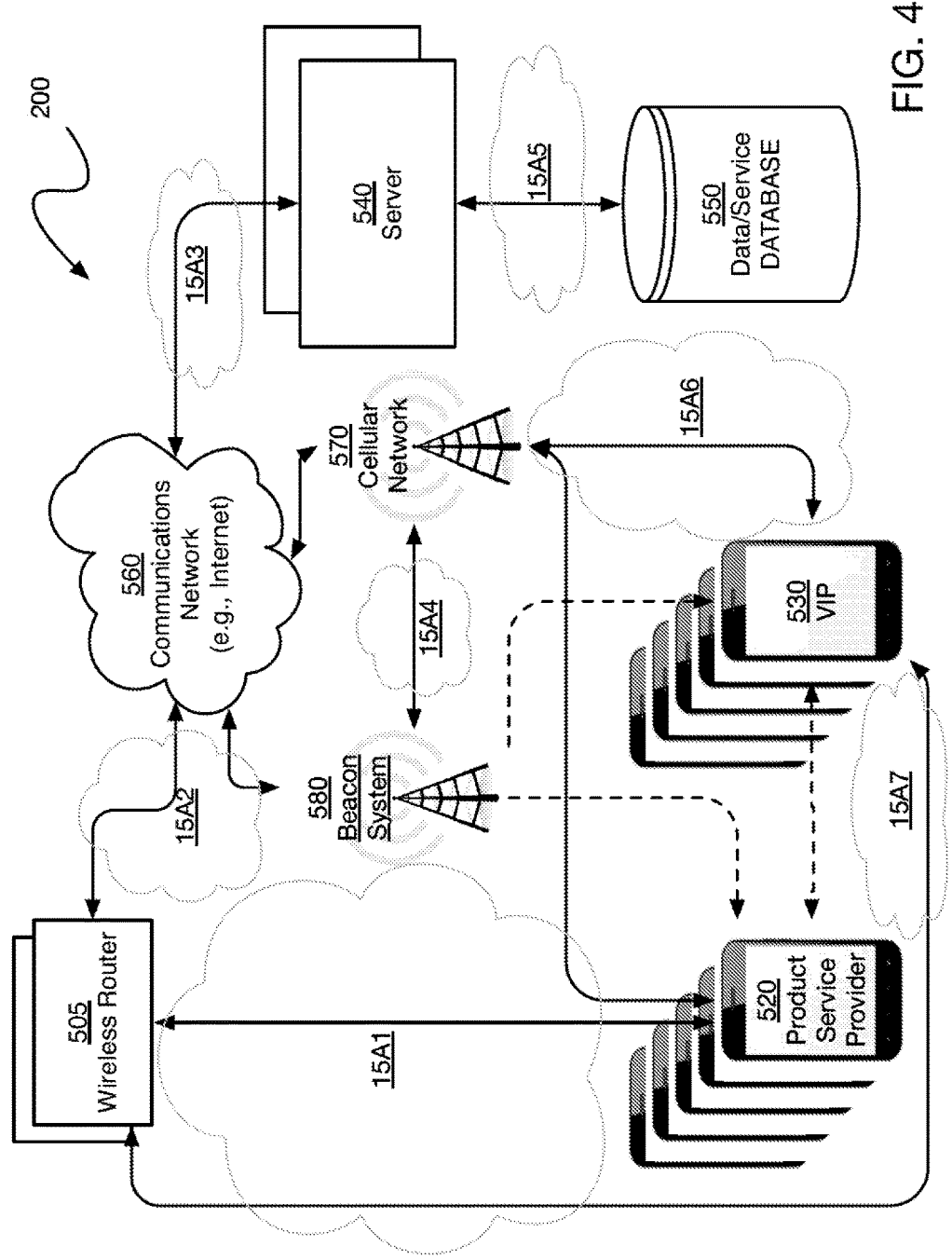
FIG. 4 is a high level block diagram of one exemplary embodiment of the system with its components spread out over a communications network.

FIG. 4 is a high level block diagram of one exemplary embodiment of certain system components spread out over an exemplary communications network. The exemplary system architecture of System 200 of FIG. 1, or any other embodiment, may be distributed among the system components Target PCD 520, VIP PCD 530, Server 540, and Data/Service DATABASE 550. System 200 may include the communications-network components Wireless Router 505, internet communications-network 560, Cellular Network 570, and Beacon System 580. System 200 may be used to build any use case (described in greater detail herein) that involves the sharing of identity and preference data with proximate and non-proximate devices and systems.

More specifically, Target PCD 520 and VIP PCD 530 may be PCDs such as iPhones and iPads sold by APPLE™, Inc. of California, or Surface Tablets sold by MICROSOFT™. Target PCD 520 and VIP PCD 530 may also be a point-of-sale (POS) custom system such as those sold by IBM™ or facilitated by SQUARE™. Server 540 may be an Apple Mac OS X Server™ or a more complex sub-system within System 200 made up of both hardware and software.

System 200 components may comprise a communications-network 15A that may include, but is not limited to, Wireless Router 520, Cellular Network 570, Beacon System 580, Internet Communications Network 560, or any other wired or wireless communications links, network routers, switches, processors, relays, transmitters, broadcasters, etc. Wireless communication links may include, but are not limited to, radiofrequency ("RF") links, such as, BLUETOOTH™ RF links, WIFI™ RF links, as well as infrared links, acoustic links, and other wireless mediums. Each of these elements may be coupled to one another through a computer communications network. The computer communications network 15A may comprise a wide area network ("WAN"), the plain-old-telephone system ("POTS), a local area network ("LAN"), the Internet, or any combination of these and other networks.

In one exemplary embodiment, System 200 may comprise a Beacon System 580 configured to bi-directionally communicate with either VIP PCD 530 and Target PCD 520. The smart beacon system may also be configured to bi-communicatively communication with the other system components. By leveraging the multi-purpose and special purpose beacon system, System 200 may be configured to triangulate the proximity of VIP PCD 530 and/or Target PCD 520 from each other and from certain predefined locations (described in greater detail herein). One of ordinary skill in the art understands that similar triangulation and/or geolocation functions are possible with various Wireless Routers 505 and/or with Cellular Network 570. Moreover, VIP PCD 530 and/or Target PCD 520, with their processing and logic functions, may be actively involved in selectively regulating how device-to-device beaconing/communication is managed.

In one exemplary embodiment, any short-range proximity communications, such as Core Communications 420 between VIP PCD 530 and Target PCD 520, may involve a complementary and/or supplementary server/communications network pathway running through Wireless Router 505, Internet Communications-Network 560, Cellular Network 570, etc. Even though the server/communications network pathway may be the preferred route for System 200 process flows, the bidirectional direct device-to-device connection may function as a back-up pathway. One of ordinary skill in the art understands that a Bluetooth transmission spectrum running at 2.5 GHz, for example, may become crowded, congested and latent. As such, direct device-to-device communications may be a limitation of System 200 if it weren't for back-up, back-end communication options.

Furthermore, via the communications network of FIG. 4, VIP PCD 530 and Target PCD 520 may initiate Core Communications 420 directly or indirectly with one another or with any other system component, such as Server 540. In one exemplary embodiment, Server 540 may manage and process certain messaging queue services for VIP PCD 530 and Target PCD 520, for example. Moreover, VIP PCD 530 and Target PCD 520 may recognize each other's proximity, and at least partially directly communicate. In this way, Server 540 may manage some VIP PCD 530 and Target PCD 520 communications. VIP PCD 530 and Target PCD 520 may also be in communication with one another, but that link may be at least partially facilitated by Server 540 and/or various other resource-rich system components.

Therefore, in one exemplary embodiment, System 200 may be configured to use the proximity data of VIP PCD 530 and/or Target PCD 520, and recognize if either is ever within a certain predefined location, or range. At the same time, System 200 may be configured to efficiently and effectively manage the resource demands (processing loads, energy consumption, continuous-background monitoring of processes, etc.) assigned to VIP PCD 530 and Target PCD 520. Moreover, VIP PCD 530, with or without an intermediate Server 540, may interact with Target PCD 520 to manage a digital authentication method. VIP PCD 530 may contain a private digital key (PKI) that is handled between VIP PCD 530 and Server 540. Server 540 may generate a public digital key that may be handled between Server 540 and Target PCD 520. Target PCD 520 may then authenticate the corresponding public key with the latest private key handled by VIP PCD 530.

Data/Service DATABASE 550 may comprise a set of databases that hold system content and data for the VIP PCD 530, Target PCD 520, Server 540 or any other system component. The Data/Service DATABASE 550 may comprise a combination of a distributed file system. The Data/Service DATABASE 550 may be accessed via communications network 15A, Wireless Router 520, Cellular Network 570, Beacon System 580, Internet Communications-Network 560, or any other wired or wireless communications links, network routers, switches, processors, relays, transmitters, broadcasters, etc.

Figure 5:
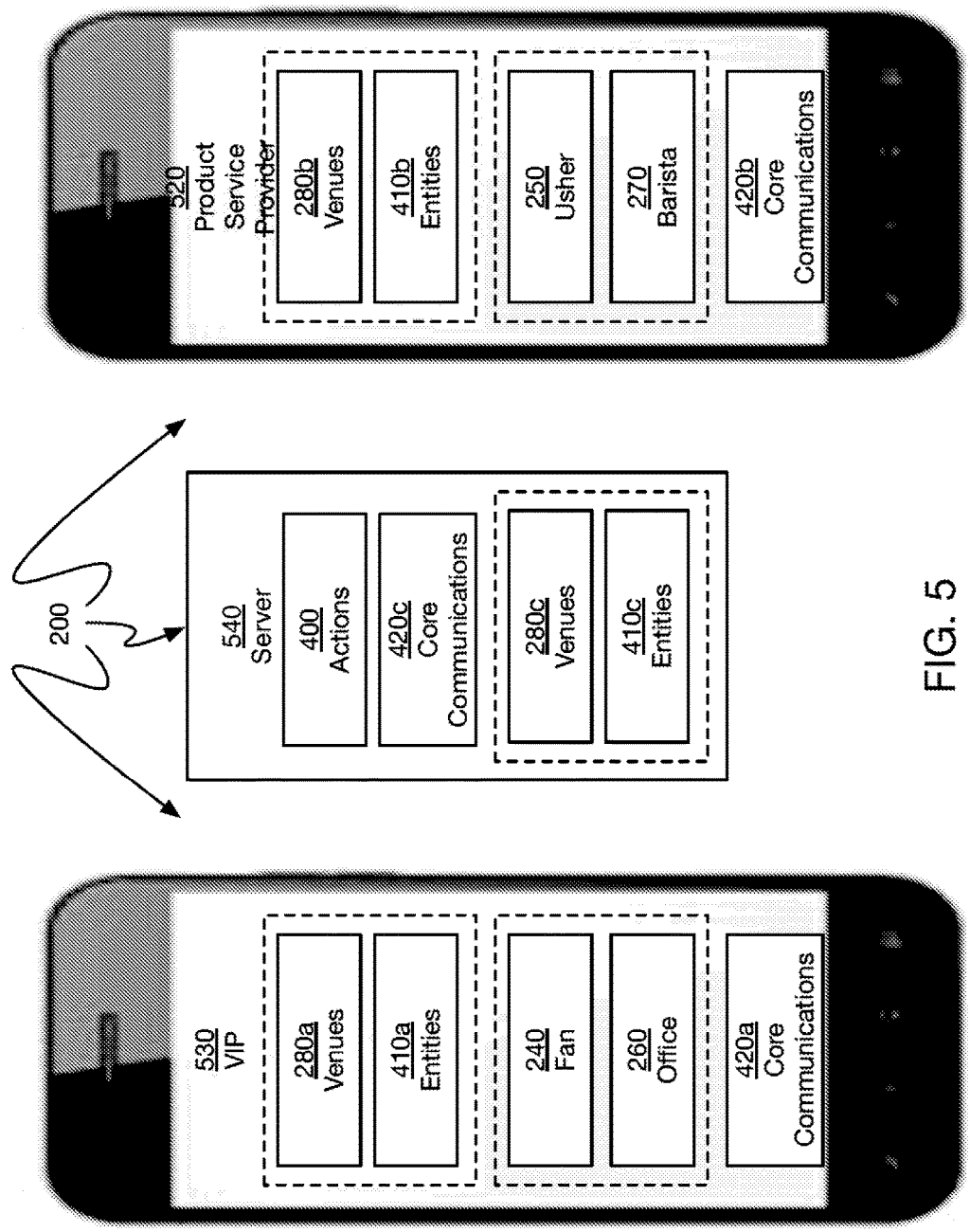
FIG. 5 is a block diagram of an exemplary embodiment of the system architecture of FIG. 1 utilizing the exemplary system components of FIG. 4.

FIG. 5 is a block diagram of an exemplary embodiment of the system architecture of FIG. 1 utilizing the exemplary system components of FIG. 4. The exemplary embodiment of System 200 is distributed among Target PCDs 520, VIP PCDs 530, and a Server 540. Certain objects/modules, sub-objects, content, process flows, etc. of Applications (Apps) 210, Core 220, and Processing Logic and Data 230 are distributed and processed across the System 200.

More specifically, in one exemplary embodiment, Venues 280 of Core 220 may be distributed across System 200 (Venues 280a on VIP PCD 530, Venues 280b on Target PCD 280b, and Venues 280c on the Server 540). In this way, Venues 280 content/data may be proactively, controllably managed and spread within System 200. Calendared meetings, scheduled entertainment, allotted periods of user time, and the temporal details of each (date, time, location) may be added, updated, and parsed across System 200 to facilitate the functions of other system components. A service provider associated with Product/Service Provider PCD 520 and specifically defined within Range Definitions 430, for example, may update meaningful fields of Venues 280 content/data (new location, new event time, for example) and this may be propagated as necessary across System 200.

Furthermore, Entities 410 of Core 220 (as illustrated in FIG. 1 described above) may be distributed across System 200 of FIG. 4 (Entities 410a on VIP PCD 530, Entities 410b on Product/Service Provider PCD 520, and Entities 410c on Server 540—SEE FIG. 5 for locations of these modules). In this way, Entities 410 content/data may be proactively, controllably managed and spread within System 200. Personal/Private information about a user associated with a VIP PCD 530, for example, may be added, updated, parsed, and securely sent across System 200.

Furthermore, Actions 400 of Core 220 may be primarily managed and processed on Server 540 of System 200 as illustrated in FIG. 5 described in more detail below. Actions 400 may, therefore, function on a middleman/broker and control Core Communications 420 between VIP PCD 530 and Product/Service Provider PCD 520. In this way, Actions 400 content/data may use the computer communications network of FIG. 4 and facilitate the managing and processing of certain messaging queue services for VIP PCD 530, Product/Service Provider PCD 520, and/or any other system component. Moreover, because Actions 400 content/data is associated with an event or occurrence that merits an action and/or trigger within System 200, Actions 400 may directly regulate the selective distribution of private/personal information between VIP PCD 530 and Product/Service Provider PCD 520. This also allows for any private/personal information that is projected from one object/module to another object/module (Entities 410a on VIP PCD 530 to Entities 420b on Product/Service Provider PCD 530, for example—see also FIG. 5) to be controllably removed/updated from content/data without removal from the entire system.

Furthermore, Core Communications 420 of Core 220 may be managed at every system component of System 200 (Core Communications 420a on VIP PCD 530, Core Communications 420b on Product/Service Provider PCD 520, and Core Communications 420c on Server 540). In this way, every system component may use short-range proximity-based communication pathways, or supplementary server/communications network pathways. On the other hand, in one exemplary embodiment, Actions 400 on Server 540 may process when and how Core Communications 420 operate among most system components.

Furthermore, Apps 210 may be distributed across System 200 (Spectator 240 & Office 260 on VIP PCD 530, and Usher 250 & Barista 270 on Product/Service Provider PCD 520—SEE FIG. 4). Spectator 240, Office 260, Usher 250, and Barista 270 are software application program modules built on top of Core 220 and Core Communications 420.

Office 260 on VIP PCD 530, and Barista 270 on Product/Service Provider PCD 520, are associated exemplary applications that may be configured to allow a user of VIP PCD 530 to have his/her favorite beverage prepared and waiting for a specific meeting. Office 260 and Barista 270 may use Core Communications 420 in both a cloud and device-to-device context. Office 260 and Barista 270 may also extend Core 220 objects/modules to contain a user preference for selecting his/her favorite beverage. Office 260 and Barista 270 may also use proximity-based short range communications—iBeacons, for example—for Core Communications 420 activation. Office 260 and Barista 270 may also extend the Core 220 objects/modules to manage events for meetings.

Spectator 240 on VIP PCD 530, and Usher 250 on Product/Service Provider PCD 520, are associated exemplary applications configured to replace traditional barcode-based paper or mobile tickets. Spectator 240 and Usher 250 may integrate with a system that wirelessly transmits ticket data to a VIP PCD 530 upon arrival to a ticket processing location associated with Product/Service Provider PCD 520. Spectator 240 and Usher 250 may use Core Communications 420 in a device-to-device context. Spectator 240 and Usher 250 may also use location data for activating Core Communications. Spectator 240 and Usher 250 may also extend the Core 220 objects/modules to manage sporting event tickets.

Figure 6:
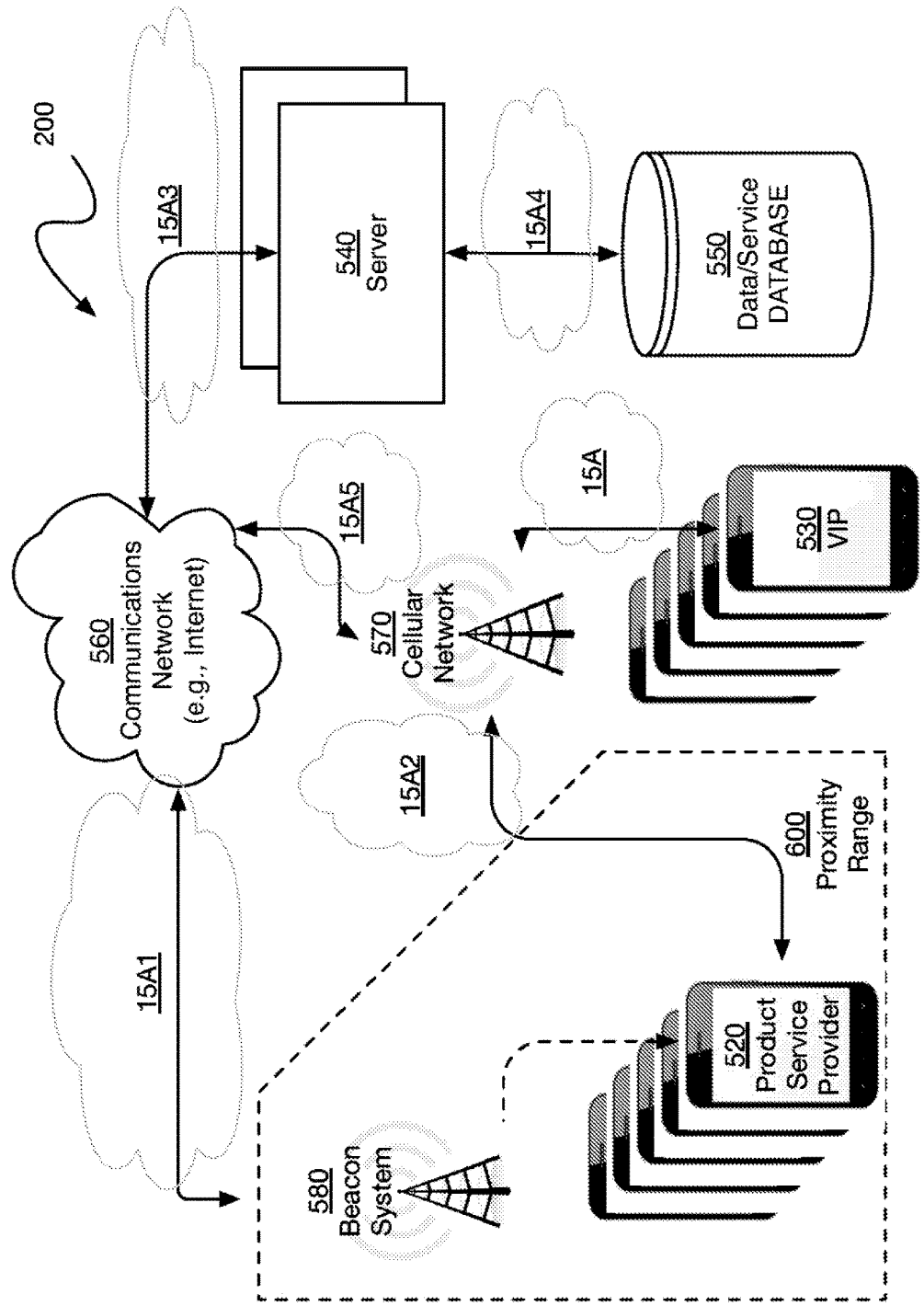
FIG. 6 is a block diagram of the exemplary embodiment of FIG. 5 in an exemplary starting geo-spatial configuration with certain communications pathways emphasized.

FIG. 6 is a block diagram of the exemplary embodiment of FIG. 5 in an exemplary starting geo-spatial configuration with certain communications pathways emphasized. VIP PCD 530 may be linked via Cellular Network 570 to the other System 200 components, such as Product/Service Provider PCD 520 and Server 540. Although VIP PCD 530 may be currently leveraging short-range proximity communications (Bluetooth headphones or other similar third-party products/services, for example), Core Communications 420 are not currently activated for purposes of System 200. Nonetheless, VIP PCD 530 may still be actively exchanging certain types of content/data with any System 200 component or any other third-party device/system.

VIP PCD 530 may have Apps 210 installed and actively running, and may be holding and processing Core 220 content/data. Apps 210 may be running in the background and leveraging certain PCD processes, such as GPS readings and Bluetooth connection/communication requests. VIP PCD 530, however, is not currently expending significant resources for purposes of Core Communication 420. VIP PCD 530 may not even be actively broadcasting to establish short-range communications.

Apps 210 installed on VIP PCD 530 may be associated with Apps 210 installed and running on Product/Service Provider PCD 520. Like VIP PCD 530, Product/Service Provider PCD 520 may be linked via Cellular Network 570. Product/Service Provider PCD 520 may have Apps 210 installed and actively running, and may be holding and processing at least partially Core 220 content/data. Apps 210 may be running in the background and leveraging certain PCD processes, such as GPS readings and Bluetooth connection/communication requests. Although Product/Service Provider PCD 520 is not currently expending significant resources for purposes of Core Communication 420, Product/Service Provider PCD 520 may be actively participating with Beacon System 580 to manage a Proximity Range 600.

Proximity Range 600 may comprise one exemplary embodiment of the geo-spatial area wherein Core Communications 420 may be activated/triggered between VIP PCD 530, Product/Service Provider PCD 520, and/or Server 540. Proximity Range 600 may be defined as a geofence around a set of GPS coordinates with a radius configurable in distance measured in feet. Moreover, Proximity Range 600 may be a sub-location within a larger Proximity Range.

Geofence ranges may comprise a circular area designated by global positioning system (GPS) coordinates and they may have a radius measured in meters. Geofence ranges may be manually expanded or modified by updating the definition in a venue object of system 200. Geofence ranges are used by apps 210 in ways that are defined by the mobile device operating system. For example, iPhone provides an application programming interface (API) to instruct the operating system to monitor the device location and to notify the application if the device enters a defined geofence. Android and other mobile operating systems provide similar functionality as of this writing and as understood by one of ordinary skill in the art.

Proximity Range 600 may be generated and managed by Core 220 and, therefore, System 200 may govern the activation of Core Communications 420 between Product/Service Provider PCD 520 and/or VIP PCD 530. This may provide fine-grained control over how and when Core Communications 420 is activated. Core Communications 420 may be set up to activate whenever VIP PCD 530 enters Proximity Range 600. Core Communications 420 may also be set up to deactivate whenever VIP PCD 530 exits Proximity Range 600.

Core Communications 420 is activated by programmatically instructing the mobile device operating system to being transmitting data or to stop transmitting data. This is accomplished by mobile device operating specific application programming interfaces (APIs) that control data transmission via Bluetooth, WiFi, and cellular radios. The activation of Core Communications 420 is able to consider location, proximity, time of day, and other contextual attributes that are configured as a series of rules depending on the requirements.

An exemplary rule may comprise certain conditions associated with a VIP PCD 530. For example, one rule may comprise conditions associated with outside environmental temperature and the proximity of the VIP PCD 530 relative to the product/service provider PCD 520. Specifically, if the outside temperature is above 75 degrees Fahrenheit and the VIP PCD 530 is within the proximity range 600, then the system 200 may issue a command to the product/service provider PCD 520 to prepare an ice-cold beverage that is specified in the preferences data for the account associated with the VIP PCD 530. So if the preferences data specifies that the account holder likes an ice-cold cola drink on a hot day, then this rule may trigger the system 200 to issue a message to the product/service provider PCD 520 to prepare this specific, preferred ice-cold beverage for the account holder.

In one exemplary embodiment, when System 200 regulates (i.e. activates and deactivates) core communications 440 according to a set of configured rules (i.e., ice-cold beverage rule noted above), System 200 may take into consideration the date and/or time of a meaningful system events, scheduled system service interactions, etc. In one exemplary embodiment, System 200 may be configured to determine whether VIP PCD 530 entered or exited Proximity Range 600, but only if there is an imminent, meaningful event, service interaction, experience, etc. scheduled. Moreover, System 200 may be configured to determine exactly when to activate/deactivate Core Communications 420 based on a number of other inputs that allow for multiple services to be delivered. Therefore, System 200 may be configured to provide a high level of flexibility for any use case of the system and method of the present disclosure (described in greater detail herein).

Figure 7:
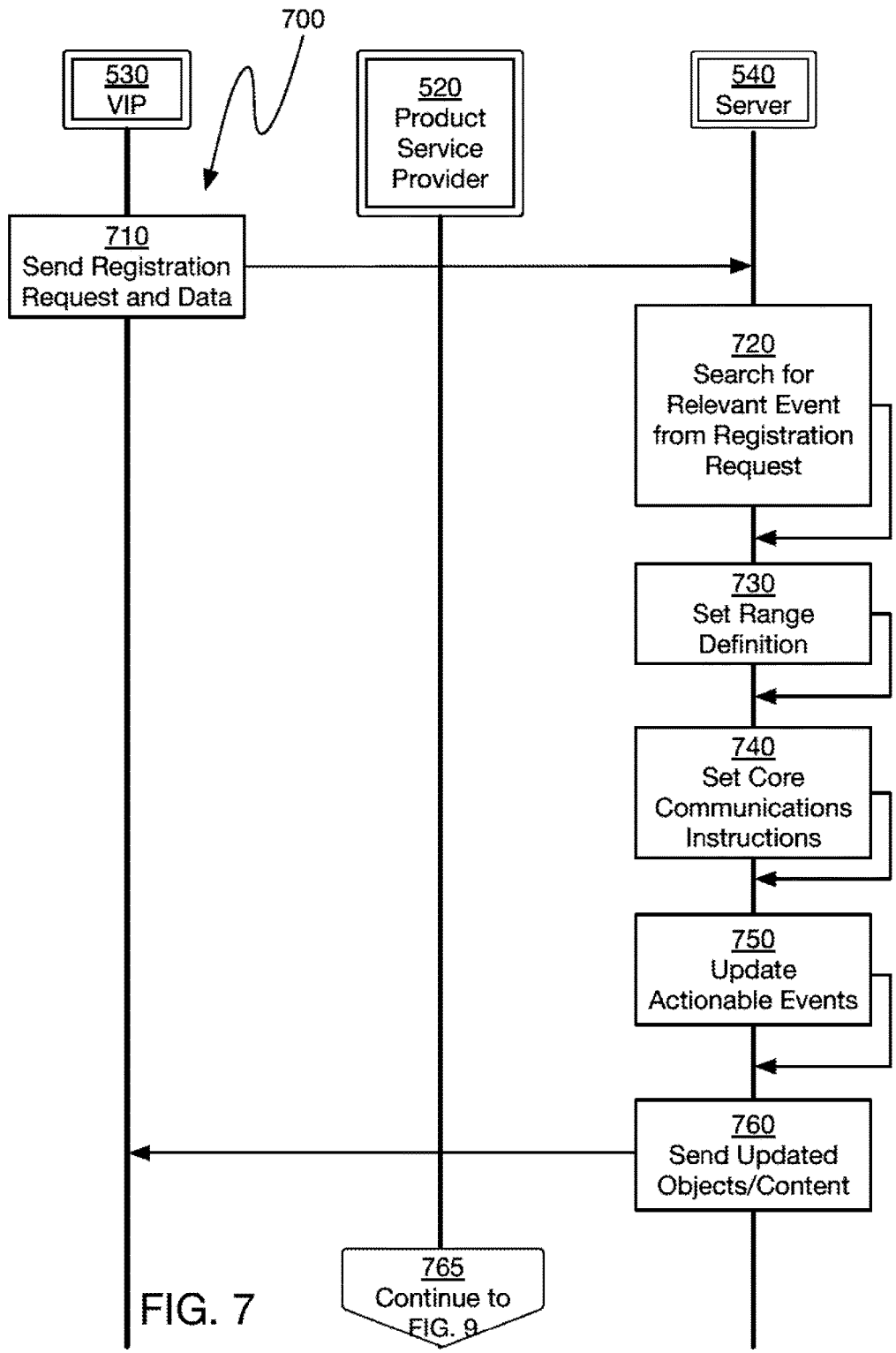
FIG. 7 is a flow chart of an exemplary method involving the Source, Target, and Server in the configuration of FIG. 6.

FIG. 7 is a flow chart of an exemplary method involving the VIP PCD, Product/Service Provider PCD 520, and Server in the configuration of FIG. 6. At step 710 of exemplary method 700, VIP PCD 530 may send a registration request and data associated with an event over the internet communications network 560 (see FIGS. 4-6) to the server 540. In this one non-limiting embodiment, the event may be one where the user and a SP/Vendor PCD 520, associated with the Product/Service Provider PCD 520, is involved. A user of VIP PCD 530 may interact with Apps 210, such as Spectator 240 or Office 260, to register a forthcoming meaningful event, commercial interaction, and/or location between the user and the SP/Vendor PCD 520. Registration 290 and Entities 410*a* objects/modules on VIP PCD 530 and Entities 410*c* objects/modules on Server 540 may be defined and updated by these actions of the user.

Figure 19:
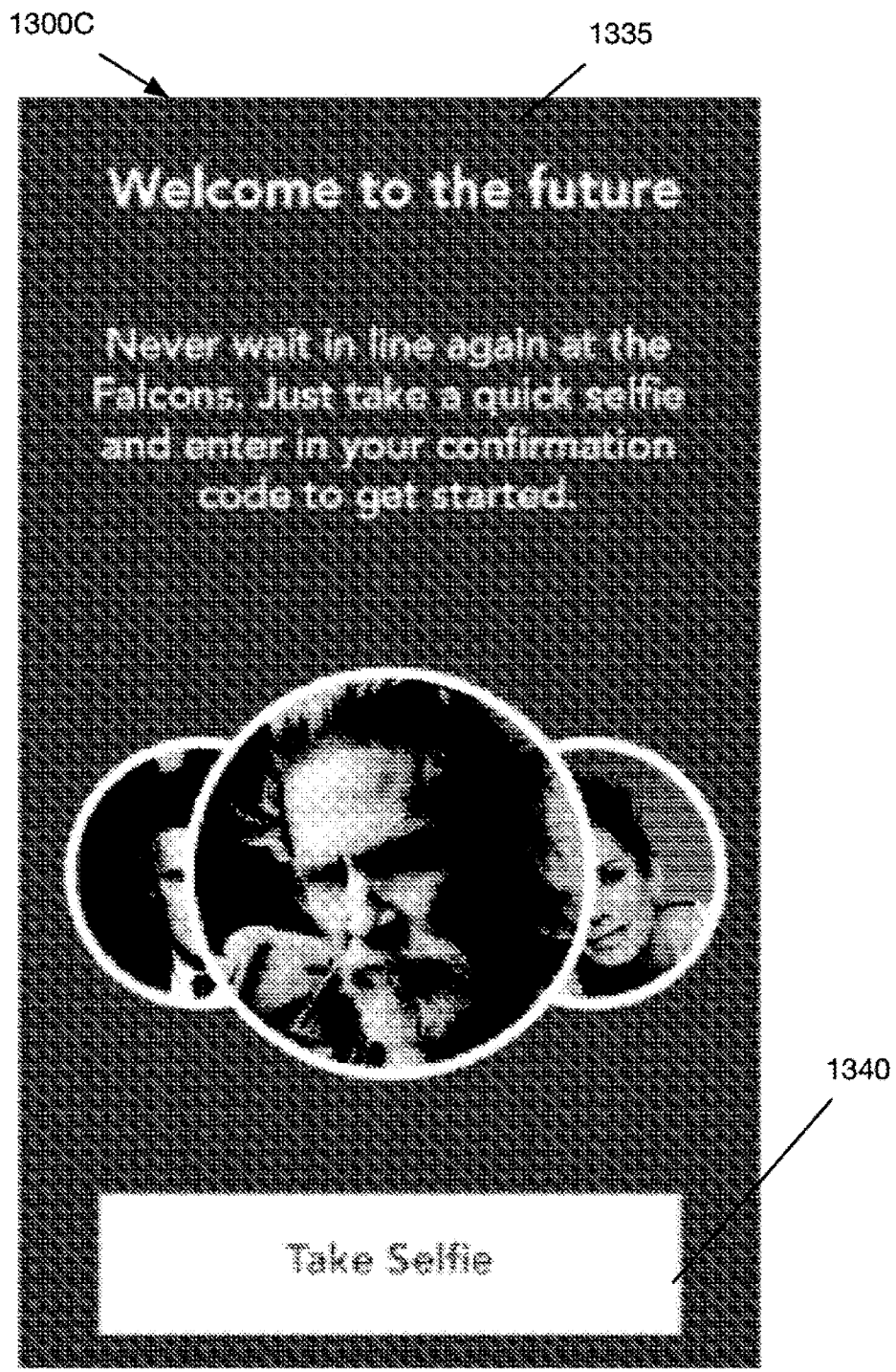
FIG. 19 is a screenshot of an exemplary first screen in the system application of FIG. 16.
Figure 20:
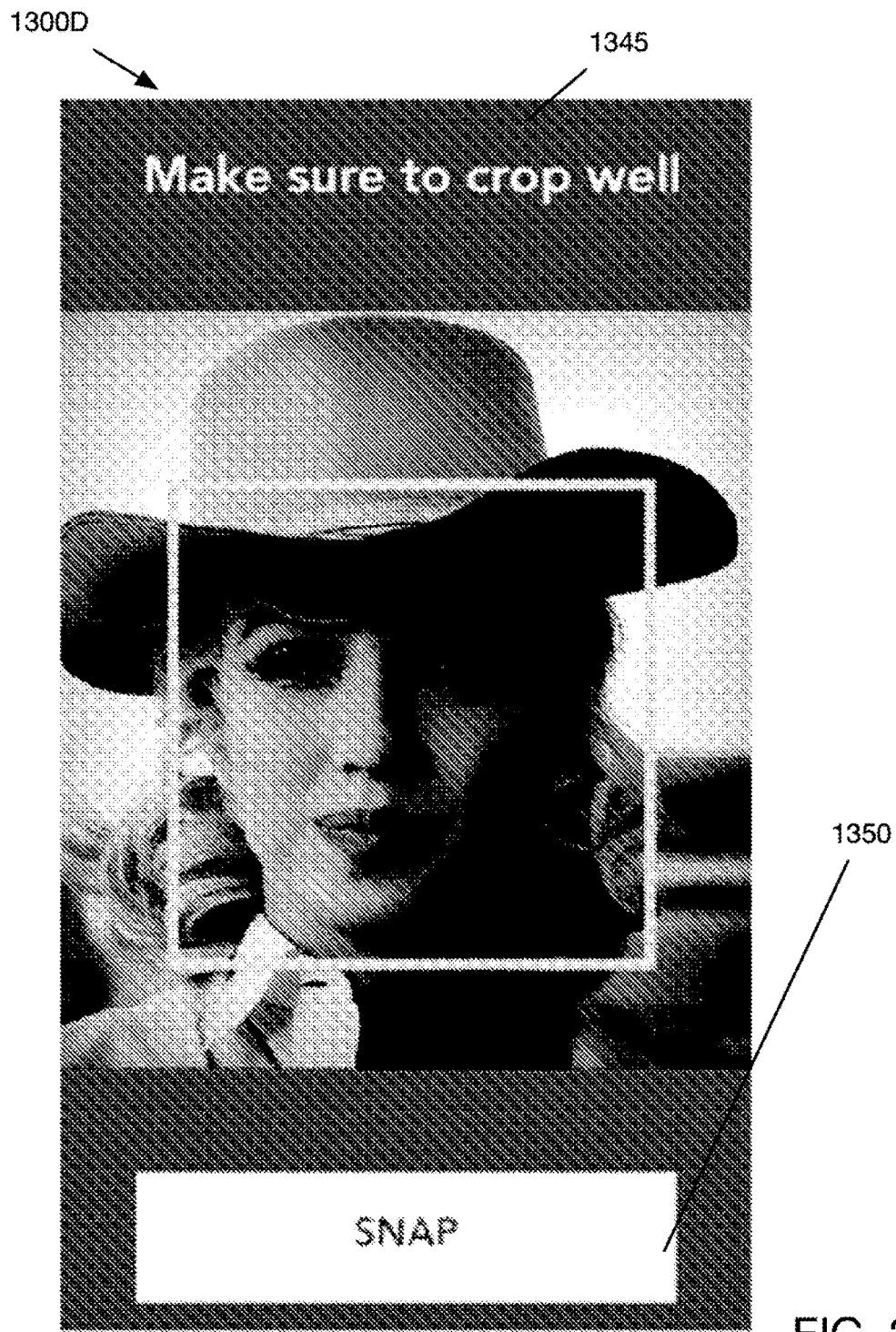
FIG. 20 is a screenshot of an exemplary second screen in the system application of FIG. 18 wherein the user can take an identification selfie.
Figure 21:
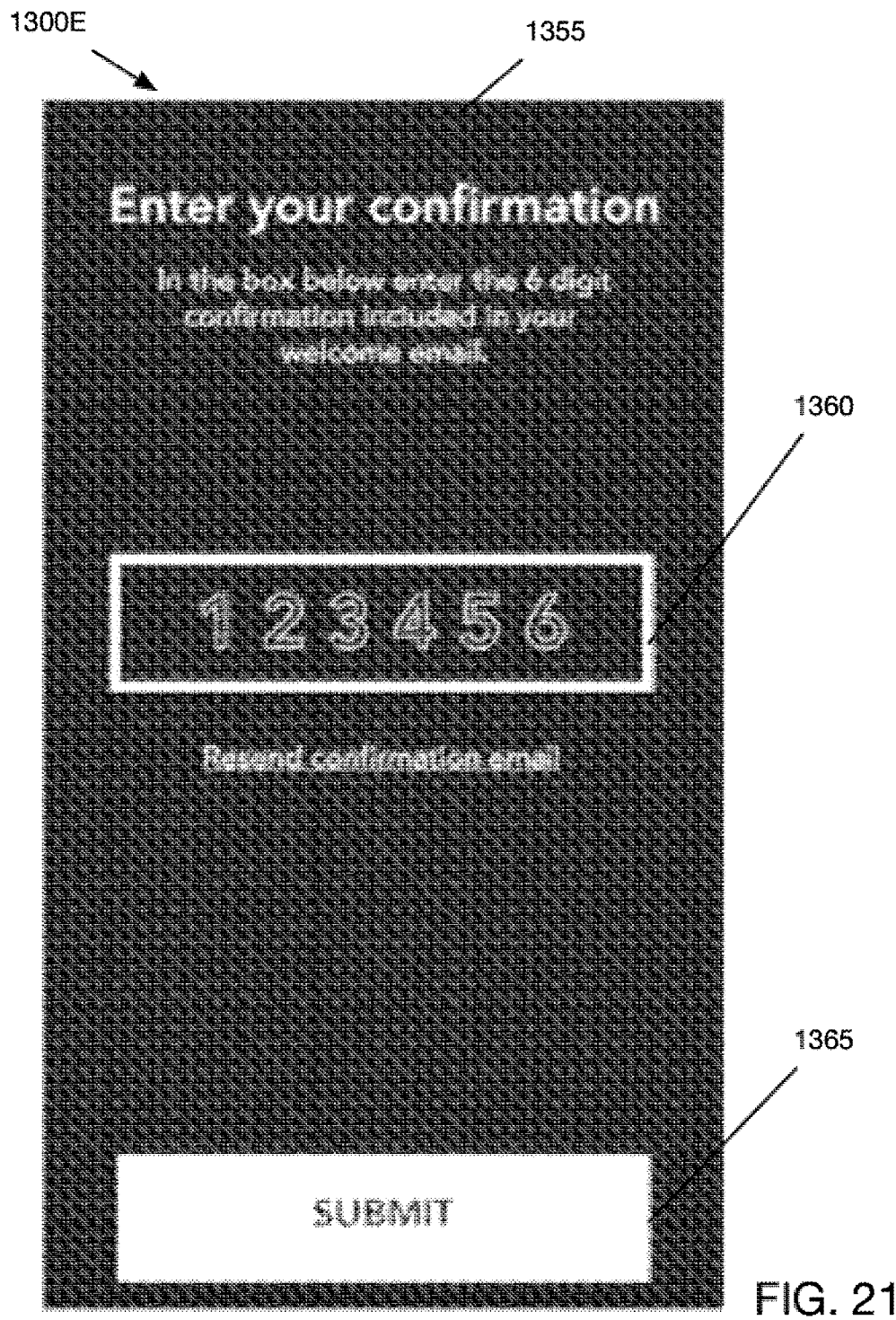
FIG. 21 is a screenshot of an exemplary third screen in the system application of FIG. 16 wherein the user can input the registration code of FIG. 15.

In one exemplary embodiment involving an exemplary use case described herein, Step 710 may correspond with a VIP PCD 530 executing a hypertext link 1315 (SEE FIG. 17) to a first screen 1335. The first screen 1335 may contain a hypertext link 1340 to an exemplary executable object configured to allow the user to take, save and implement an identification selfie (i.e. self portrait, self photograph) for his/her system account. Step 710 may also correspond with VIP PCD 530 executing a selfie object or an event confirmation object (SEE. FIGS. 19-21) which provide data, content, and information for Registration 290, Entities 410 (for example, Identification 500 and Actionable Events 510), and Venues 440 (for example, Core Communications Instructions 440) of Core 220.

At step 720, Server 540 may search through and process the content/data associated with the details of any relevant, meaningful event from the registration request and data sent from VIP PCD 530. In this one non-limiting embodiment, Server 540 may perform this step based at least in part on corresponding information about the supposed relevant, meaningful event included in Venues 280*c* on Server 540, for example. Venues 280*c* on Server 540 may have been previously updated when a SP/Vendor PCD 520 of Product/Service Provider PCD 520 interacted, for example, with Apps 210 like Usher 250 or Barista 270.

More specifically, at step 730, Server 540 may set/establish the proximity range 600 (see FIG. 6) which may comprise a range definition for the specific geo-spatial location associated with the event of step 710. That range definition may be associated with the third-party service provider, and/or Product/Service Provider PCD 520. In this one non-limiting embodiment, the range definitions of the proximity range 600 for the event of step 710 may be derived from pre-defined information obtained from the associated third-party provider. The third party provider may have previously provided the exact geo-coordinates of the VIP 530 for example. The third party provider may have provided this pre-defined information when they registered themself with the event via Product/Service Provider PCD 520, for example. This pre-defined information may have been defined and updated within Venues 280*b* on Product/Service Provider PCD 520 and, ultimately, pushed up to Venues 280*c* on Server 540. The range definitions may establish a Geofence Range 650 alongside a system-defined Proximity Range 600.

Furthermore, at step 740, Server 540 may set core communications instructions 460 (of Actions 400 of FIG. 1) and instructions 440 (of Venues 280 of FIG. 1) for how the system components, should interact/trigger, based on the set range definitions of step 730. In one exemplary embodiment, the core communications instructions 440, 460 for the event of step 710 may be derived from pre-defined information or recommendations obtained from the associated third party provider placed into the System 200 via the Product/Service Provider PCD 520, for example. In this way, Server 540 via the Actions 400 object/module may at least partially manage how Core Communications 420 operate, even though Core Communications 420 may be partially executed locally on VIP PCD 530 and Product/Service Provider PCD 520.

At step 750, Server 540 may define and/or update the actionable events or triggers for System 200. In one exemplary embodiment, the actionable events may be tailored for the specific VIP PCD 530 and third party provider associated with Entities 410*c* on Server 540, for example. In another exemplary embodiment, the actionable events may be general/standard and not specifically tailored for the specific VIP PCD 530 and SP/Vendor PCD 520. In this way, VIP PCD 530 and/or Service provider/Vendor PCD 520 may be configured via System 200 to trigger certain Core Communications 420 when Geofence Range 650 (SEE FIG. 8) and/or Proximity Range 600 is entered or exited by the specific user.

At step 760, Server 540 may send updated objects/modules and content/data to Service provider/Vendor 520 and VIP PCD 530. In one non-limiting embodiment, only VIP PCD 530 may be updated because Service provider/Vendor 520 may have no need for updated information just yet. For example, privacy concerns may require that System 200 intentionally leave Service provider/Vendor 520 without any indication of the specific VIP PCD 530 that registered. In another example, privacy concerns may require that System 200 only provide limited information/content to Service provider/Vendor 520, for purposes of preserving the VIP's identity but also purposes of allowing the Service provider/Vendor to adequately plan for the event. In another exemplary embodiment, both VIP PCD 530 and Service provider/Vendor 520 may be provided with the same magnitude of information.

Figure 8:
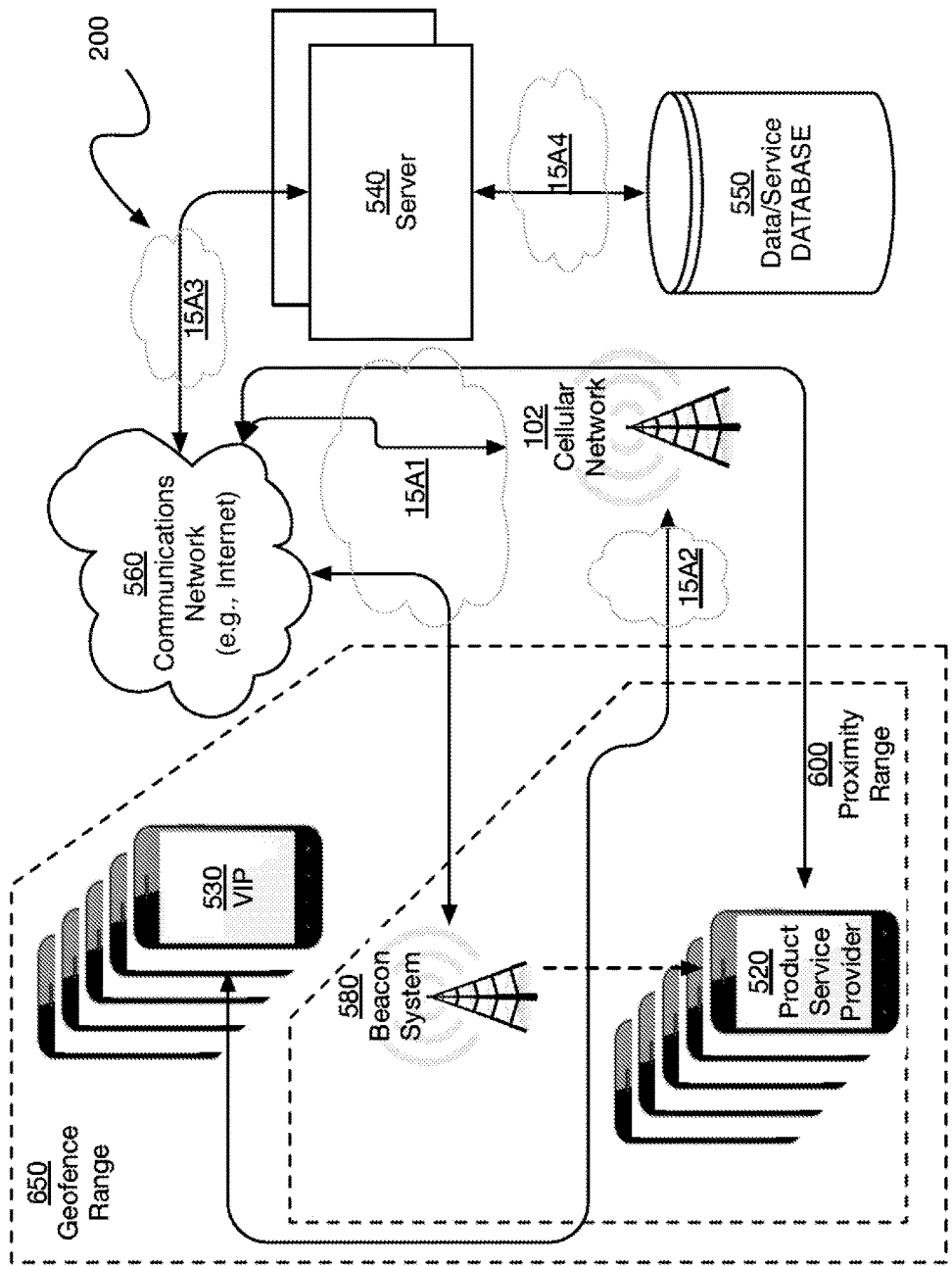
FIG. 8 is a block diagram of the exemplary embodiment of FIG. 5 in an exemplary intermediate geo-spatial configuration with certain communications pathways emphasized.

FIG. 8 is a block diagram of the exemplary embodiment of FIG. 5 in an exemplary intermediate geo-spatial configuration with certain communications pathways emphasized. As compared to FIG. 6, VIP PCD 530 may remain linked via Cellular Network 570 to the other System 200 components. Moreover, VIP PCD 530 may remain actively exchanging certain types of content/data with any System 200 component or any other third-party device/system.

Furthermore, as compared to FIG. 6, VIP PCD 530 has entered recently defined (step 730) Geofence Range 650 but not Proximity Range 600. VIP PCD 530, however, is not currently expending significant resources for purposes of Core Communication 420. VIP PCD 530 may not even be actively broadcasting to establish short-range proximity communications. VIP PCD 530, however, may be transmitting its current geolocation for purposes of System 200 triggers and, in one exemplary embodiment, for purposes of Core Communication Instructions 460 established in step 740.

Furthermore, as compared to FIG. 6, Service Provider/Vendor PCD 520 may remain linked via Cellular Network 570. Service Provider/Vendor PCT 520 is not currently expending significant resources for purposes of Core Communication 420. Product/Service Provider PCD 520 may remain actively participating with Beacon System 580 to manage Proximity Range 600.

Furthermore, because VIP PCD 530 has entered Geofence Range 650, System 200 may be configured to use the geolocation of VIP PCD 530 to determine whether to activate, even at least partially, Core Communications 420 in VIP PCD 530 and/or Product/Service Provider PCD 520. In one exemplary embodiment, System 200 may be configured to determine whether VIP PCD 530, having entered Geofence Range 650, is also indicating intent to also enter Proximity Range 600. System 200 may use various VIP PCD data, sensors, processor calculations, and user interactions, from any system component, to make such a determination.

For example, the system 200 may be configured to only activate core communications 420 once the VIP PCD 530 has passed through a series of Geofence Ranges 650 and Proximity Ranges 600. For instance, if a Geofence Range 650 were configured 5 miles around a specific location as defined by GPS coordinates, and another Geofence Range 650 were configured 2 miles around the same location, and a Proximity Range 600 was configured somewhere at the location, Core Communications 420 could be configured to only start when the VIP PCD 530 has entered both the Geofence Range 650 and the Proximity Range 600. This can be used to gain higher levels of assurance that a VIP PCD 530 is actually approaching a programmed/predetermined venue versus just happening to be near the venue location. This is particularly useful in high density places, such as, but not limited to, downtown areas and shopping malls.

Figure 9:
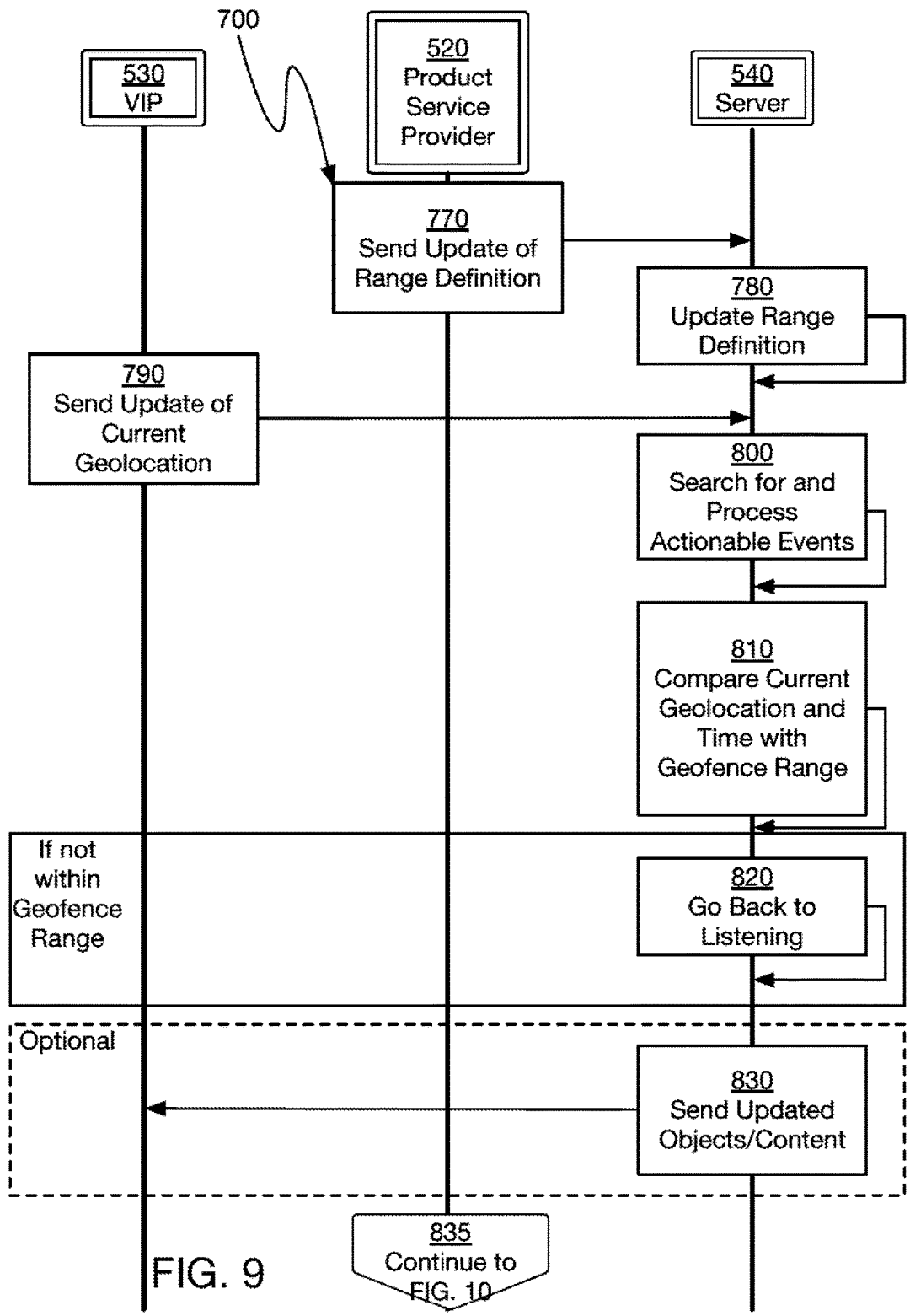
FIG. 9 is a continuation of the flow chart of FIG. 7 taking into consideration the configuration of FIG. 8.

FIG. 9 is a continuation of the flow chart of FIG. 7 taking into consideration the configuration of FIG. 8. At step 770 of exemplary method 700, Service provider/Vendor PCD 520 may send an update of range definitions associated with proximity range 600 and/or Geofence Range 650 for the specific geo-spatial location associated with the event of step 710 over the internet communications network 560 to server 540. This may be the result of the third party provider interacting with Product/Service Provider PCD 520 via Apps 210, such as Usher 250 and Barista 270. For purposes of FIG. 9, the updated range definition may only update the Geofence Range 650 (SEE FIG. 8).

At step 780, Server 540 may update the range definition for the relevant, meaningful event of step 710 based on the data received from the Service Provider/Vendor PCD 720 over the Internet communications network 560. In this one non-limiting embodiment, Server 540 may have to reprocess certain portions of steps 710-760.

At step 790, VIP PCD 530 may send an update of its current geo location over the Internet communications network 560 to Server 540. In one exemplary embodiment, VIP PCD 530 is periodically transmitting its geolocation via background services, such as map application running on the PCD 530. In another exemplary embodiment, step 790 may be the result of the user interacting with VIP PCD 530 via Apps 210 and responding to prompts. In this exemplary embodiment, the update of the user's current geolocation indicates to System 200, and to Server 540 in particular, that VIP PCD 530 is within Geofence Range 650 but not Proximity Range 600 (See FIG. 8).

At step 800, Server 540 may search through and process the actionable events/triggers, including those defined by step 750. In this exemplary embodiment, Server 540 may perform this step based at least in part on corresponding information included in Venues 280*c* and/or Entities 410*c* on Server 540, such as Core Communication Instructions 460.

At step 810, Server 540 may compare the current geolocation of VIP PCD 530 and time/date with Geofence Range 650. At step 820, if Server 540 determines at step 810 that VIP PCD 530 is not within Geofence Range 650 at the right time/date, then Server 540 may go back to actively listening/determining if VIP PCD 530 is within Geofence Range 650.

Optionally, at step 830, Server 540 may send updated objects/modules and content/data to the relevant System 200 components. In this one non-limiting embodiment, only VIP PCD 530 may be updated with the updated information associated with step 780. Product/Service Provider PCD 520, on the other hand, is not updated with the geolocation data associated with step 790. It may, however, be provided with a relative measure of VIP PCD 530's most current proximity even though VIP PCD 530 is not within Proximity Range 600.

Figure 10:
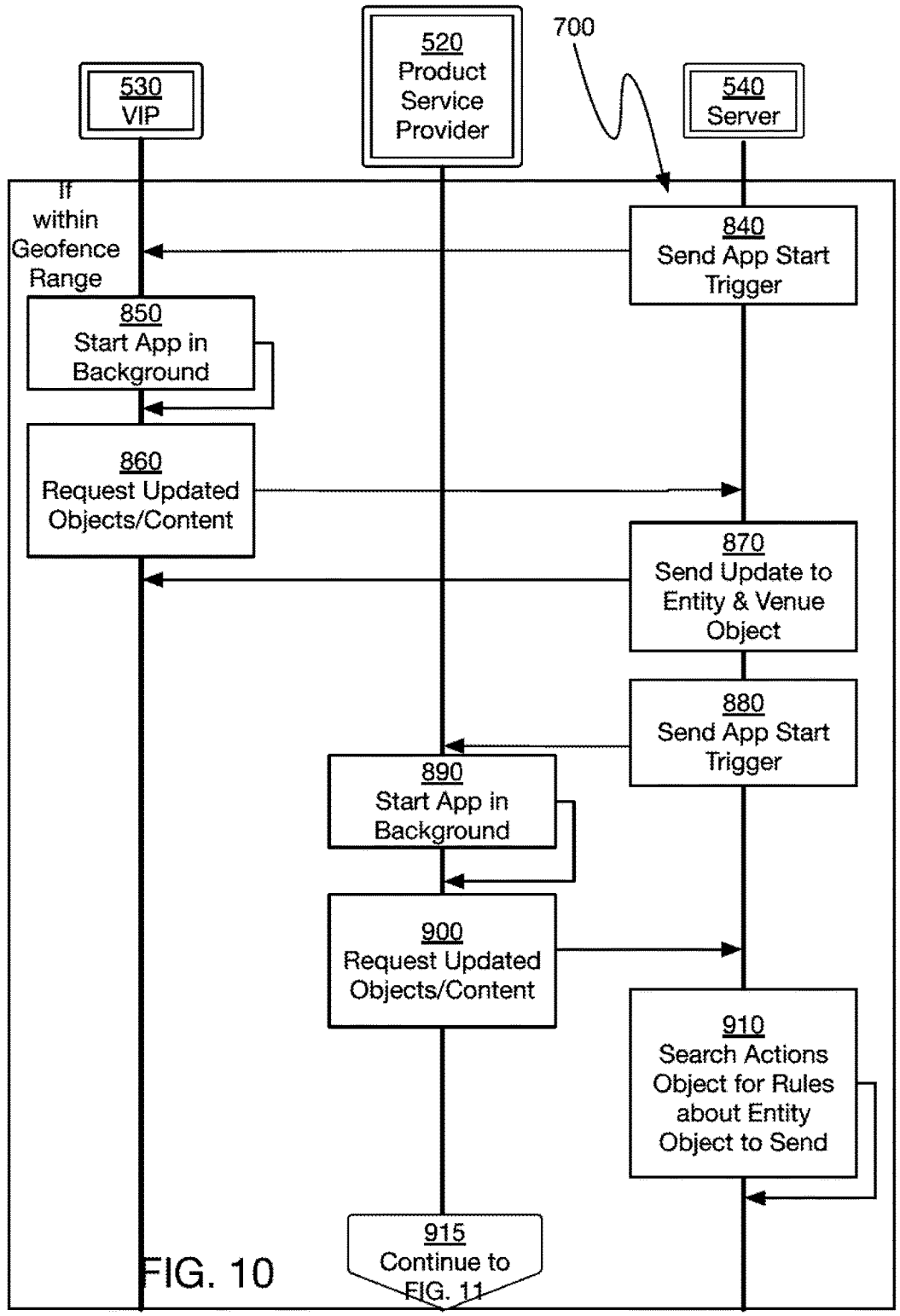
FIG. 10 is a continuation of the flow chart of FIG. 8.

FIG. 10 is a continuation of the flow chart of FIG. 9. At step 840 of exemplary method 700, if Server 540 determines at step 810 that VIP PCD 530 is within Geofence Range 650 at the right time/date, then Server 540 may send an application start trigger over the internet communications network 560 to VIP PCD 530. At step 850, the application start trigger received at VIP PCD 530 from over the Internet communications network 560 may activate further functionality in Apps 210 on VIP PCD 530, such as Spectator 240 or Office 260. For example, further functionality may include, but is not limited to being able to see a map specifically tracking the system users.

At step 860, VIP PCD 530 may request updated objects/modules and content/data from Server 540 and/or Product/Service Provider PCD 520. In one exemplary embodiment, in step 870, only Server 540 may respond over the Internet communications network 560 with the updated information associated with request step 860. Service Provider/Vendor PCD 520, even if capable of "seeing" VIP PCD 530 and its request, may allow Server 540 to function as a communications-broker/middle man (step 870) via the internet communications network 560. In this way, Service Provider/Vendor PCD 520 is configured to conserve resources (i.e. battery power for its PCD and/or CPU processing resources), and VIP PCD 530 is configured to effectively and efficiently communicate with a more reliable and resourceful communication's platform. In another exemplary embodiment, Product/Service Provider PCD 520 may at least partially communicate objects/modules and content/data to VIP PCD 530 directly over the Internet communications network 560 without using the server 540.

At step 880, if Server 540 determines at step 810 that VIP PCD 530 is within Geofence Range 650 at the right time/date, then Server 540 may send an application start trigger over the Internet communications network 560 to Service Provider/Vendor PCD 520. At step 890, the application start trigger may activate further functionality in Apps 210 on Service Provider/Vendor PCD 520, such as Usher 250 and Barista 270 running on PCD 520. At step 900, Service Provider/Vendor PCD 530 may request updated objects/modules and content/data from Server 540 and/or VIP PCD 530.

At step 910, because Server 540 determines at step 810 that VIP PCD 530 is within Geofence Range 650 at the right time/date, Server 540 may search the content/data of Core 220 for how to manage the geolocation trigger recognized at step 840. In this exemplary embodiment, Server 540 may perform this step based at least in part on personal/private preferences predefined by the user in Entities 410*c* on Server 540 and based on Core Communication Instructions 460 content/data.

Figure 11:
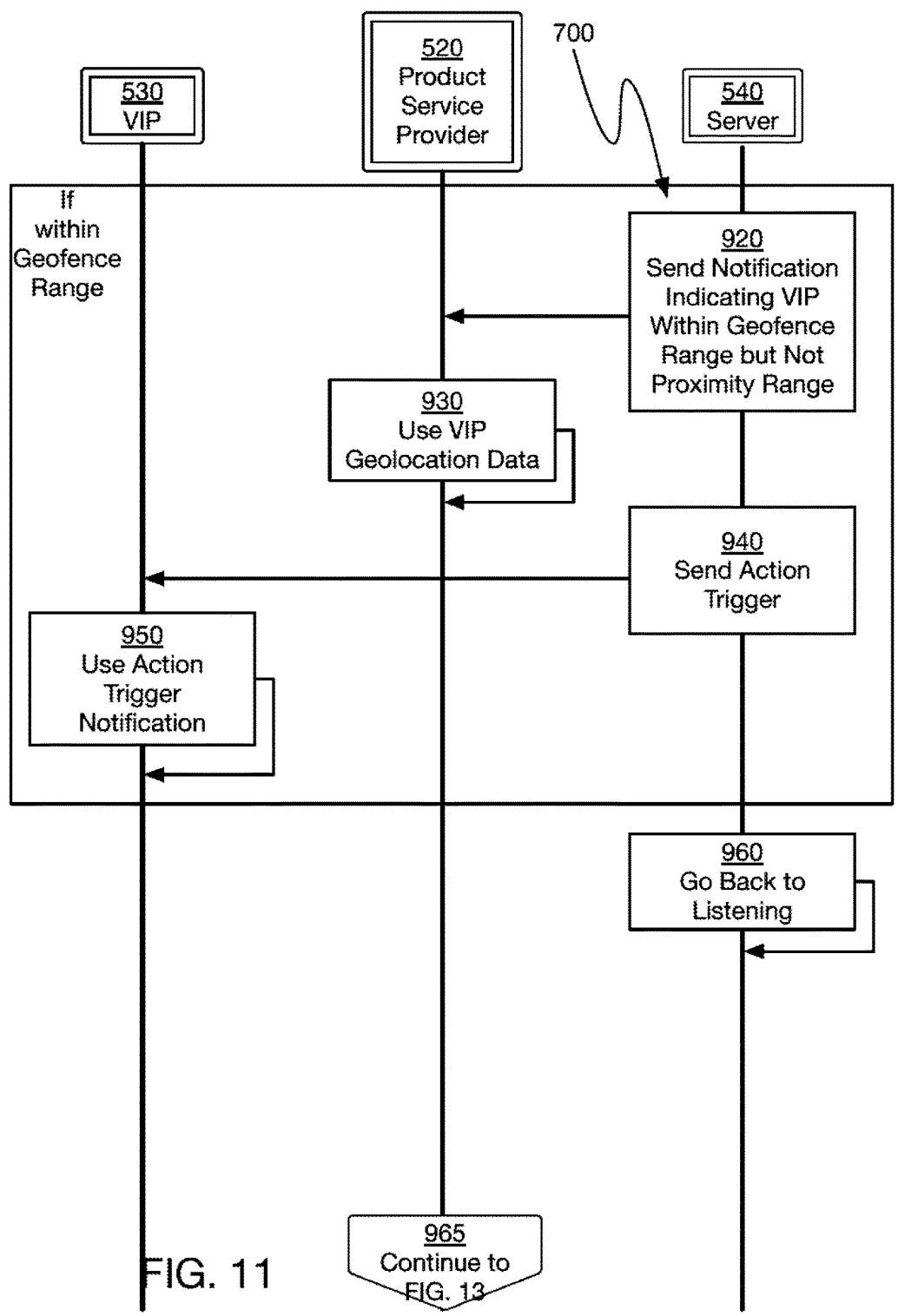
FIG. 11 is a continuation of the flow chart of FIG. 10.

FIG. 11 is a continuation of the flow chart of FIG. 10. At step 920, Server 540 may send a notification over the Internet communications network 560 to Product/Service Provider PCD 520 indicating that VIP PCD 530 is within the Geofence Range 650 but not Proximity Range 600. At step 930, Product/Service Provider PCD 520 may use the geolocation data for VIP PCD 520. In one exemplary embodiment, Product/Service Provider PCD 520 may use the notification from step 920 to initiate and prepare Core Communications 420. Consequently, Core Communications 420 may begin active broadcasting and/or actively receiving short-range Bluetooth connections requests between VIP PCD 530 and Product/Service Provider PCD 520.

Furthermore, at step 940, Server 540 may send an action trigger to VIP PCD 530. At step 950, VIP PCD 530 may use the geolocation data for VIP PCD 530. In one exemplary embodiment, Product/Service Provider PCD 520 may use the action trigger from step 940 to activate certain functionality in Apps 210. These functionalities may provider the user of VIP PCD 530 with a personalized experience related to each particular use case (described in greater detail herein). At step 960, Server 960 may go back to actively listening/determining if the VIP PCD 530 is within Geofence Range 650.

Figure 12:
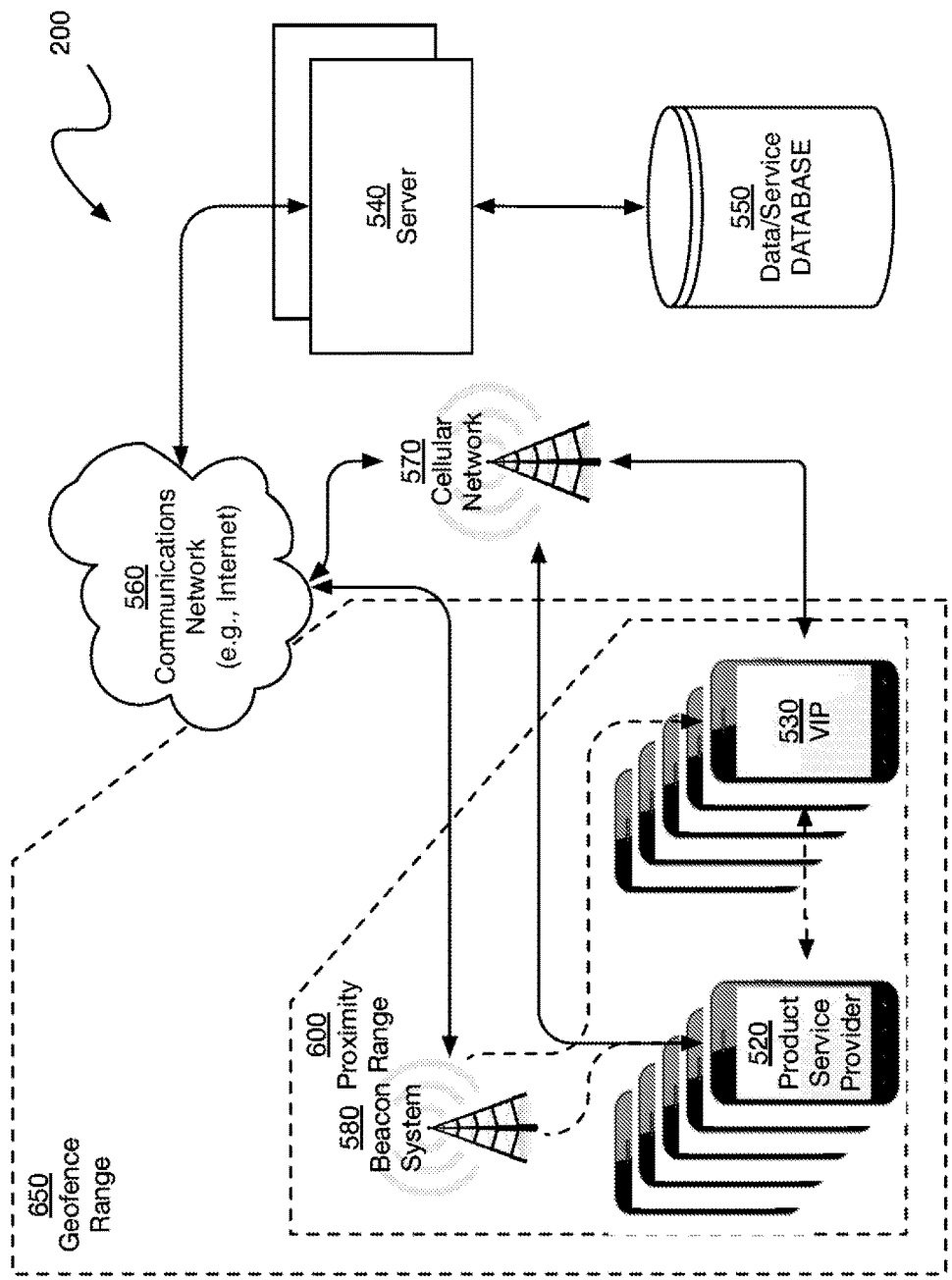
FIG. 12 is a block diagram of the exemplary embodiment of FIG. 5 in an exemplary final geo-spatial configuration with certain communications pathways emphasized.

FIG. 12 is a block diagram of the exemplary embodiment of FIG. 5 in an exemplary final geo-spatial configuration with certain communications pathways emphasized. As compared to FIG. 8, VIP PCD 530 may remain linked via Cellular Network 570 to the other System 200 components. Moreover, VIP PCD 530 may remain actively exchanging certain types of content/data with any System 200 component or any other third-party device/system. Compared to FIG. 8, in this FIG. 9, the VIP PCD 530 is now within proximity range 600, as well as being within the Geofence range 650.

VIP PCD 530 is currently positioned for activation of Core Communication 420 between Product/Service Provider PCD 520 or any other system component. In one exemplary embodiment, System 200 may be configured to proactively, controllably project personal/private preference information about the user to Product/Service Provider PCD 520.

Figure 13:
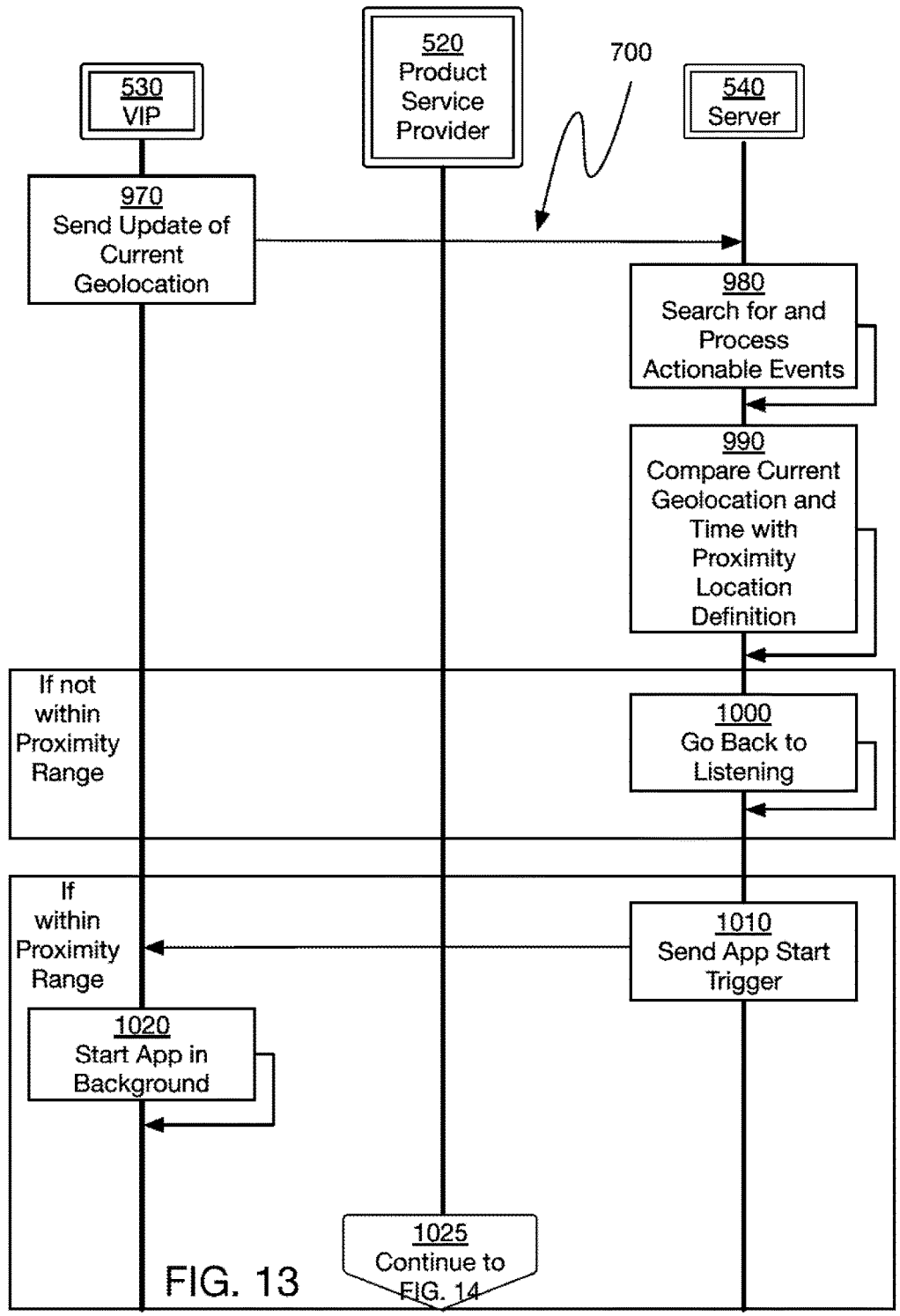
FIG. 13 is a continuation of the flow chart of FIG. 11 taking into consideration the configuration of FIG. 12.

FIG. 13 is a continuation of the flow chart of FIG. 11 taking into consideration the configuration of FIG. 12. At step 970, VIP PCD 530 may send an update of its current geolocation over the Internet communications network 560 to the server 540. In this exemplary embodiment, the update of the user's current geolocation indicates to System 200, and Server 540 in particular, that VIP PCD 530 is within both the Geofence Range 650 and Proximity Range 600.

At step 980, Server 540 may search through and process actionable events/triggers. In this exemplary embodiment, Server 540 may perform this step based at least in part on corresponding information included in Venues 280c and/or Entities 410c on Server 540, such as Core Communication Instructions 460.

At step 990, Server 540 may compare the current geolocation of VIP PCD 530 and time/date with Geofence Range 650 and Proximity Range 600. At step 1000, if Server 540 determines at step 990 that VIP PCD 530 is not within Proximity Range 600 at the right time/date, then Server 540 may go back to actively listening.

At step 1010, if Server 540 determines at step 990 that VIP PCD 530 is within Proximity Range 600 at the right time/date, then Server 540 may send an application start trigger to VIP PCD 530. At step 1020, the application start trigger at VIP PCD 530 may activate further functionality in Apps 210 on VIP PCD 530.

Further functionality may include, but is not limited to, a display of a custom screen or message in Apps 210 on VIP PCD 530. For instance, a message may be generated by system 200 and sent to VIP PCD 530 to inform the user that she may be offered access to a special VIP area/room, and the message may include a graphic/map showing her where the area is and how to access it may made. In one exemplary embodiment, Apps 210 on VIP PCD 530 may begin directly transmitting private/personal preference information to Product/Service Provider PCD 520. Core Communications 420, once activated, my complement or supplement computer network-based communications among System 200 components.

Figure 14:
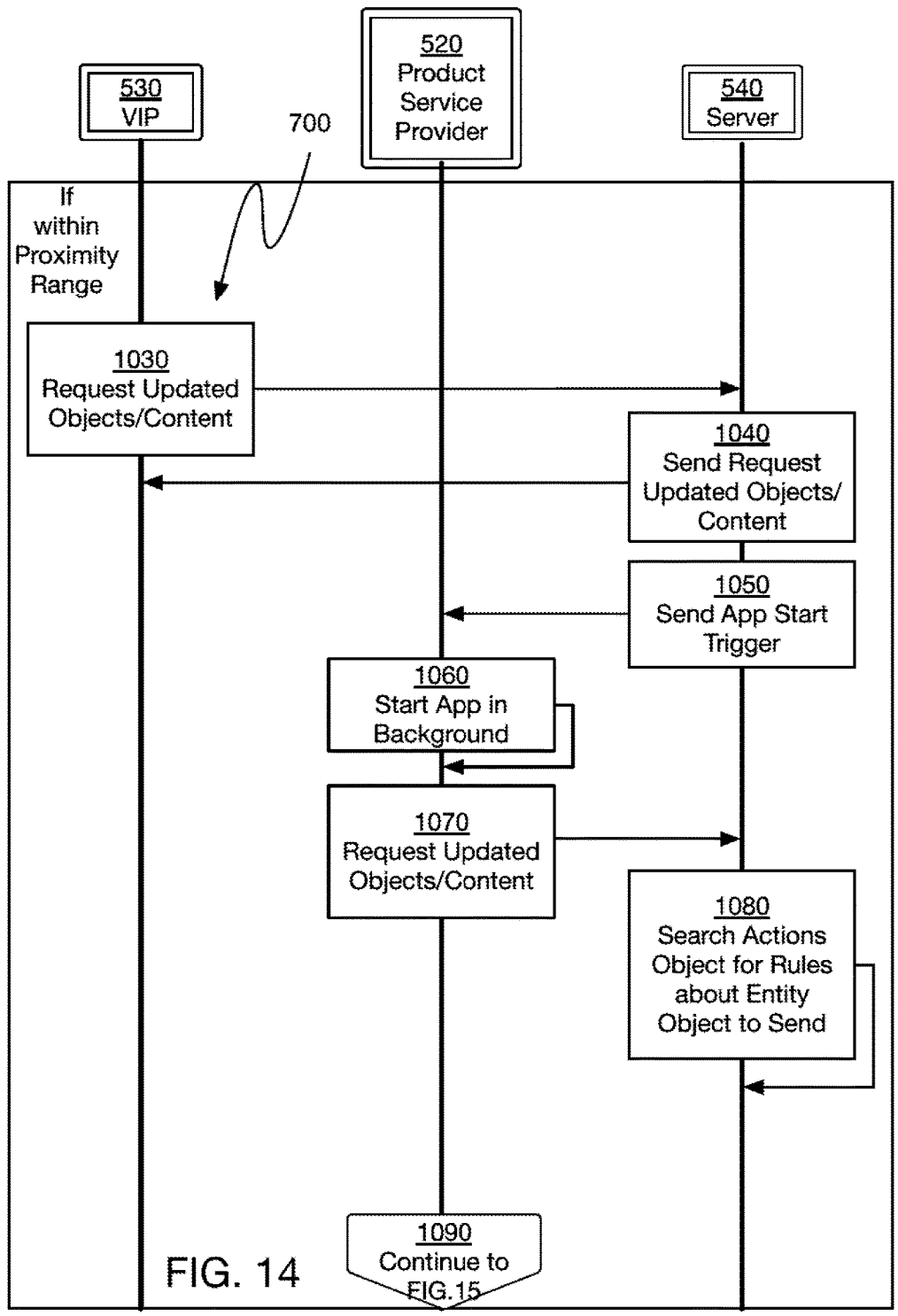
FIG. 14 is a continuation of the flow chart of FIG. 13.

FIG. 14 is a continuation of the flow chart of FIG. 13. At step 1030 of exemplary method 700, VIP PCD 530 may request updated objects/modules and content/data from Server 540 and/or Product/Service Provider PCD 520. In one exemplary embodiment, only Server 540 and Product/Service Provider PCD 520 may respond with the updated information associated with step 1030. Even if Core Communications 420 is activated and used between VIP PCD 530 and Product/Service Provider PCD 520, Server 540 may continue functioning as a communications—broker/middle man (step 1040).

At step 1050, Server 540 may send an application start trigger to Product/Service Provider PCD 520. At step 1060, the application start trigger may activate further functionality in Apps 210 on Product/Service Provider PCD 520. At step 1070, VIP PCD 530 may request updated objects/modules and content/data from Server 540 and/or VIP PCD 530. At step 1080, because Server 540 determined at step 990 that VIP PCD 530 is within Proximity Range 600 at the right time/date, Server 540 may search and process the content/data of Core 220 for how to manage the geolocation trigger recognized at step 1010.

Figure 15:
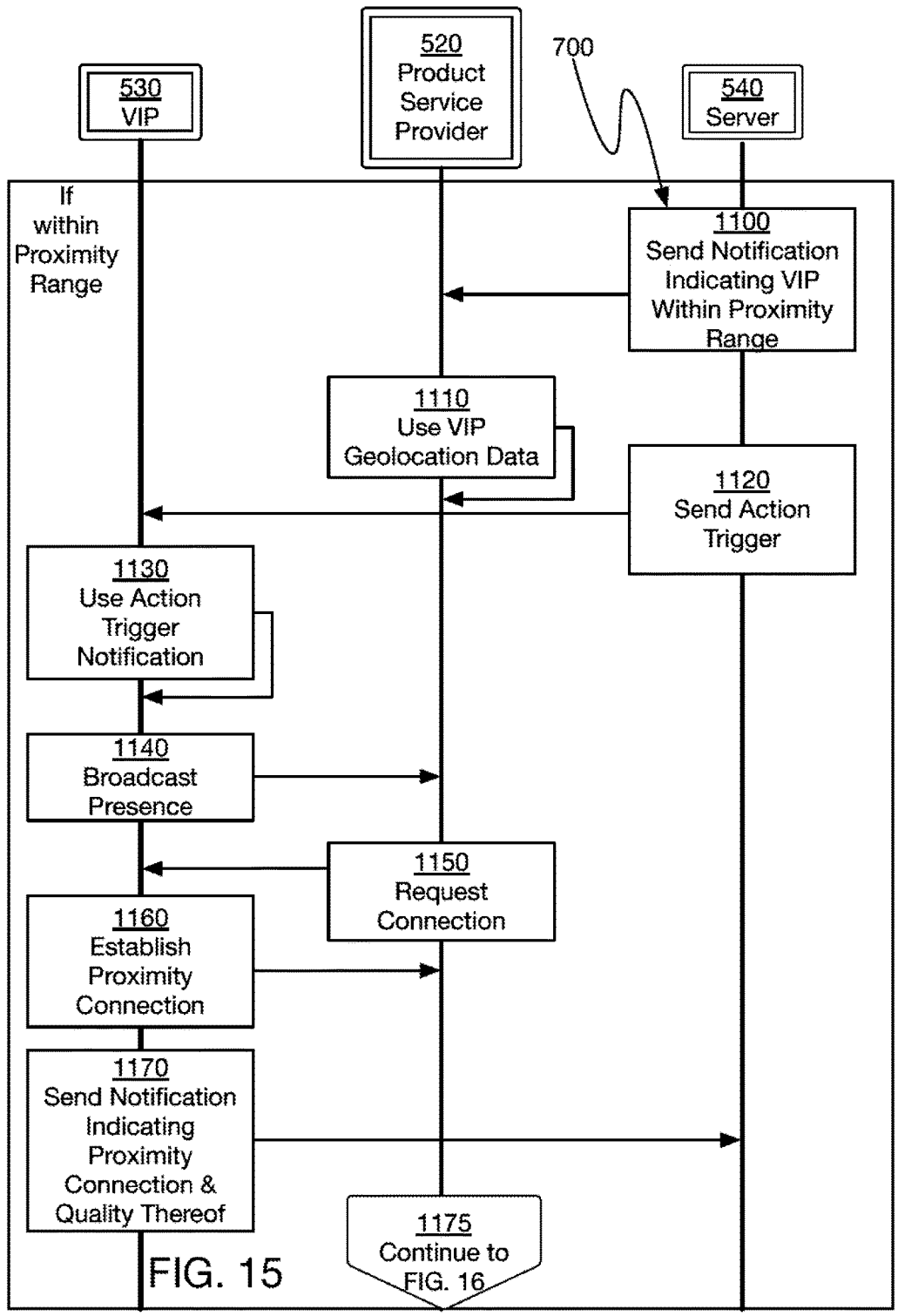
FIG. 15 is a continuation of the flow chart of FIG. 14.

FIG. 15 is a continuation of the flow chart of FIG. 14. At step 1100 of exemplary method 700, Server 540 may send a notification to Product/Service Provider PCD 520 indicating that VIP PCD 530 is within the Geofence Range 650 and Proximity Range 600. At step 1110, Product/Service Provider PCD 520 may use the geolocation data for VIP PCD 520. In one exemplary embodiment, Product/Service Provider PCD 520 may use the notification from step 1100 to begin short-range communication authentication between VIP PCD 530 and Product/Service Provider PCD 520 for Core Communications 420. In one exemplary embodiment, short-range communication may comprise Bluetooth RF communications, but other wireless mediums are possible, such as, but not limited to, infrared, NFC, acoustic, magnetic/inductive, etc.

Furthermore, at step 1120, Server 540 may send an action trigger to VIP PCD 530 and/or Product/Service provider 520. For example, such an action trigger may comprise a delivery of a short message service (SMS) message (i.e. a text message) or email message from Server 540. A message may also be sent to the Product/Service Provider PCD 520 to let them know that a VIP PCD 530 is in the area. Another example of similar functionality may include, but is not limited to, activating a custom playlist on the venue (location) audio/video system to welcome the customer to the venue to VIP PCD 530. At step 1130, VIP PCD 530 may use the geolocation data for VIP PCD 520. In one exemplary embodiment, Product/Service Provider PCD 520 may use the action trigger from step 1120 to begin short-range communication authentication between VIP PCD 530 and Product/Service Provider PCD 520 for Core Communications 420.

More specifically, at step 1140 for one exemplary embodiment, VIP PCD 530 may begin broadcasting its presence/geolocation data using its short-range communications functions. At step 1150, Product/Service Provider PCD 520 may receive the broadcast from VIP PCD 530 and request a direct proximity connection (step 1150). At step 1160, VIP PCD 530 may receive the proximity connection request from Product/Service Provider PCD 520 and establish a proximity connection with Product/Service Provider PCD 520 (step 1160). At step 1170, VIP PCD 530 may send a notification to Server 540 indicating status of Core Communications 420 between VIP PCD 530 and Product/Service Provider PCD 520 and the quality thereof. In this way, System 200 may be configured to monitor and support Core Communications 420.

Figure 16:
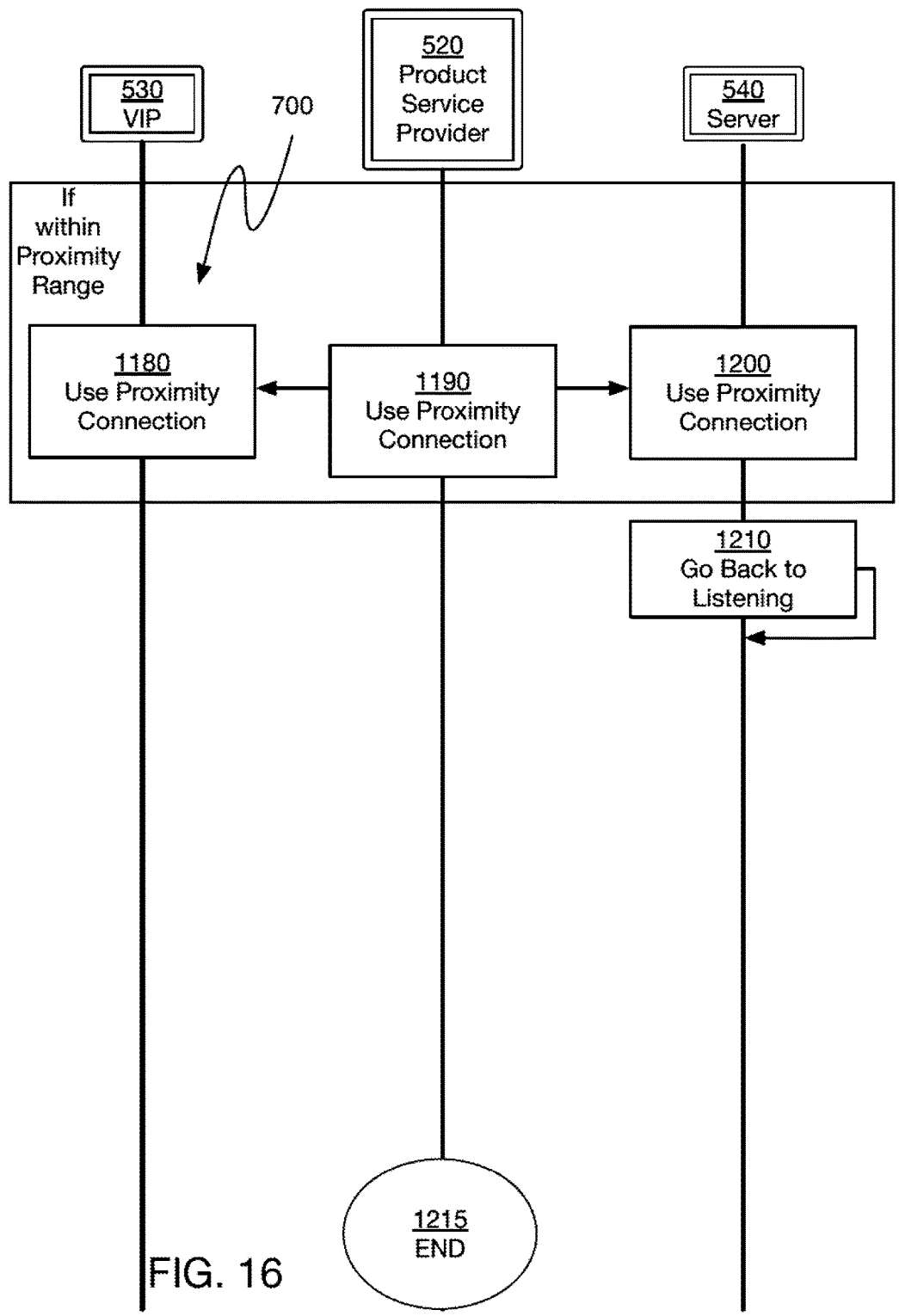
FIG. 16 is a continuation of the flow chart of FIG. 15.

FIG. 16 is a continuation of the flow chart of FIG. 15. At steps 1180, 1190, and/or 1200 of exemplary method 700, System 200 may use Core Communication 420 and, the short-range proximity connection in particular, for various system functions and processes (described in greater detail herein). At step 1210, Server 540 may go back to listening and the exemplary method 700 may end (step 1215).

Certain steps in the exemplary processes, process flows, and/or methods described herein naturally precede others for the invention to function as described. However, the invention is not limited to the order of the steps described if such order or sequence does not alter the functionality of the system and method of the present disclosure. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various processes flows.

In one or more exemplary aspects, the functions described may be implemented in hardware, software, firmware, or any combination thereof. If implemented in software, the functions may be stored on or transmitted as one or more instructions or code on a computer readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of computer-readable media.

FIGS. 17-35 illustrate two exemplary use cases possible with the system and method of the present disclosure. FIGS. 17-26 illustrate a first exemplary embodiment of a use case related to a stadium venue. The first exemplary use case may replace tickets with mobile applications for the spectator and the usher. Ticket data may be wirelessly transferred from the Spectator application to the Usher application, replacing the traditional and often frustrating handling of tickets, barcode scanners, and metal detectors with a personal greeting and frictionless entry/approach detection process. As such, the first exemplary use case may be configured to replace the sterile process of ticket taking with a digital solution designed to make the user feel like a preferred VIP.

FIGS. 27-35 illustrate a second exemplary embodiment of a use case related to a business office venue. The second exemplary use case may replace checking in with a receptionist by using a mobile application at the business and on the user/visitor that pre-registers the visit and monitors for the visitors' arrival. Office information, visitor personal/private preferences, and timing may be used by the Office application and the Barista application such that the arriving visitor is received with an open door and his/her favorite beverage. As such, the second exemplary use case may also be configured to make the user feel like a preferred VIP.

It is envisioned that the system and method of the present disclosure may be extended to various other exemplary use cases such as food and beverage ordering, smart control of audiovisual systems, line busting, smart parking solutions, and more. Beyond offices and stadiums, the use cases may be deployed to homes, cars, gyms, schools, retail, restaurants, healthcare, entertainment, airports, museums, and more. Almost any use case involving personalized service in the physical world may be built on the system and method of the present disclosure.

Figure 17:
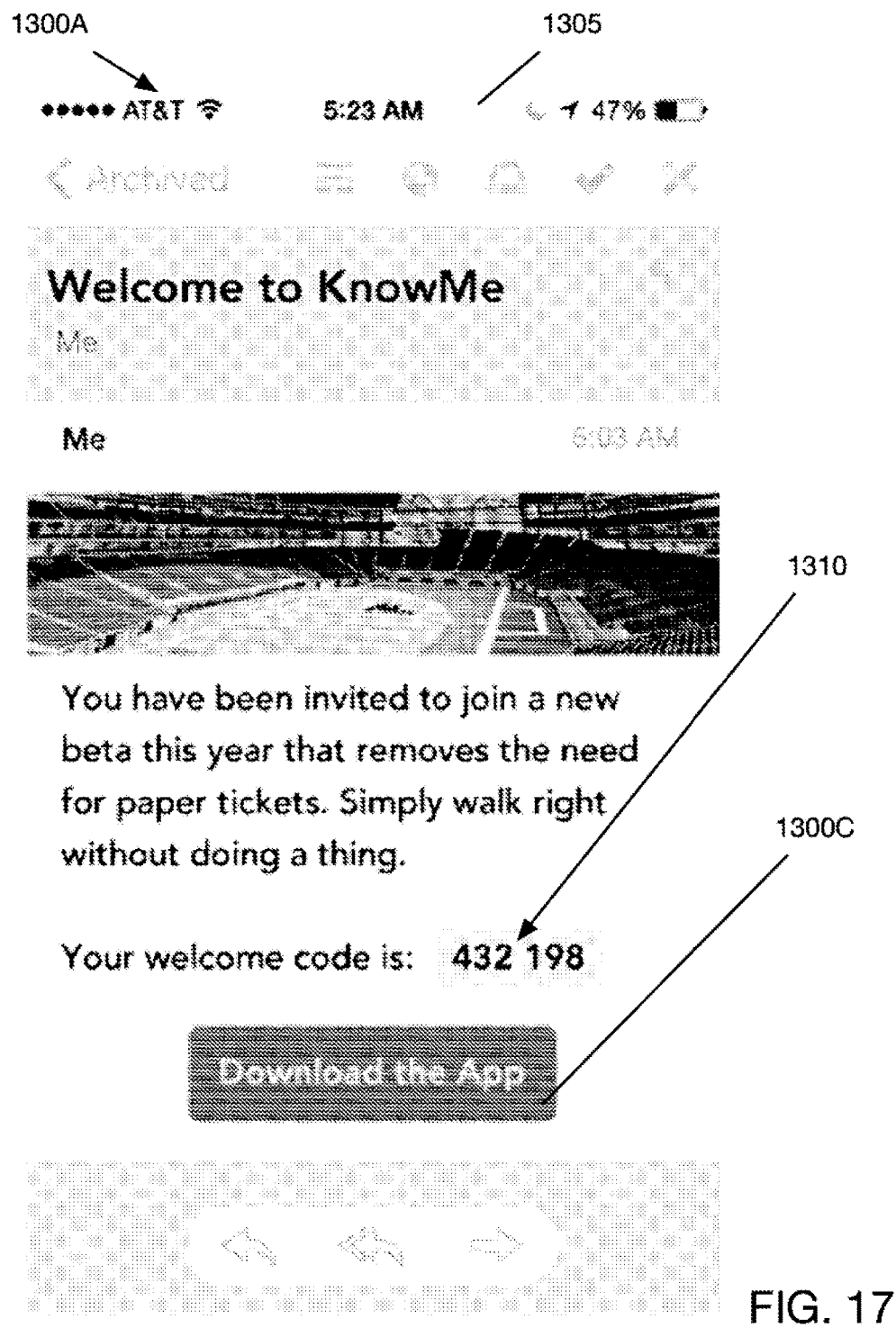
FIG. 17 is a screenshot of an exemplary user received email containing a registration code and inviting the user to download and sign up for a system application.

More specifically, FIG. 17 is a screenshot 1300A of an exemplary user received email 1305 containing a registration code 1310 and inviting the user to download and sign up for a system application. Email 1305 may be viewed by a user at a display device 332 (SEE FIG. 2) coupled to his/her PCD. Email 1305 may contain an exemplary registration code 1310.

The registration code may comprise a one-time password to associate a PCD 540 (i.e. a mobile device) with the identity implied by an email address. When a new user is invited to the system 200, a new registration code is created in the system 200 and associated with the email address being invited. When a registration code is entered, it is validated by the system 200 and the PCD 540 is associated with the respective email address. The registration code may be unique and may be only valid for a short period of time (such as on the order of several minutes to under an hour). The composition and validity time (duration) of the registration code may be configured in the system 200 as required. The default code may comprise six digits and the default validity time may be to never expire. Variations of the parameters for the registration code are possible and are understood by one of ordinary skill in the art.

An exemplary hypertext link 1315 may be configured to direct the user to an application store on the Internet, such as, but not limited to the APPLE™ store or GOOGLE™ app store known as of this writing. Step 710 of FIG. 7 may correspond with the VIP PCD 530 executing the object referenced by hypertext link 1315, in one non-limiting embodiment.

Figure 18:
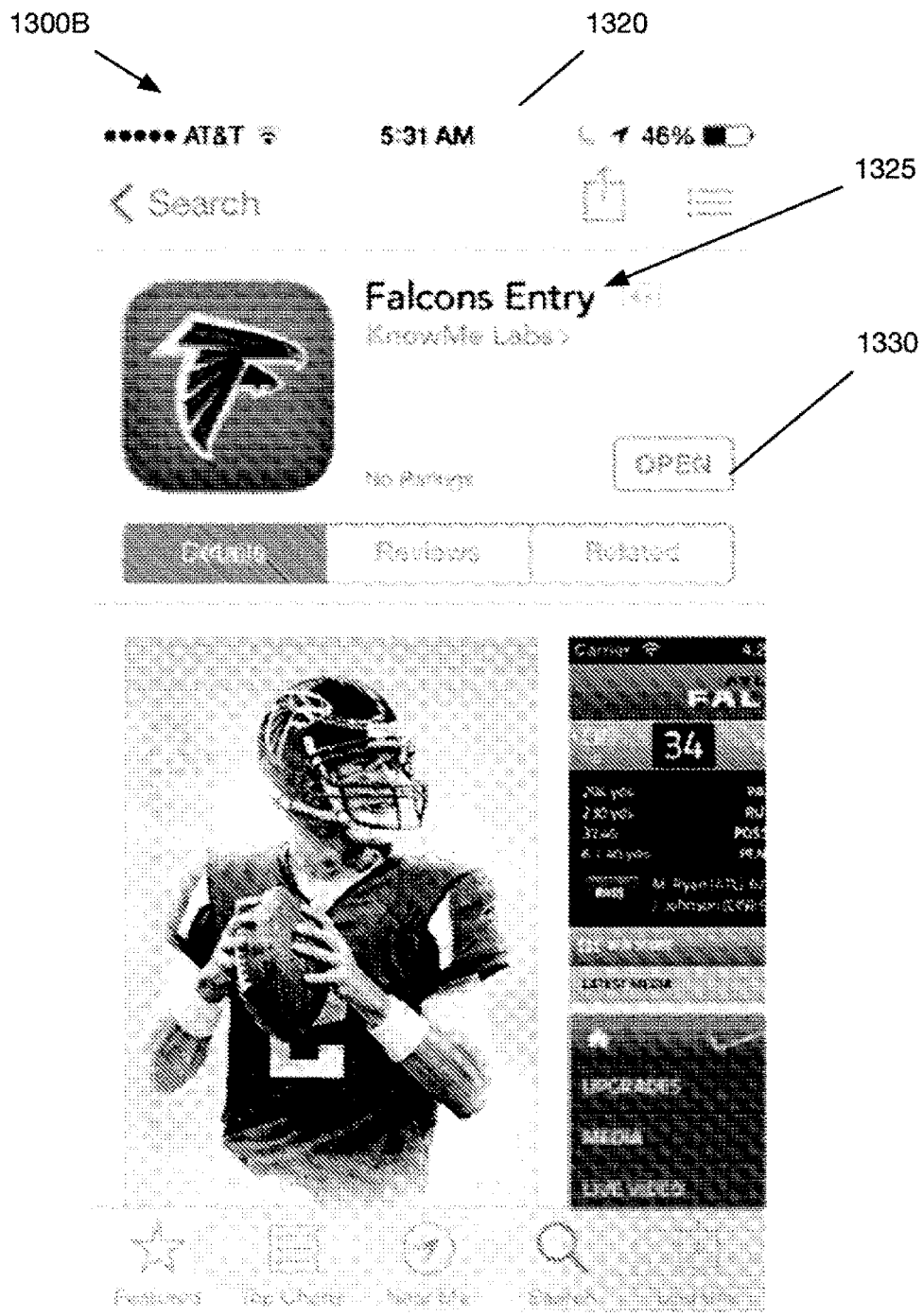
FIG. 18 is a screenshot of an exemplary application store wherein the user can download a first exemplary user system application.

FIG. 18 is a screenshot 1300B of an exemplary application store wherein the user can download a first exemplary user system application. The application store page 1320 associated with the exemplary system application, Falcon Entry 1325, may be viewed by a user on a display device 332 of his or her PCD 530. The application store page 1320 may contain an exemplary hypertext link 1315 to an executable download/open object configured to download/install Falcon Entry 1325 application/program module on the user's PCD 530. In one exemplary embodiment, Steps 710-760 of FIG. 7 occur while the Falcon Entry 1325 application is being downloaded and installed on VIP PCD 530.

FIG. 19 is a screenshot 1300C of an exemplary first screen 1335 in the system application of FIG. 16. The exemplary first screen 1335 of Falcon Entry 1325 may be viewed by a user on a display device 332 (see FIG. 2). The exemplary first screen 1335 may contain a hypertext link 1340 to an exemplary executable object configured to allow the user to take, save and implement an identification selfie (i.e. self portrait, self photograph) for his/her system account. Step 710 of FIG. 7 may correspond with VIP PCD 530 executing the selfie object, in one non-limiting embodiment.

FIG. 20 is a screenshot 1300D of an exemplary second screen in the system application of FIG. 18 wherein the user may take an identification selfie with camera 348 of FIG. 2. The exemplary second screen 1345 of Falcon Entry 1325 may be viewed by a user with a display device 332 (see FIG. 2). The exemplary second screen 1345 may contain an exemplary hypertext link to an executable object 1350 configured to actually take, save and implement the identification selfie. Step 710 of FIG. 7 corresponds with the VIP PCD 530 executing object 1350, in one non-limiting embodiment. Moreover, the VIP PCD 530 executing object 1350 may provide data, content, and information for Registration 290 and Entities 410 (for example, Identification 500) of Core 220.

FIG. 21 is a screenshot 1300E of an exemplary third screen 1355 in the system application of FIG. 16 wherein the user may input the registration code of FIG. 15. The exemplary third screen 1355 of Falcon Entry 1325 may be viewed by a user with display device 332 of a VIP PCD 530. The exemplary third screen 1355 may contain an exemplary fillable field 1360 configured to receive the exemplary registration code 1310. The exemplary third screen 1355 may also contain a hypertext link to an exemplary executable object 1365 configured to submit and process the data in the fillable field 1360. Step 710 of FIG. 7 may correspond with a VIP PCD 530 executing event confirmation object 1365, in one non-limiting embodiment. Moreover, the VIP PCD 530 executing object 1365 may provide data, content, and information for Entities 410 (for example, Actionable Events 510) and for Venues 440 (for example, Core Communications Instructions 440) of Core 220.

Figure 22:
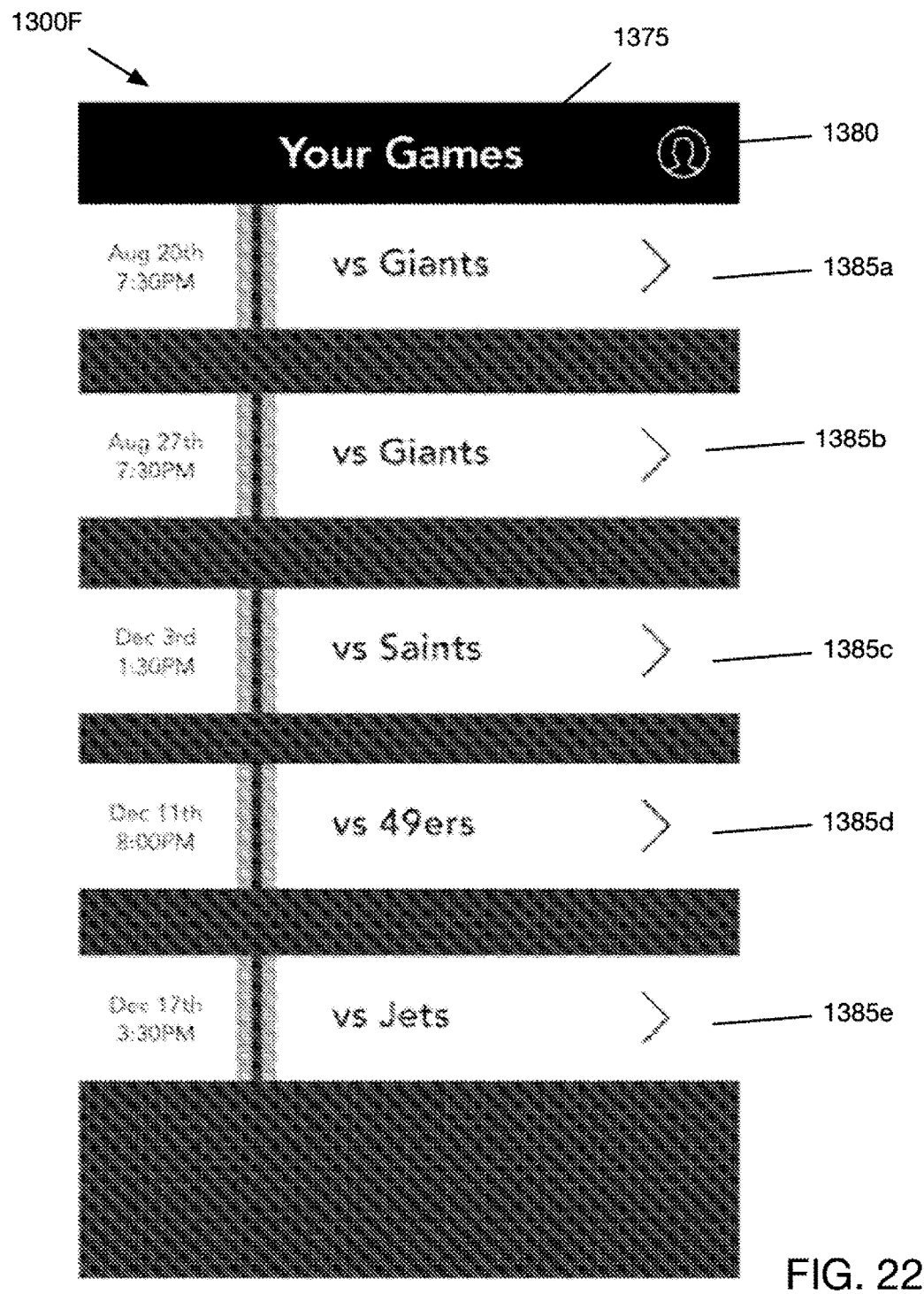
FIG. 22 is a screenshot of an exemplary fourth screen in the system application of FIG. 18.

FIG. 22 is a screenshot 1300F of an exemplary fifth screen 1375 in the system application of FIG. 16 wherein the user of VIP PCD 530 may see all available events associated with the system application of FIG. 18. The exemplary fifth screen 1375 of Falcon Entry 1325 may be viewed by a user with display device 332 of VIP PCD 530. The exemplary fifth screen 1375 may contain exemplary hypertext links to executable software objects 1385 configured to provide a user with more detailed information about any related entertainment event (i.e. football games in this exemplary embodiment) associated with his/her system account. In one exemplary embodiment, exemplary executable objects 1385 may be generally available data or may be visit, Geofence range, and/or proximity range dependent.

Furthermore, the exemplary fifth screen 1375 may also contain exemplary executable object 1380 configured to allow the user to make fine-grain changes to his/her system account. Step 710 of FIG. 7 may correspond with user changes resulting from executing object 1380, in one non-limiting embodiment. Moreover, the user executing object 1380 may provide updated data, content, and information for Core 220.

Figure 23:
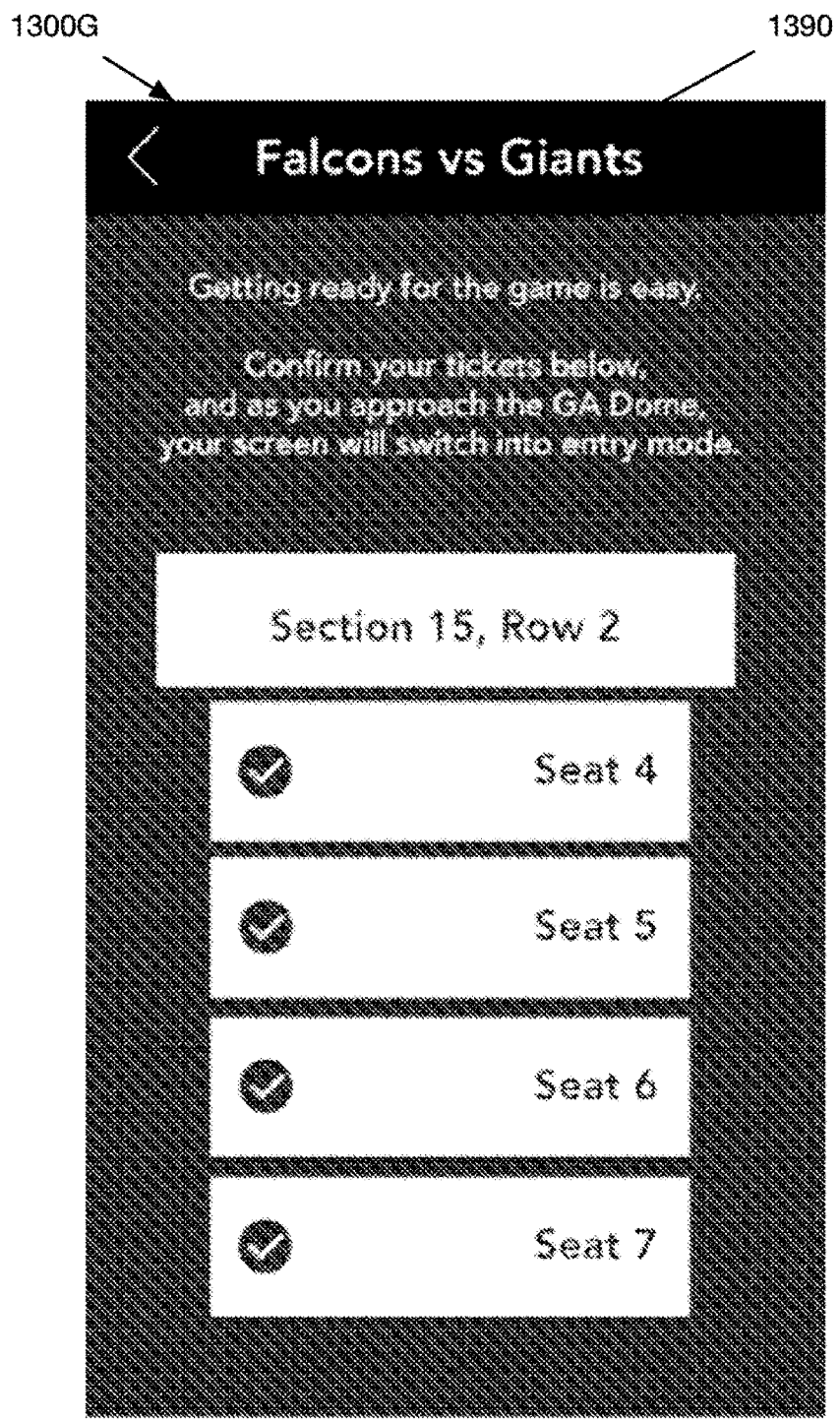
FIG. 23 is a screenshot of an exemplary fifth screen in the system application of FIG. 16 wherein the user can see all available events.

FIG. 23 is a screenshot of an exemplary sixth screen 1300F in the system application of FIG. 18 wherein the user may see the details of a specific system event. The exemplary sixth screen 1390 of Falcon Entry 1325 may be viewed by a user of VIP PCD 530 after having executed object 1385a, for example. The exemplary sixth screen 1390 provides the user with more detailed information about that particular entertainment event. In the exemplary embodiment illustrated, the detail information comprises detailed seating information that includes which section and which row of the venue that a seat has been assigned to VIP PCD 530. In one exemplary embodiment, the contents, objects, process flows, etc. of the exemplary sixth screen 1390 (i.e. the seat location within a venue) may reflect the circumstances of VIP PCD 530 in the exemplary first geo-spatial configuration of FIG. 6.

Figure 24:
FIG. 24 is a screenshot of an exemplary sixth screen in the system application of FIG. 18 wherein the user can see the details of a specific available event.

FIG. 24 is a screenshot of an exemplary seventh screen 1300G in the system application of FIG. 18 associated with the user of VIP PCD 530 entering a Geofence range 650 but remaining out of a proximity range 600. The exemplary seventh screen 1395 of Falcon Entry 1325 may be viewed by a user of a VIP PCD 530 having a display device 332. The exemplary seventh screen 1395 provides the user of VIP PCD 530 with more detailed information about a particular entertainment event than that provided in the exemplary sixth screen 1390 of FIG. 23. In one exemplary embodiment, the exemplary seventh screen 1395 may correspond with the location of VIP PCD 530 in the exemplary intermediate geo-spatial configuration of FIG. 8.

Figure 25:
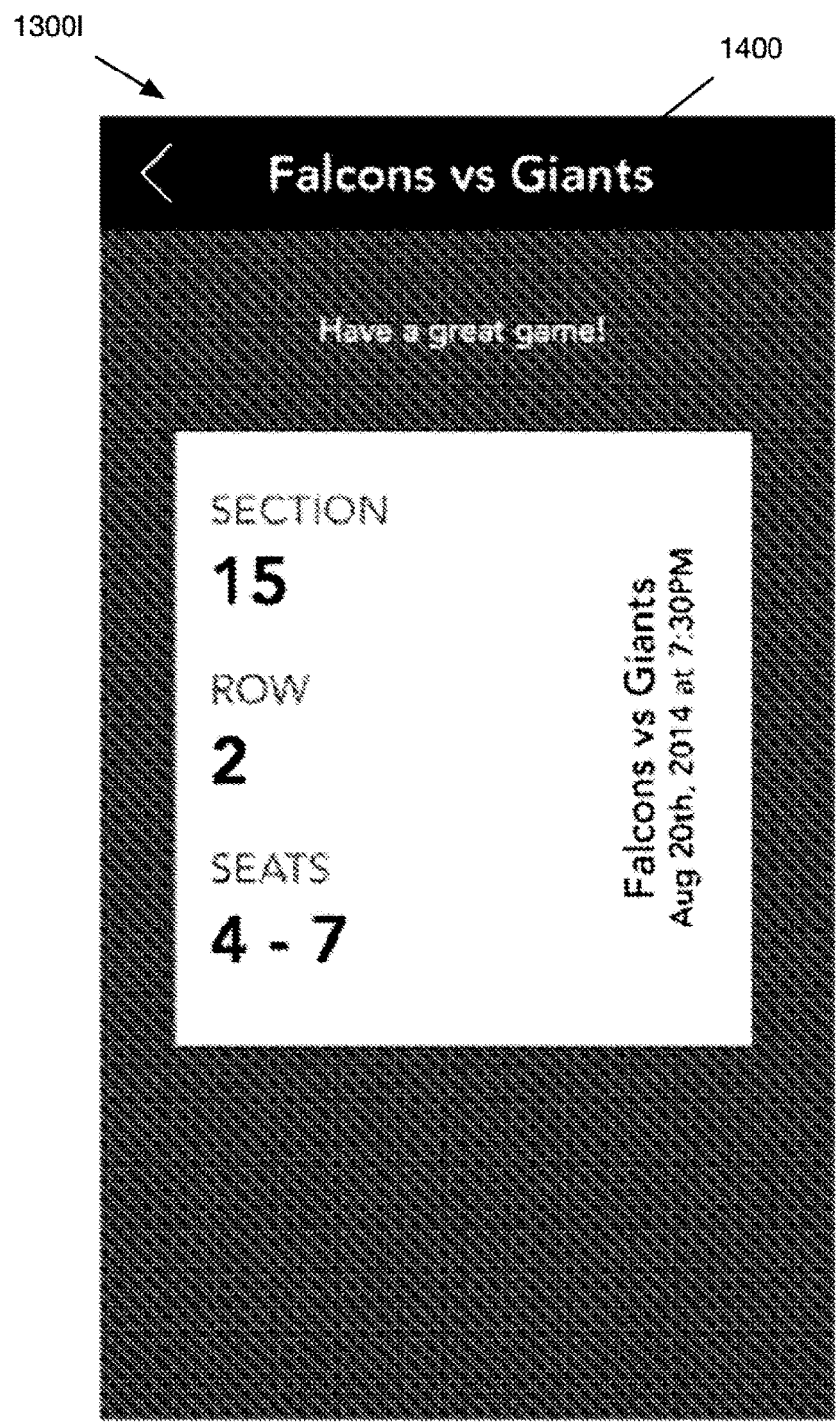
FIG. 25 is a screenshot of an exemplary eighth screen in the system application of FIG. 18 associated with the user entering a proximity range.

FIG. 25 is a screenshot of an exemplary eighth screen 1300H in the system application of FIG. 18 associated with the user entering a proximity range 600 as illustrated in FIG. 12. The exemplary eighth screen 1400 of Falcon Entry 1325 may be viewed by a user of VIP PCD 530 with a display device 332. The exemplary eighth screen 1400 provides the user of PCD 530 with more detailed information about a particular entertainment event than that provided in the exemplary seventh screen 1395. Specifically, screen 1400 displays the specific section, row, and seats that may be assigned to VIP PCD 530. As noted previously, in one exemplary embodiment, the exemplary seventh screen 1395 may correspond with the location of the VIP PCD 530 in the exemplary final geo-spatial configuration of FIG. 12.

Figure 26:
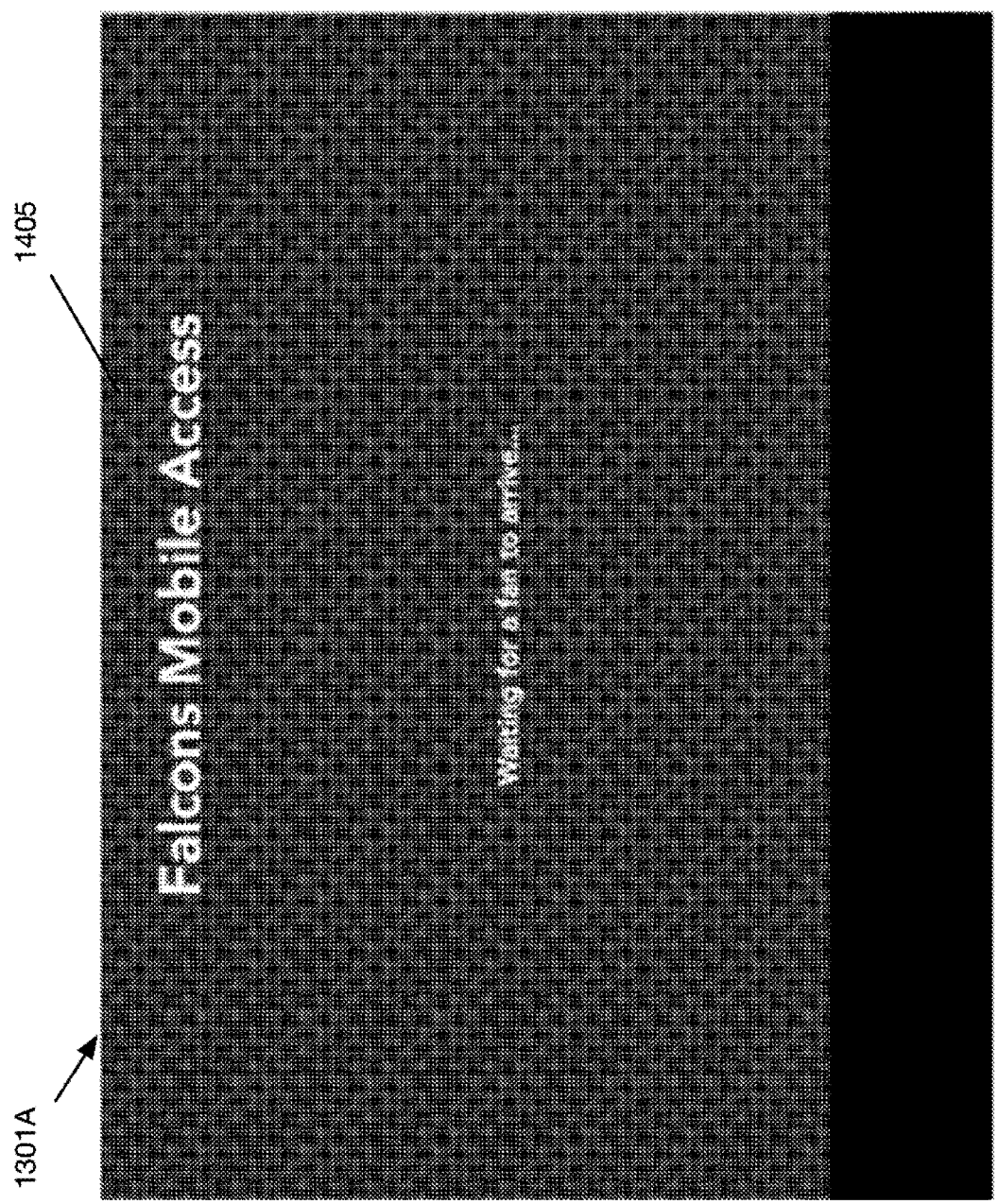
FIG. 26 is a screenshot of an exemplary first screen in a service provider system application associated with the circumstances of FIGS. 22-24.

FIG. 26 is a screenshot 1301A of an exemplary first screen 1405 in a service provider system application executed by a Service Provider/Vendor PCD 520 associated with the circumstances of FIGS. 22-24. The exemplary first screen 1405 may be viewed by a user of SP/Vendor PCD 520 having a display device 332. The exemplary first screen 1405 provides the SP/Vendor PCD 520 with more detailed information about a particular user of a VIP PCD 530 that is detected by the Geofence 600, 650. In one exemplary embodiment, the exemplary first screen 1405 may correspond with SP/Vendor PCD 520 in the exemplary first geo-spatial configuration of FIG. 6.

Figure 27:
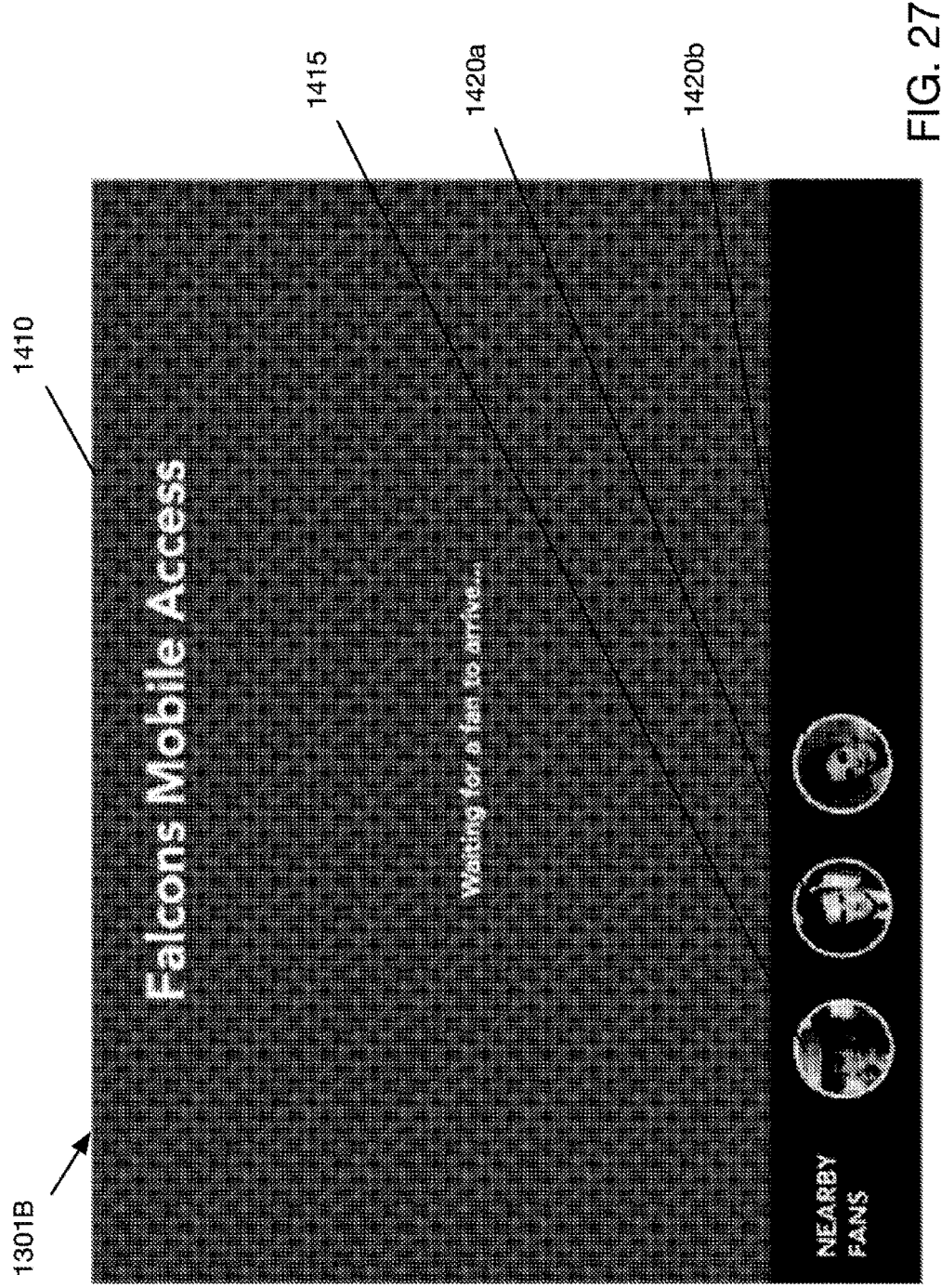
FIG. 27 is a screenshot of an exemplary second screen in a service provider system application associated with the circumstances of FIG. 25.

FIG. 27 is a screenshot 1301B of an exemplary second screen in a service provider system application executed by a Service Provider/Vendor PCD 520 associated with the circumstances of FIG. 25. The exemplary second screen 1410 may be viewed by a SP/Vendor PCD 520 on a display device 332 (see FIG. 2). The exemplary second screen 1410 may provide the SP/Vendor PCD 520 with more detailed information about a particular user of a VIP PCD 530 that is detected by the Geofence 600, 650. In one exemplary embodiment, the contents, objects, process flows, etc. of the exemplary second screen 1405 may reflect the circumstances of Product/Service Provider PCD 520 in the exemplary intermediate geo-spatial configuration of FIG. 8.

Furthermore, the contents, objects, process flows, etc. of the exemplary second screen 1405 may use certain personal/private preference information, such as the VIP PCD 530's geolocation and/or selfie identification from FIG. 20. The exemplary second screen 1410 may provide the SP/Vendor PCD 520 with a listing showing that the user of VIP PCD 530 is nearby (at screen object 1415) and that other system users associated with this particular event are also nearby (at screen object 1420).

Figure 28:
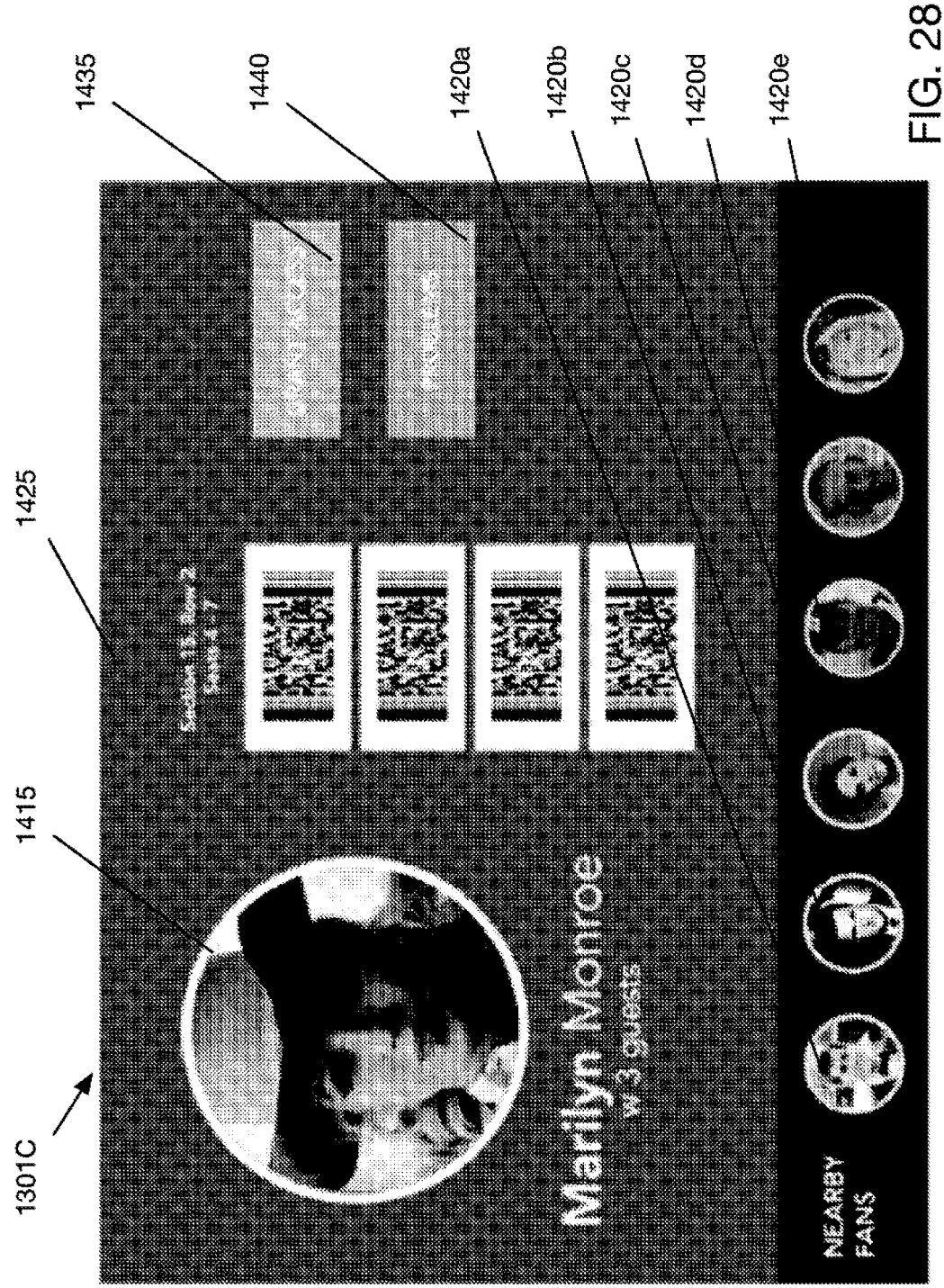
FIG. 28 is a screenshot of an exemplary third screen in a service provider system application associated with the circumstances of FIG. 26.

FIG. 28 is a screenshot 1301C of an exemplary third screen in a service provider system application executed by a Service Provider/Vendor PCD 520 associated with the circumstances of FIG. 26. The exemplary third screen 1425 may be viewed by a SP/Vendor PCD 520 on a display device 332 (see FIG. 2). The exemplary third screen 1425 may provide the SP/Vendor PCD 520 with more detailed information about VIP PCD 530. In one exemplary embodiment, the contents, objects, process flows, etc. of the exemplary third screen 1425 may reflect the circumstances of Product/Service Provider PCD 520 in the exemplary final geo-spatial configuration of FIG. 12.

Furthermore, the contents, objects, process flows, etc. of the exemplary second screen 1405 may use more personal/private preference information, such as the VIP PCD 530's proximity and geolocation and/or more detailed/specific identification information. The exemplary third screen 1425 may provide the SP/Vendor PCD 520 with a listing showing that user 1415 (VIP PCD 530) is not only nearby but also proximate to Product/Service Provider PCD 520. The exemplary third screen 1425 may then provide specific ticketing information to grant user 1415 (VIP PCD 530) access (at screen object 1435) to the venue or to resolve problems (at screen object 1440). Moreover, exemplary third screen 1425 may remain indicating that other users associated with this particular event are also nearby (at screen object 1420).

Figure 29:
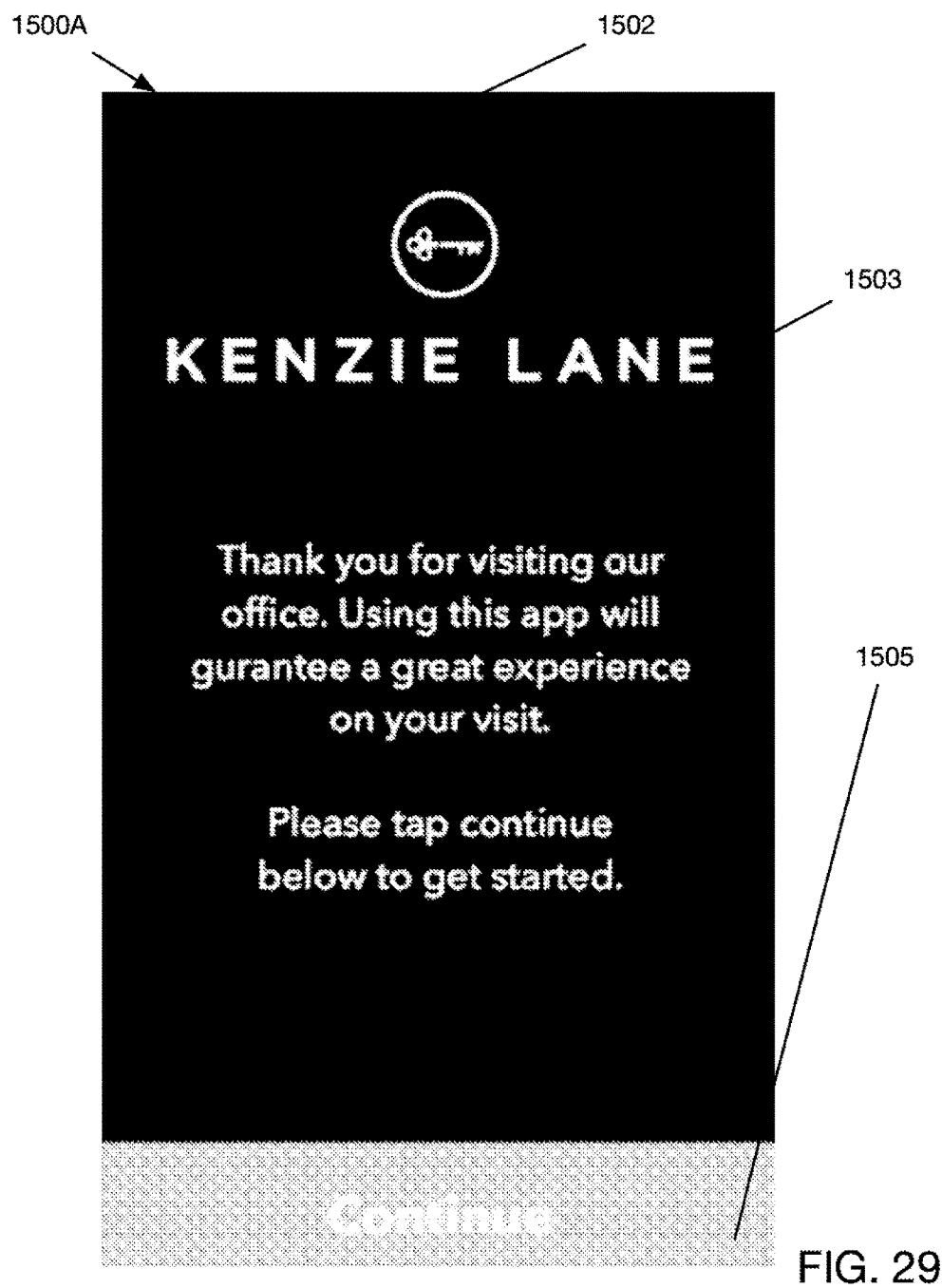
FIG. 29 is a screenshot of an exemplary first screen in a second exemplary embodiment of a user system application.

FIG. 29 is a screenshot 1500A of an exemplary first screen in a second exemplary embodiment of a user system application. Like the first exemplary user system application of FIGS. 17-24, the second exemplary user system application, Kanzie Lane Office 1503, may be downloaded to a VIP PCD 530 from an exemplary application store. The exemplary first screen 1502 of Kanzie Lane Office 1503 may be viewed by a user on VIP PCD 530 on a display device 332 (see FIG. 2). The exemplary first screen 1502 may contain an exemplary hyperlink 1505 to an executable download/open object configured to allow the user on VIP PCD 530 to begin setting up his/her personal preferences. Step 710 of FIG. 7 corresponds with a VIP PCD 530 executing hyperlink 1505, in one non-limiting embodiment.

Figure 30:
FIG. 30 is a screenshot of an exemplary second screen in the system application of FIG. 30 wherein the user can input a confirmation code.

FIG. 30 is a screenshot 1500B of an exemplary second screen in the system application of FIG. 30 wherein the user on VIP PCD 530 may input a confirmation code. The exemplary second screen 1507 of Kanzie Lane Office 1503 may be viewed by a user on VIP PCD 530 on a display device 332 (see FIG. 2). The exemplary second screen 1507 may contain an exemplary fillable field 1510 configured to receive an exemplary confirmation code. Like the first exemplary user system application of FIGS. 17-24, Kanzie Lane Office 1503 may involve a system assigned and transmitted email confirmation code. In other exemplary embodiments, the confirmation code may be user defined and/or SP/Vendor PCD 520 defined.

Furthermore, the exemplary second screen 1507 may also contain an exemplary a hypertext link to an exemplary executable object 1515 configured to submit and process the data in the fillable field 1510. Step 710 of FIG. 7 corresponds with a VIP PCD 530 executing object 1515, in one non-limiting embodiment.

Figure 31:
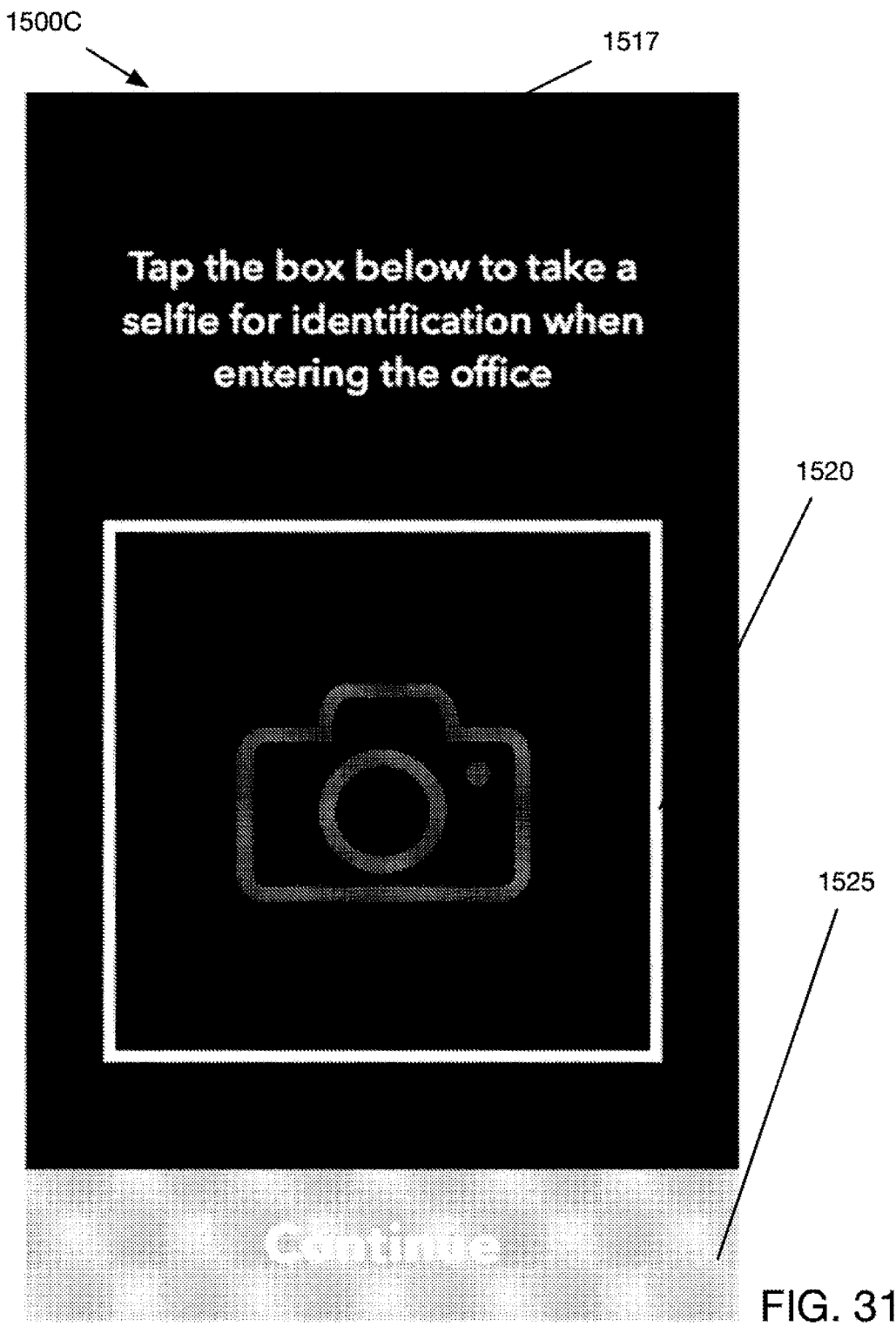
FIG. 31 is a screenshot of an exemplary third screen in the system application of FIG. 28 wherein the user can take an identification selfie.

FIG. 31 is a screenshot 1500C of an exemplary third screen in the system application of FIG. 28 wherein the user on VIP PCD 530 may take an identification selfie with camera 348 of FIG. 2. The exemplary third screen 1517 of Kanzie Lane Office 1503 may be viewed by a user on VIP PCD 530 on a display device 332 (see FIG. 2). The exemplary third screen 1517 may contain an exemplary hypertext link to an executable object 1520 configured to allow the user on VIP PCD 530 to take an identification selfie with his/her PCD. The exemplary third screen 1517 may also contain an exemplary hypertext link to an executable object 1525 configured to actually save and implement the identification selfie. Step 710 of FIG. 7 corresponds with a VIP PCD 530 executing objects 1520 and 1525, in one non-limiting embodiment.

Figure 32:
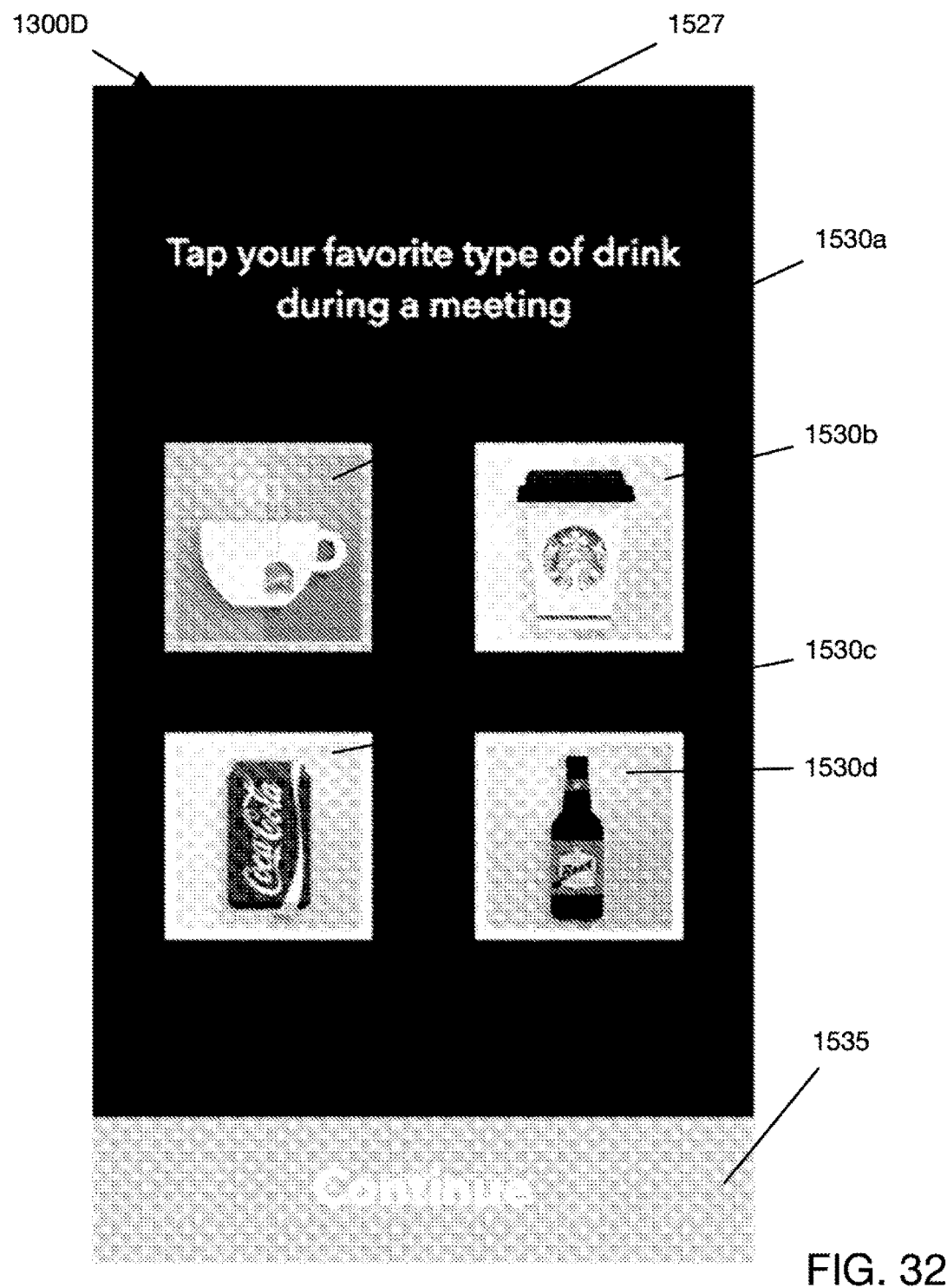
FIG. 32 is a screenshot of an exemplary fourth screen in the system application of FIG. 28 wherein the user can make certain personal preferences.

FIG. 32 is a screenshot 1500D of an exemplary fourth screen in the system application of FIG. 28 wherein the user on VIP PCD 530 may make certain personal preferences. The exemplary fourth screen 1527 of Kanzie Lane Office 1503 may be viewed by a user on VIP PCD 530 on a display device 332 (see FIG. 2). The exemplary fourth screen 1527 may contain exemplary hypertext link to an executable object 1530 and 1535 configured to allow the user on VIP PCD 530 to make fine-grain preference selections. In this particular embodiment, the exemplary fourth screen 1527 is configured to allow the user of VIP PCD 530 to select his/her favorite type or drink for the scheduled meeting.

Furthermore, in one exemplary embodiment, the granularity of selection, the organization scheme, the options available, etc. of the exemplary fourth screen 1527 may take various configurations. As described for FIGS. 1-16, for each selection option, a geolocation action trigger (as described in blocks 730-760 of FIG. 7, for example) may be assigned and associated by the Server 540, in one exemplary example. Moreover, alternative and "last minute" replacement choices may be implemented by the Serve 540 in response to updated content/data from the system components, depending on distance, proximity, and/or time (as described in blocks 770-800 of FIG. 7, for example).

Furthermore, the hyperlink 1535 may be configured to submit and process the preference options selected with executable objects 1530. Step 710 of FIG. 7 corresponds with a VIP PCD 530 executing object 1535, in one non-limiting embodiment.

Figure 33:
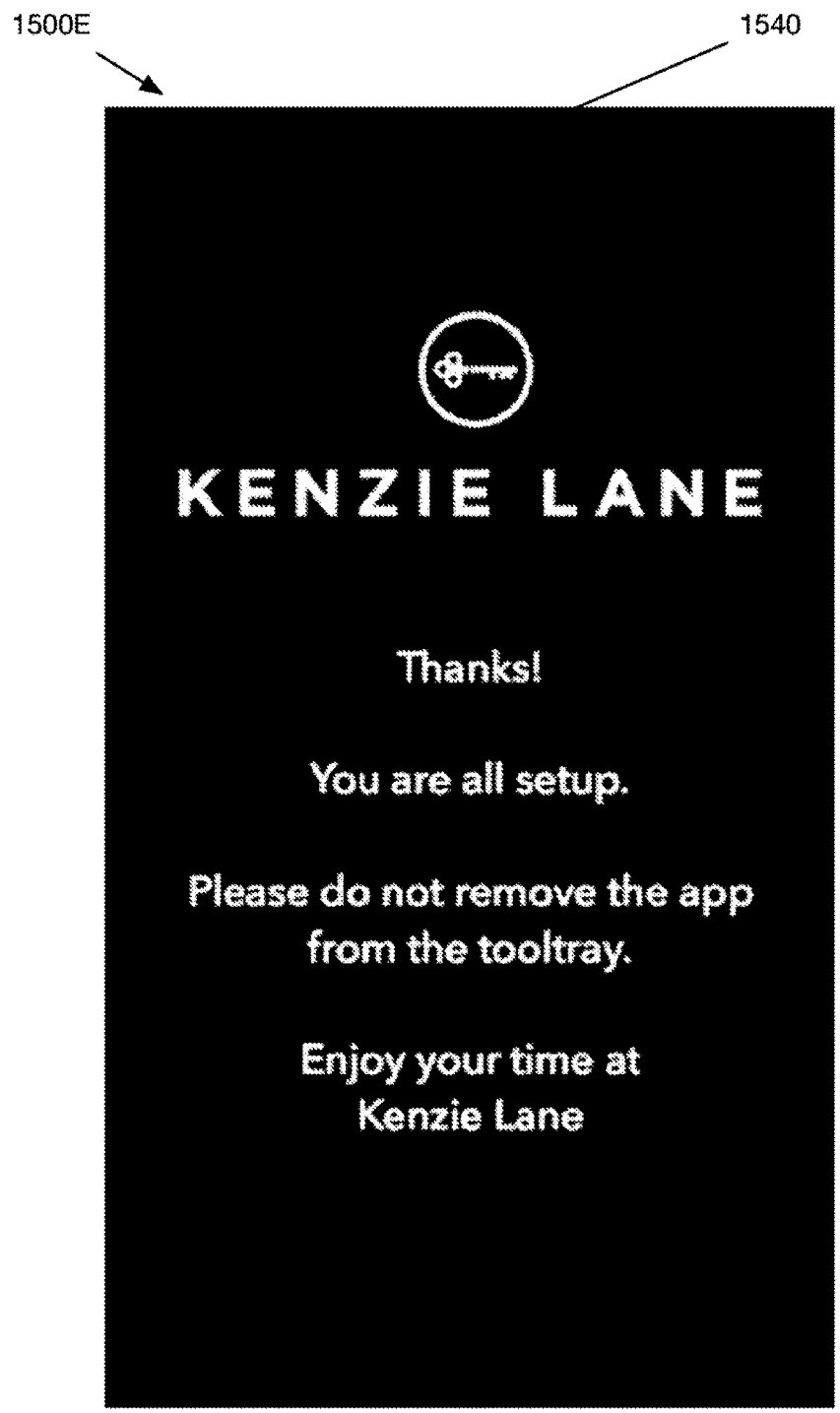
FIG. 33 is a screenshot of an exemplary fifth screen in the system application of FIG. 30.

FIG. 33 is a screenshot 1500E of an exemplary fifth screen in the system application of FIG. 30. The exemplary fifth screen 1540 of Kanzie Lane Office 1503 may be viewed by a user on VIP PCD 530 on a display device 332 (see FIG. 2) and may be simply a holding screen. In one exemplary embodiment, the exemplary fifth screen 1540 may not change or provide any additional information to the VIP PCD 530, regardless of the distance and/or proximity of the VIP PCD 530 to other system components.

Figure 34:
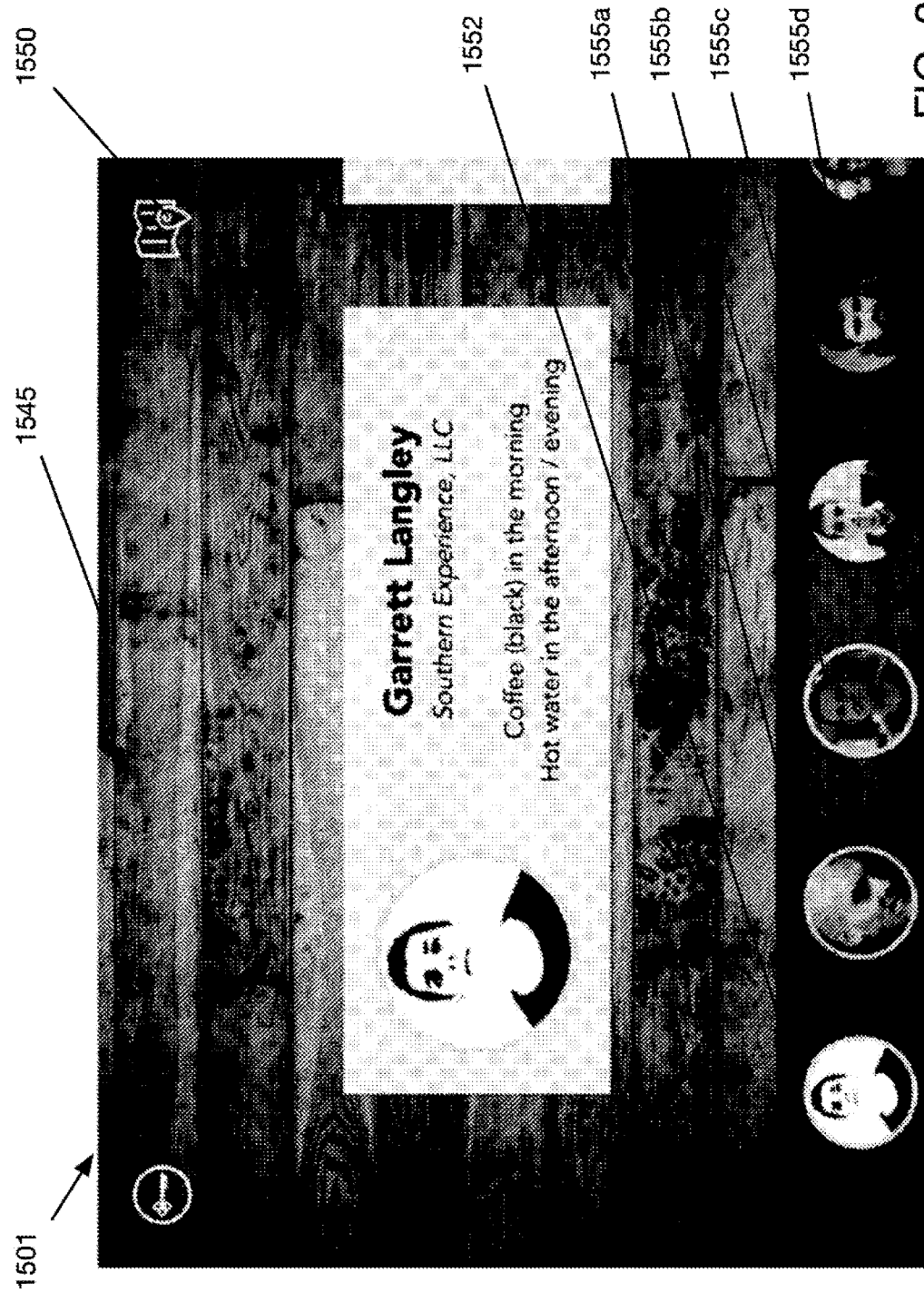
FIG. 34 is a screenshot of an exemplary first screen in a service provider system application when the user of FIG. 33 enters a geofence range and is approaching a proximity range.

FIG. 34 is a screenshot 1501 of an exemplary first screen in a service provider system application executed by a Service Provider/Vendor PCD 520 when the VIP PCD 530 of FIG. 33 enters a Geofence range 650 and is approaching a proximity range 600. FIG. 35 may also be associated with the circumstances of FIGS. 30-34. The exemplary first screen 1545 may be viewed by a SP/Vendor PCD 520 on a display device 332 (see FIG. 2) communicatively coupled with its PCD. The exemplary first screen 1545 provides the SP/Vendor PCD 520 with detailed information about the VIP PCD 530 preference selected on Kanzie Lane Office 1503.

Furthermore, the contents, objects, process flows, etc. of the exemplary first screen 1545 may use certain personal/private preference information, such as the VIP PCD 530's geolocation and/or selfie identification from FIG. 32. The exemplary first screen 1545 may provide the SP/Vendor PCD 520 with a listing showing that the user of VIP PCD 530 is nearby (at screen object 1552) and that other system users scheduled to meet via Kanzie Lane Office 1503 (at screen objects 1555) are nearby.

Furthermore, the exemplary first screen 1545 may also contain exemplary executable object 1550 configured to allow the SP/Vendor PCD 520 to track via a dynamic map the users 1552 and 1555. In this exemplary embodiment, the barista at the office associated with the SP/Vendor PCD 520 may keep track of the estimated-time-of-arrival for the various users 1552 and 1555. The barista may, therefore, properly plan and time the preparation of the various beverage preferences being handled by the system and method.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A computer-implemented method for facilitating personalized services with machine-generated communications, the method comprising the steps of:
    establishing a first wireless detection zone for detecting a presence of a first portable computing device, the first wireless detection zone being defined by global positioning coordinates monitored by the first portable computing device;
    establishing a second wireless detection zone for detecting a presence of the first portable computing device;
    detecting the presence of the first portable computing device within the first wireless detection zone by a computer server based on global positioning coordinates received by the computer server over a communications network from the first portable computing device;
    in response to detecting the presence of the first portable computing device within the first wireless detection zone, the computer server identifying account data associated with the first portable computing device, the account data comprising at least one of a photograph of a person and preference data contained within the account;
    the computer server sending a message over the communications network containing the account data to a second portable computing device present within the second detection zone;
    detecting the presence of the first portable computing device within the second wireless detection zone by the computer server based on position data received by the computer server over the communications network from the first portable computing device;
    in response to the computer server detecting the presence of the first portable computing device within the second wireless detection zone, the computer server sending a message over the communications network to the second portable computing device for activating machine-to-machine communications between the first and second portable computing devices; and
    displaying the account data on the second portable computing device.

2. The computer-implemented method of claim 1, wherein the first wireless detection zone has a size which is greater than a size of the second wireless detection zone and the first wireless detection zone contains the second wireless detection zone.

3. The computer-implemented method of claim 1, wherein the account data further comprises seating data.

4. The computer-implemented method of claim 3, wherein the portable computing devices comprise at least one of a cellular telephone, a pager, a portable digital assistant, a smartphone, a navigation device, or a hand-held computer with a wireless connection.

5. The computer-implemented method of claim 4, further comprising displaying a photograph associated with the first portable computing device on the display device of the second portable computing device when the first portable computing device is present within the second wireless detection zone.

6. The computer-implemented method of claim 5, further comprising displaying the preference data on the display device of the second portable computing device when the first portable computing device is present within the second wireless detection zone, the preference data comprising preferences associated with at least one of a product and a service.

7. The computer-implemented method of claim 6, further comprising transmitting the seating data over the communications network when the first portable computing device is present within the second wireless detection zone, the seating data comprising a seat location within a venue for a live event.

8. A computer-implemented system for facilitating personalized services with machine-generated communications, the system comprising:
    means for establishing a first wireless detection zone for detecting a presence of a first portable computing device, the first wireless detection zone being defined by global positioning coordinates monitored by the first portable computing device;
    means for establishing a second wireless detection zone for detecting a presence of the first portable computing device;
    means for detecting the presence of the first portable computing device within the first wireless detection zone, the means for detecting the presence of the first portable computing device within the first wireless detection zone comprising a computer server detecting the presence of the first portable computing device based on global positioning coordinates received by the computer server over a communications network from the first portable computing device;

means for identifying account data associated with the first portable computing device in response to detecting the presence of the first portable computing device within the first wireless detection zone, the means for identifying account data associated with the first portable computing device comprising the computer server, the account data comprising at least one of a photograph of a person and preference data contained within the account;

means for the computer server sending a message over the communications network containing the account data to a second portable computing device present within the second detection zone;

the computer server detecting the presence of the first portable computing device within the second wireless detection zone by using position data received over the communications network from the first portable computing device;

the computer server sending a message over the communications network to the second portable computing device for activating machine-to-machine communications between the first and second portable computing devices in response to the computer server detecting the presence of the first portable computing device within the second wireless detection zone; and means for displaying the account data on the second portable computing device.

9. The computer-implemented system of claim 8, wherein the first wireless detection zone has a size which is greater than a size of the second wireless detection zone and the first wireless detection zone contains the second wireless detection zone.

10. The computer-implemented system of claim 8, wherein the account data further comprises seating data.

11. The computer-implemented system of claim 10, wherein the portable computing devices comprise at least one of a cellular telephone, a pager, a portable digital assistant, a smartphone, a navigation device, or a hand-held computer with a wireless connection.

12. The computer-implemented system of claim 11, further comprising means for displaying a photograph associated with the first portable computing device on the display device of the second portable computing device when the first portable computing device is present within the second wireless detection zone.

13. The computer-implemented system of claim 12, further comprising means for displaying the preference data on the display device of the second portable computing device when the first portable computing device is present within the second wireless detection zone, the preference data comprising preferences associated with at least one of a product and a service.

14. The computer-implemented system of claim 13, further comprising means for transmitting the seating data over the communications network when the first portable computing device is present within the second wireless detection zone, the seating data comprising a seat location within a venue for a live event.

15. The computer-implemented system of claim 9, further comprising means for displaying a photograph associated with the first portable computing device on the display device of the second portable computing device when the first portable computing device is present within the second wireless detection zone.

16. The computer-implemented system of claim 15, further comprising means for displaying preference data on the display device of the second portable computing device when the first portable computing device is present within the second wireless detection zone, the preference data comprising preferences associated with at least one of a product and a service.

17. A computer program product comprising a non-transitory computer usable medium having a non-computer readable program code embodied therein, said computer readable program code adapted to be executed to implement a method for facilitating personalized services with machine-generated communications, said method comprising:

establishing a first wireless detection zone for detecting a presence of a first portable computing device, the first wireless detection zone being defined by global positioning coordinates monitored by the first portable computing device;

establishing a second wireless detection zone for detecting a presence of the first portable computing device;

detecting the presence of the first portable computing device within the first wireless detection zone by a computer server based on global positioning coordinates received by the computer server over a communications network from the first portable computing device;

in response to detecting the presence of the first portable computing device within the first wireless detection zone, the computer server identifying account data associated with the first portable computing device, the account data comprising at least one of a photograph of a person and preference data contained within the account;

the computer server sending a message over the communications network containing the account data to a second portable computing device present within the second detection zone;

detecting the presence of the first portable computing device within the second wireless detection zone by the computer server based on position data received by the computer server over the communications network from the first portable computing device;

in response to the computer server detecting the presence of the first portable computing device within the second wireless detection zone, the computer server sending a message over the communications network to the second portable computing device for activating machine-to-machine communications between the first and second portable computing devices; and displaying the account data on the second portable computing device.

18. The computer program product of claim 17, wherein the first wireless detection zone has a size which is greater than a size of the second wireless detection zone and the first wireless detection zone contains the second wireless detection zone.

19. The computer program product of claim 17, wherein the account data further comprises seating data.

20. The computer program product of claim 19, wherein the portable computing devices comprise at least one of a cellular telephone, a pager, a portable digital assistant, a smartphone, a navigation device, or a hand-held computer with a wireless connection.

* * * * *